(12) United States Patent
Lesso et al.

(10) Patent No.: US 12,002,482 B2
(45) Date of Patent: *Jun. 4, 2024

(54) DATA TRANSFER

(71) Applicant: Cirrus Logic International Semiconductor Ltd., Edinburgh (GB)

(72) Inventors: John Paul Lesso, Edinburgh (GB); Peter John Frith, Edinburgh (GB); John Laurence Pennock, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,703

(22) Filed: Jun. 21, 2022

(65) Prior Publication Data

US 2022/0383882 A1    Dec. 1, 2022

Related U.S. Application Data

(63) Continuation of application No. 16/803,703, filed on Feb. 27, 2020, now Pat. No. 11,417,349, which is a
(Continued)

(30) Foreign Application Priority Data

Dec. 14, 2011  (GB) ...................................... 1121524
Apr. 27, 2012  (GB) ...................................... 1207379
(Continued)

(51) Int. Cl.
*G06F 17/00*       (2019.01)
*G10L 19/002*    (2013.01)
(Continued)

(52) U.S. Cl.
CPC .......... *G10L 19/167* (2013.01); *G10L 19/002* (2013.01); *G10L 19/008* (2013.01);
(Continued)

(58) Field of Classification Search
CPC ..... G06F 3/162; G10L 19/002; G10L 19/008; G10L 19/167; H04L 25/49; H04L 25/4902; H04L 25/4904
(Continued)

(56) References Cited

U.S. PATENT DOCUMENTS 3,267,459 A    8/1966  Chomicki et al.
3,431,559 A    3/1969  Holmes
(Continued)

FOREIGN PATENT DOCUMENTS

WO    0181124 A1    11/2001

OTHER PUBLICATIONS

Haykin, Communications Systems Manual, 1983 (Year: 1983).*
(Continued)

*Primary Examiner* — Paul C McCord
(74) *Attorney, Agent, or Firm* — Jackson Walker L.L.P.

(57) ABSTRACT

This application relates to methods and apparatus for transfer of multiple digital data streams, especially of digital audio data over a single communications link such as a single wire. The application describes audio interface circuitry comprising a pulse-length-modulation (PLM) modulator. The PLM is responsive to a plurality of data streams (PDM-R, PDM-L), to generate a series of data pulses (PLM) with a single data pulse having a rising and falling edge in each of a plurality of transfer periods defined by a first clock signal (TCLK). The timing of the rising and falling edge of each data pulse is dependent upon a combination of the then current data samples from the plurality of data streams. The duration and position of the data pulse in the transfer window in effect defines a data symbol encoding the data. Circuitry for receiving and extracting the data is also disclosed. An interface receives the stream of data pulses (PLM) and data extraction circuitry samples the data pulse
(Continued)

to determine which of the possible data symbols the pulse represents and determines a data value for at least one received data stream.

23 Claims, 23 Drawing Sheets

Related U.S. Application Data continuation of application No. 15/243,154, filed on Aug. 22, 2016, now Pat. No. 10,636,431, which is a continuation of application No. 13/715,495, filed on Dec. 14, 2012, now Pat. No. 9,424,849.

(60) Provisional application No. 61/695,228, filed on Aug. 30, 2012, provisional application No. 61/681,041, filed on Aug. 8, 2012, provisional application No. 61/673,635, filed on Jul. 19, 2012, provisional application No. 61/639,450, filed on Apr. 27, 2012, provisional application No. 61/639,287, filed on Apr. 27, 2012, provisional application No. 61/570,591, filed on Dec. 14, 2011.

(30) Foreign Application Priority Data

Apr. 27, 2012 (GB) ...................................... 1207387
Aug. 30, 2012 (GB) ...................................... 1215487

(51) Int. Cl.
*G10L 19/008* (2013.01)
*G10L 19/16* (2013.01)
*H04L 25/49* (2006.01)

(52) U.S. Cl.
CPC .......... *H04L 25/49* (2013.01); *H04L 25/4902* (2013.01); *H04L 25/4904* (2013.01)

(58) Field of Classification Search
USPC ................................... 375/238, 239; 700/94
See application file for complete search history.

(56) References Cited

U.S. PATENT DOCUMENTS

| | | | |
|---|---|---|---|
| 3,462,681 A | 8/1969 | Biskup | |
| 4,065,639 A | 12/1977 | Suzuki et al. | |
| 4,122,441 A | 10/1978 | Robinson et al. | |
| 4,494,194 A | 1/1985 | Harris et al. | |
| 4,550,425 A | 10/1985 | Andersen et al. | |
| 4,554,642 A | 11/1985 | Rubin | |
| 4,905,257 A | 2/1990 | Palkert et al. | |
| 4,939,729 A | 7/1990 | Weisser | |
| 4,970,410 A | 11/1990 | Matsushita et al. | |
| 5,182,467 A | 1/1993 | Taylor et al. | |
| 5,200,980 A | 4/1993 | Briddell | |
| 5,664,166 A | 9/1997 | Isfeld | |
| 5,787,132 A | 7/1998 | Kishigami et al. | |
| 5,969,631 A | 10/1999 | Ammler et al. | |
| 6,044,307 A | 3/2000 | Kamiya | |
| 6,184,916 B1 | 2/2001 | Cianciosi | |
| 6,212,230 B1 | 4/2001 | Rybicki et al. | |
| 6,359,525 B1 | 3/2002 | Mohan et al. | |
| 6,396,877 B1 | 5/2002 | Hollenback et al. | |
| 7,230,557 B1 | 6/2007 | Burk et al. | |
| 7,466,772 B2 | 12/2008 | Bertram | |
| 2002/0065044 A1* | 5/2002 | Ito | G06K 7/0008 |
| | | | 455/557 |
| 2003/0072050 A1 | 4/2003 | Vrazel et al. | |
| 2004/0160993 A1 | 8/2004 | Ganton et al. | |
| 2005/0155001 A1 | 7/2005 | Kinoshita et al. | |
| 2005/0231412 A1 | 10/2005 | Confalonieri et al. | |
| 2007/0194827 A1 | 8/2007 | Braun | |
| 2008/0084343 A1 | 4/2008 | Heyl et al. | |
| 2008/0150635 A1 | 6/2008 | Maejima | |
| 2008/0278253 A1 | 11/2008 | Pedersen et al. | |
| 2010/0260362 A1 | 10/2010 | Sander et al. | |
| 2012/0014530 A1 | 1/2012 | Yamkovoy | |
| 2012/0275493 A1* | 11/2012 | Fortier | H03F 3/217 |
| | | | 375/219 |
| 2022/0383882 A1* | 12/2022 | Lesso | H04L 25/49 |

OTHER PUBLICATIONS

Examination Report, Canadian Intellectual Property Office, Application No. 2,882,321, mailed Nov. 6, 2015, 6 pages.
Examination Report, Canadian Intellectual Property Office, Application No. 2,882,321, mailed Nov. 14, 2016, 3 pages.

* cited by examiner

DATA TRANSFER

This application is a continuation of U.S. Non-Provisional application Ser. No. 16/803,703 filed on Feb. 27, 2020, which is a continuation of U.S. Non-Provisional application Ser. No. 15/243,154 filed on Aug. 22, 2016, now U.S. patent Ser. No. 10/636,431 issued on Apr. 28, 2020, which is a continuation of U.S. Non-Provisional application Ser. No. 13/715,495 filed on Dec. 14, 2012, now U.S. Pat. No. 9,424,849 issued on Aug. 23, 2016, which claims the benefit of U.S. Provisional Application No. 61/570,591 filed on Dec. 14, 2011, U.S. Provisional Application No. 61/639,287 filed on Apr. 27, 2012, U.S. Provisional Application No. 61/639,450 filed on Apr. 27, 2012, U.S. Provisional Application No. 61/673,635 filed on Jul. 19, 2012, U.S. Provisional Application No. 61/681,041 filed on Aug. 8, 2012, U.S. Provisional Application No. 61/695,228 filed on Aug. 30, 2012, United Kingdom Patent Application No. GB1121524.1 filed on Dec. 14, 2011, United Kingdom Patent Application No. GB1207379.7 filed on Apr. 27, 2012, United Kingdom Patent Application No. GB1207387.0 filed on Apr. 27, 2012, and United Kingdom Patent Application No. GB1215487.8 filed on Aug. 30, 2012, all of which are incorporated by reference herein in their entirety.

FIELD OF DISCLOSURE

This application relates to methods and apparatus for data transfer, especially to the transfer of multiple channels of digital audio data, and in particular to audio data transfer that can use a single communications channel.

BACKGROUND

In many electronic devices there is a need to transmit audio data signals, or other data signals, within the electronic devices, or to some peripheral or accessory device(s) that may be attached to the electronic devices, for instance a set of headphones. In many modern electronic devices, especially devices with RF transmission capability such as a mobile telephone or tablet computing device, analogue audio signals are liable to be corrupted by electromagnetic interference (EMI) and coupling from other nearby circuitry. It is therefore desirable to transmit signals from an audio processing device, e.g. an integrated circuit audio hub/codec, to the driver of a transducer e.g. speaker, in a digital format so as to preserve the integrity and quality of the audio signal. For audio data there is also typically a requirement to send data for multiple channels, for instance left (L) and right (R) data channels for stereo audio.

Modern electronic devices such as smartphones, tablets and the like typically transmit digital audio data using three data wires plus a ground wire. The signal data for both L/R audio channels is typically sent on one wire in serial format, for example in words of 24 bits, with separate words being sent for the left (L) data channel and the right (R) data channel. The bit clock signal (BCLK) is sent on another wire and a further clock at the left/right words rate (LRCLK) is sent on a further wire as illustrated in FIG. 1.

Alternatively, the audio data may be transmitted as a high-rate 1-bit stream, sometimes referred to as Pulse Density Modulation (PDM). Word-length reduction, noise shaping and/or delta-sigma techniques may be applied to reduce quantisation noise in the audio band at the expense of noise at higher frequencies so as to reduce the required bit rate. However, this still requires two wires for the transfer of digital audio data, one wire for the data and one wire for the clock. Moreover, the digital data spectrum will include components corresponding to the base band audio signals, which may couple onto other analogue lines associated with the device. Stereo data may be transmitted along one wire, typically alternating between sending left channel data and right channel data, but the separate clock line is still needed and the digital data spectrum may still present similar problems.

SUMMARY

It is therefore an object of the present invention to provide methods and apparatus for data transfer of multiple data channels that at least mitigate some of the aforementioned disadvantages.

Thus according to the present invention there is provided digital data transmission circuitry comprising:
- at least two data inputs for receiving respective input digital data streams of data bits; and
- a pulse generator, responsive to said input digital data streams and to a first clock signal, to generate a single data pulse having a rising edge and a falling edge within each of a plurality of transfer periods defined by said first clock signal,
- wherein the time of occurrence of the rising edge and the falling edge of the data pulse encodes the then current data bits of said input digital data streams.

The occurrence said rising and falling edges of the data pulse are quantised in time within the transfer period. In this way each data pulse corresponds to one of a set of possible data symbols and the data is reversibly encoded, i.e. it may be recovered by a suitable decoder. The rising and falling edges of each data pulse may advantageously be synchronised to a second clock signal, where the second clock signal has a frequency greater than the first clock signal. The second clock signal frequency may be a multiple of the first clock signal frequency.

The input digital data streams may comprise at least two audio data streams and/or at least one stream of control data. The control data may be data for controlling the operation of a receiver of the least one audio data stream.

The first clock frequency may be equal to the sample rate of the at least one digital data stream. The input data may be oversample data and the sample rate of the at least one digital data stream is a multiple of a standard audio frequency sample rate, such as 48 kHz or 44.1 KHz.

The pulse generator may be configured such that there is at least one period defined by the second clock signal at the start of the transfer period before the start of a data pulse and/or at least one period defined by the second clock signal at the end of a data pulse before the end of the transfer period.

At least one input data stream encoded by the data pulses may comprise a bi-phase encoded data stream, for example a Manchester differential encoding data stream. The transmission circuitry may therefore comprise a bi-phase encoder for receiving a first input data stream and producing the bi-phase encoded input data stream. The bi-phase encoder may be configured to generate a bi-phase encoded data stream comprising at least one illegal bit sequence that is not used for encoding data. The illegal bit sequence may be inserted into the bi-phase encoded data stream to define a frame of data. The illegal bit sequence may comprise three instances of the same value in the bi-phase encoded input data stream and in some embodiments the bi-phase encoder may generate two instances of the same data value into the bi-phase encoded data stream at the start of a frame with the data value matching the last data value of the previous frame.

The digital data transmission circuitry may additionally comprise a logic unit for performing a logical XOR operation between the current value of an input audio data stream and the current value of the bi-phase encoded data stream and the pulse modulator is responsive to the bi-phase encoded data stream and the output of the logic unit.

In some embodiments at least some data pulses having the same duration encode different data values.

The pulse generator may be configured such that the rising or falling edge at the start of the data pulse occurs substantially no later than half way through the transfer period and/or the rising or falling edge at the end of the data pulse occurs substantially no earlier than half way through the transfer period.

The pulse generator may be configured such that the set of possible data pulses that may be transmitted comprises at least one data pulse which has a duration which is unique within the set. The set of possible data pulses may comprise a minimum duration data pulse which has a duration which is unique within the set and which is shorter than the duration of any other data pulse within the set. The circuitry may be operable in a synchronisation phase to transmit a sequence of data pulses comprising at least one data pulse which has a duration which is unique within the set.

The pulse generator may be configured such that at least one possible combination of input data can be encoded by more than one possible data pulses. Over time, different instances of said combination of input data may be encoded by different ones of said possible data pulses. The different possible data pulses for encoding a given combination of input data may have different durations and the pulse may select between the possible data pulses so as to minimise any d.c imbalance over time in the transmitted data pulses. One of the possible data pulses for encoding a given combination of input data may have a duration of greater than half the transfer period and another of the possible pulses may have a duration of less than half the transfer period.

The pulse generator may be configured such that there is at least one possible data pulse that is not used to encode the input data but which may be transmitted by the pulse generator for synchronisation and/or control.

At least one of the data inputs may be configured to receive an input digital data stream which is a n-bit data stream. In some embodiments n=1. At least one input digital data stream may be a PDM data stream and/or at least one of said data inputs may be configured to receive an input digital data stream which is a PCM data stream.

The digital data transmission circuitry as claimed may comprise a combination module for receiving at least first and second data streams and producing a combined data stream as one of said input digital data streams, wherein said combined data stream comprises one or more bits of the first audio data interleaved with one or more bits of the second data stream.

The digital data transmission circuitry may have a first data output terminal associated with transmission of said data pulses to a receiver and said first output terminal is the only output terminal associated with said data transfer. Alternatively there may be a first data output terminal associated with transmission of said data pulses to a receiver and a second output terminal for transmitting a clock signal for defining the transfer period.

The output from the pulse generator may be connected to an audio signal path on a printed circuit board of a host device and/or a connector of a host device, which may for example be a socket. The connector may comprise a connection for an audio accessory. In some embodiments the circuitry is configured, in use, to provide audio data and power to a peripheral connected to said connector. The connector may have connections for audio data-out, power and ground. In some instances the power connection also serves as said audio data-out connection. There may additionally be an audio data-in connection. The audio data-in connection may also serves as the audio data-out connection. The connector may be an optical connector.

The digital data transmission circuitry may comprise bi-directional interface circuitry configured to transmit said data pulses generated by the pulse generator over a first communications link and receive data pulses via said first communications link. The pulse generator may be configured to transmit data pulses during a first transfer period and the bi-directional interface circuitry is configured to receive data pulse during a second, different transfer period. The bi-directional interface circuitry may comprise a drive circuit for voltage modulating the first communications link based on the data pulses and a read circuit responsive to the resultant voltage on the first communications link, wherein the read circuit is configured to subtract the drive voltage modulation from the resultant voltage signal.

Embodiments of the invention also relate to a digital receiver. Thus in another aspect of the invention there is provided digital data receiver circuitry comprising:
- an input for receiving a series of data pulses,
- a sampler for sampling each received pulse within a transfer period defined by a first clock signal such that there is a single data pulse with a rising edge and a falling edge in each transfer period, said sampler being configured to provide an indication of which of a set of possible data symbols the data pulse corresponds to based on the timing of the occurrence of both the rising and falling edges of the data pulse within the transfer period; and
- decoding circuitry for generating at least one received digital data stream based on said indication,
- wherein said decoding circuitry is configured such that a plurality of possible data symbols may be decoded as the same value of a data bit of a received digital data stream.

The decoding circuitry may generate at least two received digital data streams based on said indication.

The digital data receiver circuitry may comprise a clock recovery circuit for recovering a clock signal from said series of data pulses and generating said first clock signal. The clock recovery circuit may generate a second clock signal at a frequency which is a predefined multiple of the frequency of the first clock signal. The second clock signal may be generated so as to be synchronised to the timing of the rising and falling edges of the data pulses within the transfer period.

The set of possible data symbols that may be received may comprise at least one data symbol which has a pulse duration which is unique within the set. In which case the digital data receiver circuitry may be configured to identify receipt of said at least one data symbol which has a pulse duration which is unique within the set and use receipt of such a data symbol to synchronise the start and end of the transfer period. The receiver circuitry may be operable in a synchronisation phase to receive a sequence of data pulses comprising at least one data symbol which has a pulse duration which is unique within the set and to derive said first and second clock signals, with said first clock signal being synchronised to the transfer period.

In some embodiments however the digital data receiver may have a clock input for receiving a first clock signal defining the transfer period. In which case there may be circuitry for generating a second clock signal from said received first clock signal, the frequency of the second clock signal being a predefined multiple of the frequency of the first clock signal, wherein the second clock signal is generated synchronised to the timing of the rising and falling edges of the data pulses within the transfer period.

The received digital data streams may comprise at least two audio data streams and/or at least one stream of control data. The control data may be data for controlling the operation of an audio component which comprises said digital data receiver circuitry.

At least one received data stream encoded by said data symbols may be a bi-phase encoded data stream, for example a Manchester differential encoded data stream. A bi-phase decoder may decode said bi-phase encoded data stream. The bi-phase decoder may be configured to identify at least one illegal bit sequence that is not used for encoding data. The illegal bit sequence may be identified to define a frame of data. The illegal bit sequence may comprise three instances of the same value in the bi-phase encoded data stream. On detection of three instances of the same value in the bi-phase encoded data stream, the data pulses encoding the second and third instances may be identified as the first two data pulses of a new frame.

The receiver circuitry may also comprise a logic unit for performing a logical de-XOR operation between the current value of a first received digital data stream and the current value of the bi-phase encoded data stream and the output of the logic unit is used as the output data for the first digital data stream.

The data recovery circuit may output at least one received digital data stream which is a 1-bit PDM data stream and/or at least one received digital data stream which is a PCM data stream.

The receiver circuitry may have a separation module having an input for a received data stream and configured to produce at least first and second data streams, wherein said first and second data streams are recovered by taking one or more bits from the received data stream that correspond to the first data stream and which are interleaved with one or more bits of the second data stream.

In some embodiments there may be at least a first data extraction module and a second data extraction module wherein the first data extraction module and the second data extractions module are configured to determine data values for different received data streams to one another. The first data extraction module may be configured to receive the input data pulses from the interface and to pass said data pulses to the second data extraction module. Each of the at least first and second data extraction modules may be associated with respective first and second audio transducers.

In some embodiments the circuitry may comprise power circuitry configured to derive a power supply from said input serial pulse-length modulated audio data signal. The sampler and decoder circuitry may be powered by said power supply.

The digital data receiver circuitry may be implemented in an accessory device such as a headset.

The invention also relates to a digital data transceiver circuitry comprising digital data transmission circuitry as described above to send digital data and digital data receiver circuitry as described above to receive digital data.

In a further aspect of the invention there is provided a digital interface comprising:
 a data encoder for receiving at least two streams of digital data to be transmitted and a first clock signal, and generating a series of data pulses at a digital data output, said series of pulses being encoded according to a first digital data protocol such that there is a single data pulse having a rising and falling edge in each of a plurality of transfer periods defined by said first clock signal, the at least two streams of digital data to be transmitted being encoded by the timing of the occurrence of the rising and falling edges of the data pulse within the transfer period; and
 a data decoder for receiving a series of encoded data pulses at a digital data input and decoding at least one received data stream, said encoded data pulses being encoded using said first digital data protocol at a data input.

The digital interface may be configured as a master circuit for controlling a digital data bus from said master to at least one slave component. In which case the data encoder may be configured to transmit data to a plurality of slave components connected in a chain configuration and said data decoder is configured to receive data from the last slave component in the chain. The interface may be configured to transmit audio data for at least one slave component having an audio output transducer and control data for controlling at least one slave component. The control data may be transmitted in frames.

Alternatively the digital interface may be configured as a slave circuit on a digital data bus.

In some embodiments the digital decoder may be configured to receive data pulses at said digital data input from an upstream audio circuit, decode said data pulses, identify any audio data and/or control data for said audio component, and the digital encoder may be configured to generate data pulses for a downstream audio component based on said decoded data and any required modifications of the control data. The component having the interface may comprise at least one source of audio data and the data pulses generated for the downstream component may encode audio data from said source of audio data.

The invention also relates to a system comprising at least first and second components having a signal path between them such that data to be transmitted to or received from the second component is transmitted via the first component, wherein the first component comprises a digital interface as described above. The first component may be configured to receive a series of said data pulses encoding data for at least one component and to forward a signal to said second component. The series of data pulses may encode data for said first component and the first component may be configured to extract said data for said first component. The first component may also forward the series of data pulses received to the second component. The first component may decode the data in the series of data pulses received and use at least some of said decoded data to generate a series of data pulses for transmission to the second component. The first component may generate the series of data pulses for transmission to the second component to encode data generated by said first component. The system may comprise a plurality of audio components with each component being connected to the next component in a chain.

Any of the circuits discussed above may be implemented as an integrated circuit and/or may be embodied in an electronic device, which may be at least one of: a portable device; a battery powered device; a communication device;

a computing device; a personal media player; a music player; a mobile telephone; a docking station for a portable device; a headset; and a hearing aid.

The invention also relates to methods of data transfer. Thus in another aspect of the invention there is provided a method of digital data transfer comprising defining a transfer period based on a clock signal, transmitting a single data pulse within each transfer period such that each data pulse has a distinct rising and falling edge within the transfer period and encoding data at least two input digital data streams by setting times of occurrence of the rising and falling edges of the data pulse within the transfer period.

The method may be performed using any of the implementations discussed above in respect to the other aspects of the invention.

Embodiments of the invention allow low latency data transfer which is particularly appropriate for transfer of digital data from one audio apparatus to another, for example for noise cancellation. In another aspect of the invention there is provided an audio apparatus comprising:
 at least first and second audio input transducers; and
 a connector for connecting said audio apparatus to an electronic device, said connector having at least three contacts, configured such that:
 a first of said contacts provides a supply current for said apparatus;
 a second of said contacts is a ground return; and
 a third of said contact carries a first digital composite signal comprising oversampled signals from said at least two audio input transducers.

The signals from said at least two audio input transducers may be oversampled at a data rate of at least 700 kilosamples per second or at least 3 megasamples per second.

The apparatus may comprise a data encoder responsive to said audio input transducers to generate said first digital composite signal. The data encoder may comprise a data transmitter according to the first aspect of the invention. The data encoder may be configured to generate said first digital composite signal by generating one data pulse within each of a plurality of transfer periods defined by a clock signal, each pulse having a single rising edge and a single falling edge; wherein the time of one or both of the rising edge and the falling edge of the data pulse encodes the current respective samples of both the said delta-sigma-modulated audio input data signals.

The audio input transducers may be microphones. The apparatus may be an audio accessory apparatus for use with an electronic device, for example the audio accessory apparatus may be a headset.

The connector may comprise a male-type plug, for example a 3.5 mm TRS or TRRS jack plug.

The at least two audio input transducers may be configured to detect ambient noise. The apparatus may comprise at least two loudspeakers for audio playback wherein said at least two audio input transducers are configured to detect ambient noise in the vicinity of said loudspeakers. The connector may therefore comprise at least a fourth contact for receipt of audio data for said loudspeakers. The apparatus may comprise receiver circuitry for recovering first and second audio signals from a second composite digital audio signal received via said fourth contact, and conversion circuitry for applying the first and second audio signals to said speakers. The receiver circuitry may be receiver circuitry according to the aspect of the invention discussed above. In particular the second digital composite signal may comprise one data pulse within each of a plurality of transfer periods, each pulse having a single rising edge and a single falling edge, wherein the time of both the rising edge and the falling edge of the data pulse encodes the current samples of both the said delta-sigma-modulated speaker signals.

Embodiments of the invention also relate to an electronic device comprising a device connector for connecting to the apparatus connector of the audio apparatus according to this aspect of the invention, the electronic device comprising a decoder for receiving said first digital composite signal, to extract separate audio input signals, to calculate respective signals to cancel the ambient noise, and to combine these correction signals into the second composite digital signal as above for transmission to the loudspeakers.

An audio ambient noise cancellation system comprising a device discussed above connected to an apparatus as discussed above is also provided.

In another aspect of the invention there is provided audio interface circuitry comprising: a pulse generator, responsive to at least one digital audio data stream and at least one control data stream, to generate one data pulse within each of a plurality of transfer periods defined by a clock signal, wherein each data pulse has a single rising edge and a single falling edge and wherein the timing of at least one of the rising edge and the falling edge of the data pulse within the transfer period is based on a combination of the then current values of said at least one digital audio data stream and said control data stream.

The invention also provides an audio accessory comprising:
 a plurality of wired connections to a connector, said connector comprising:
 a first connection for carrying supply current for circuitry in the accessory;
 a second connection for carrying ground return current for circuitry in the accessory; and
 a third connection for carrying a first oversampled digital composite signal.

The connector may further comprise a fourth connection for carrying a second oversampled digital composite signal.

In a yet further aspect the invention provides audio interface circuitry comprising:
 a pulse-length-modulator, responsive to a plurality of data streams of audio data samples at a sample rate, to generate a stream of data pulses at said sample rate;
 wherein the length of each said data pulse is dependent upon a combination of the then current audio data samples from said plurality of data streams.

The audio data streams may comprise 1-bit digital audio data streams and/or may correspond to audio data channels.

The pulse-length-modulator may be responsive to a first clock signal having a frequency equal to said sample rate. The pulse-length-modulator may also be further responsive to a second clock signal, wherein the second clock signal has a frequency which is a multiple of the frequency of the first clock signal and wherein the length of each data pulse is based on a selected number of cycles of the second clock signal. The minimum data pulse length may be a plurality of cycles of the second clock signal. The maximum data pulse length may be shorter than the period of the first clock signal by a plurality of cycles of the second clock signal.

The pulse-length-modulator may be configured so that at least one combination of input audio data for said plurality of audio data streams can be encoded as at least two different alternative data pulse lengths. The pulse-length-modulator may be configured so as to vary between said at least two different alternative data pulse lengths when encoding said at least one combination of input audio data and may alternate between said at least two different alternative data pulse lengths when encoding said at least one combination of input audio data. The pulse-length-modulator may randomly select one of said at least two different alternative data pulse lengths when encoding said at least one combination of input audio data and/or may, when encoding said at least one combination of input audio data, vary between said at least two different alternative data pulse length so as to control the average data pulse length for all instances of a given combination of input audio data. A plurality of combinations of input audio data may each be encoded as a plurality of alternative data pulse lengths and the pulse-length-modulator may vary between the respective alternative data pulse length so that the average data pulse length for each combination of input audio data is substantially the same. A plurality of combinations of input data may each be encoded as two different lengths of data pulse, the two lengths being symmetric about a predetermined length. One combination of input data may be encoded as a data pulse having a length substantially equal to said predetermined length.

The pulse-length-modulator may be configured to receive at least one additional data channel and wherein the length of at least some individual data pulses encodes the then current audio data samples from said plurality of data streams and also the then current data sample for said additional data channel. The additional data channel may be a control data channel. When no data is received on said additional data channel the pulse length modulator may vary between pulse lengths that encode the same audio data combination. When data is received on an additional data channel the pulse-length-modulator may modulate a series of data pulses with a first reserved sequence prior to encoding said data of the additional data channel, where the first reserved sequence corresponds to the encoding that would be used for a particular data sequence on the additional data channel and wherein the pulse-length-modulator is configured so as not to use the first reserved sequence when no data is available on the additional data channel. When data on the additional channel stops a second reserved sequence of additional data may be encoded.

The frequency of the second clock signal may be at least five times, or possibly at least eight times, the frequency of the first clock signal.

The plurality of audio data streams may comprise left and right stereo data channels. The pulse-length-modulator may be configured to receive a separate audio data stream for each of said audio channels. The pulse-length-modulator may comprise a combiner for producing a combined data value from each of said audio data streams.

A counter may be arranged to count at a frequency of the second clock signal and a comparator may be arranged to compare the count value to the combined data value.

The pulse-length-modulator may be configured to produce an output which varies between a first non zero voltage and a second non zero voltage.

The rising edges of the data pulses may be separated by a regular time interval equal to the sample period. The falling edges of the data pulses may be separated by a regular time interval equal to the sample period.

The output from the pulse-length-modulator may be connected to an audio signal path on a printed circuit board of a host device and/or to a connector of a host device, such as a socket. The connector may comprise a connection for a headset. The pulse-length-modulator may be configured, in use, to provide audio data and power to a peripheral connected to said connector. The connector may comprise connections for audio data-out, power and ground. The power connection may also serve as said audio data-out connection. There may also be an audio data-in connection. In some embodiments the audio data-in connections also serves as the audio data-out connection. The connector may be an optical connector or an RF transmitter.

The audio interface circuitry may further comprising bi-directional interface circuitry configured to transmit said data pulses generated by the pulse-length-modulator over a first communications link and receive pulse-length-modulated data pulses via said first communications link. The pulse-length-modulator may be configured to transmit data pulses during a first portion of the sample period and the bi-directional interface circuitry is configured to receive data pulse during a second, different portion of the sample period. The bi-directional interface circuitry may comprise a drive circuit for voltage modulating the first communications link based on the data pulses and a read circuit responsive to the resultant voltage on the first communications link, wherein the read circuit is configured to subtract the drive voltage modulation from the resultant voltage signal.

In a further aspect of the invention there is provided an audio circuitry comprising:
  an interface configured to receive a serial pulse-length modulated audio data input comprising a series of data pulses at a sample rate;
  data extraction circuitry configured to determine the pulse length of said data pulse and to determine a data value for each of a plurality of audio data streams from said pulse length.

The circuitry may comprise clock recovery circuitry configured to recover a first clock signal based on said sample rate. The data extraction circuitry may be configured to sample the data pulse at a predetermined number of intervals within the period of the first clock signal to determine the pulse length of the data pulse. The data extraction circuitry may comprise a delay line having a plurality of tap points. The data extraction circuitry may comprise at least a first data extraction module and a second data extraction module wherein the first data extraction module and the second data extractions module are configured to determine data values for different audio data streams to one another. The first data extraction module may be configured to receive the input serial pulse-length modulated audio data from the interface and to pass said input serial pulse-length modulated audio data to the second data extraction module. Each of the at least first and second data extraction modules may be associated with respective first and second audio transducers. The circuitry may further comprise power circuitry configured to derive a power supply from said input serial pulse-length modulated audio data signal. The data extraction circuitry may be powered by said power supply.

The audio circuitry may be implemented in a headset and/or may be arranged as a transceiver. An audio system is also provided.

In a further aspect there is provided a method of transmitting audio data comprising, generating a pulse length modulated signal comprising a series of data pulses at a sample rate;
  wherein the length of each data pulse is dependent upon a combination of the then current audio data samples from said plurality of data streams.

Aspects of the invention further relate to an audio system for transferring audio data for a plurality of audio channels over a single wire connection comprising a pulse-length-modulator configured to produce a series of data pulses at regular intervals wherein the length of each data pulse encodes audio data for each of said plurality of audio channels.

Aspects of the invention further relate to data transfer system for transferring data for a plurality of separate data channels over a single wire connection comprising a pulse-length-modulator configured to produce a series of data pulses at regular intervals wherein the length of each data pulse encodes data from each of said plurality of audio channels.

Aspects of the invention further relate to audio interface circuitry comprising: a pulse-length-modulator responsive to audio data for a plurality of audio channels to generate data pulses at a regular time interval;
wherein the length of the data pulses encode said audio data; and
wherein the length of an individual data pulse encodes audio data for said plurality of audio channels.

Aspects of the invention further relate to an audio interface for receiving and encoding a plurality of streams of 1-bit audio data samples and for transmitting a stream of encoded data pulses via a single communication link.

Aspects of the invention further relate to an audio interface for receiving and encoding a plurality of streams of 1-bit audio data samples and simultaneously transmitting on a clock edge of a stream of encoded data pulses a plurality of sampled 1-bit audio data samples via a single communication link.

In a yet further aspect of the invention there is provided audio interface circuitry for transfer of audio signals wherein said interface circuitry is operable in:
an analogue mode for receiving analogue audio signals; and
a digital mode for receiving digital audio signals
wherein, in said digital mode,
said digital audio signals comprise a series of data pulses wherein the length of each pulse encodes at least two audio digital data streams, and
wherein the interface circuitry decodes at least one of said digital data streams.

The data may alternatively be encoded by the timing of the occurrence of the rising and falling edges of the data pulse within a transfer period defined by a first clock signal.

The interface circuitry may decode and condition at least one of said digital data streams.

The interface circuitry may comprise: at least a first analogue signal path for receiving analogue audio data from a first contact on a connector; at least a first digital path for receiving digital audio signals from the first contact on the connector; and at least a first switch for enabling/disabling the first analogue signal path. It may further comprise: a second analogue signal path for transferring analogue audio data to/from a second contact on a connector; a second digital path; a second switch for enabling/disabling the second analogue signal path. The at least first and second switches may default to enabling the first and second analogue signal paths and may comprise depletion modes FETs within the first and second analogue signal paths respectively. The second analogue path may be for receiving an audio signal from said contact and said second digital path may be for transferring digital audio signals to said second contact. There may also be a third analogue signal path for transferring analogue audio data to/from a third contact on a connector; a third digital path, wherein said third digital path is a path providing power to the interface circuitry from a third contact of a connector; and a third switch for enabling/disabling the third analogue path. The third switch may default to enabling the third analogue signal path. The third analogue signal may be for transferring analogue audio data to the third contact of the connector.

The interface circuitry may comprise circuitry configured to, in the digital mode, derive power from digital audio signals received on said first digital data path.

The first and second analogue signal paths may be for receiving audio data for respective loudspeakers. The third analogue signal path may be for transferring audio data to the connector from a microphone. Digital decoding circuitry may be coupled to said first digital path configured to decode said data pulses in the digital mode. Digital encoding circuitry may be coupled to said second digital path configured to encode data pulses in the digital mode. Discrimination circuitry may be configured to, when power is available on the third digital path, to determine whether to operate in the digital mode and, if so, generate a control signal to disable the analogue signal paths. The discrimination circuitry may be configured to, when power is available on the third digital path, to attempt handshaking with a device connected via said connector.

There may be a ground path for connecting to a ground contact on a connector in both said digital and said analogue mode.

The audio interface circuitry may be implemented as an integrated circuit. An audio apparatus may include such audio interface circuitry and at least a first audio output transducer, where said interface circuitry is configured to forward a received analogue audio signal to said first audio output transducer in the analogue mode and to decode said digital audio signal and forward a decoded digital data stream to said first audio output transducer in the digital mode.

The audio apparatus may comprise at least first and second audio output transducers wherein, when enabled, said first and second analogue signal paths provides a direct connection to said first and second audio output transducers respectively. Digital decoding circuitry may comprise first and second analogue outputs for connecting to said first and second audio output transducers respectively. The first and second switches may switch between the first and second analogue signal paths and the first and second outputs of the digital decoding circuitry. The first and second signal paths may be connected to first and second converters for converting between analogue and digital signals such that any analogue audio signals received for the transducers are converted to corresponding digital signals. Digital processing circuitry may be configured to apply digital processing to the digital signals output from said first and second converters. The digital processing circuitry may comprise analogue outputs for connecting to said first and second transducers respectively.

The interface circuitry may be connected to a connector and said connector is a TRRS jack. The apparatus may be an accessory apparatus configured to be connected to an electronic device, such as an audio headset.

Aspects of the invention also provide a method of receiving audio signals comprising: receiving said audio signals at an interface operable in analogue mode and also in digital mode and selecting a mode to operate in, wherein:
in said analogue mode at least one analogue audio signal is received and forwarded for an audio output transducer; and
in said digital mode at least one digital audio signal is received, said digital audio signal comprising a series of data pulses wherein the length of each pulse encodes at least two audio data streams, and the interface circuitry decodes at least one of said data streams and forwards said digital data stream for an audio output transducer.

The method may comprising determining whether a connected device transmitting the audio signals is capable of sending signals suitable for the digital mode and, if so operating in the digital mode, otherwise operating in the analogue mode.

Aspects of the invention also provide interface circuitry for receiving audio signals wherein said interface circuitry is operable:
in an analogue mode to receive analogue audio signals; and
in a digital mode to receive digital audio signals wherein, in said digital mode, the audio data comprises a series of data pulses at a pulse rate wherein the length of each pulse encodes at least two audio data streams.

In a further aspect there is provided interface circuitry for transmitting audio signals to an apparatus external to a host device wherein said interface circuitry is operable:
in an analogue mode to transmit analogue audio signals; and
in a digital mode to transmit digital audio signals wherein, in said digital mode, the audio data comprises a series of data pulses at a pulse rate wherein the length of each pulse encodes at least two audio data streams.

In a further aspect there is provided audio interface circuitry comprising: at least first and second analogue signal paths for transmitting analogue audio data to respective first and second contacts on a connector;
at least a first digital path for transmitting digital audio signals to the first contact on the connector; and
at least a second digital path coupled to a second contact on the connector.

The second digital path may be for receiving digital data from the second contact in digital mode. A third analogue signal path may be provided for receiving analogue audio data from a third contact on a connector; with a third digital path for transmitting power to the third contact on the connector in digital mode. A first interface may be provided for digital communication with a first component of a host device and a second interface for digital communication with a second component of a host device. There may be a digital only path for communication between said first and second interfaces. The first component may comprise an applications processor, a baseband processor, a transmission codec or a wireless codec.

The invention also provides, in a further aspect, a headset for receiving audio signals comprising at least one audio output transducer and a connector for connecting to an audio device wherein the headset is operable in a digital mode for receiving digital audio signals via said connector and applying said digital audio signals to said at least one audio output transducer and an analogue mode for receiving analogue audio signals via said connector and applying said received analogue audio signals said at least one audio output transducer.

In a yet further aspect there is provided an audio apparatus comprising:
at least first and second audio output transducers;
a connector for connecting the audio apparatus to another device having at least first and second contacts;
interface circuitry operable:
in a first mode to enable first and second analogue signal paths from the first and second contacts directly to the first and second audio output transducers respectively; and
in a second mode to disable said first and second analogue signal paths and provide at least a first digital signal path from the first contact to a digital decoder.

In said digital mode the interface circuitry provides power to the digital decoder from the second contact.

BRIEF DESCRIPTION OF THE DRAWINGS

The invention will now be described by way of example only with reference to the following drawings, of which.

DETAILED DESCRIPTION

Figure 1:
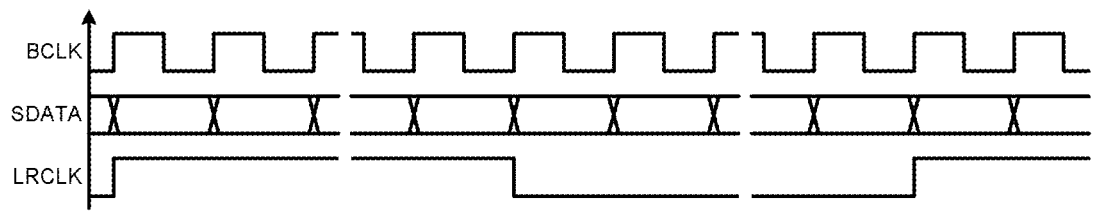
FIG. 1 illustrates a prior art three-wire data transfer protocol for stereo audio data.

As mentioned above increasingly audio data is being stored and transmitted in digital form. For instance in a portable device such as a mobile telephone or tablet computing device, there may be an audio digital signal processor or audio codec which processes the audio data and which transmits audio data to and from audio transducers such as loudspeakers and/or microphones which may be provided on the host device and/or which may be connected to the host device via a suitable interface. There are advantages in transmitting such data to and from the transducers in a digital format but conventional digital transfer often requires multiple signal paths, e.g. for a data signal, a bit clock and a frame clock as described previously with reference to FIG. 1. Providing multiple wires, or conductive tracks, routed around the device all carrying various signals can be disadvantageous in terms of cost, electromagnetic interference and power consumption. There is therefore a desire to transmit data, especially audio data, between components using minimal wires carrying maximal data. There is also a desire for low latency data transfer, especially in applications such as ambient noise cancellation.

Embodiments of the present invention relate to data protocols, data interfaces and methods and apparatus for data transfer that allow high speed/low latency and accurate digital data transfer of multiple channels of data that can be implemented with very few wires/links—and in many cases a single link. The embodiments have a simple physical interface with fewer connections than many other known data interfaces operating other data protocols. The embodiments are suitable for point-to-point connection of audio producing and consuming components and also connecting several components of a device, thus providing a high speed audio data bus without requiring several parallel links. Embodiments also relate to connection of peripheral devices, often referred to as "accessories", such as headsets or the like which can use digital data transfer and which may also be compatible with legacy systems and connection components. The low latency of the data transfer is very suitable for applications such as ambient noise cancellation.

Figure 2:
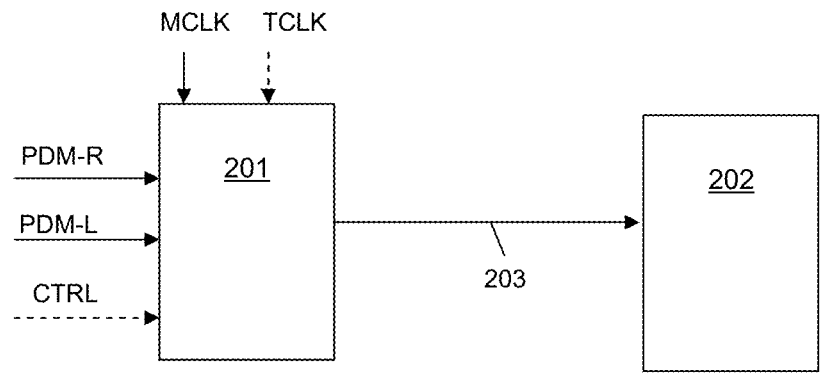
FIG. 2 illustrates a data transfer system according to an embodiment of the present invention and FIG. 2b illustrates another embodiment of a data transfer system.

FIG. 2 illustrates one embodiment of a data transfer system for transferring digital data over a link 203, i.e. conductive path, between a first component 201 and a second component 202. The apparatus is suitable for transferring multiple simultaneous channels of data over a single link. In this example stereo audio data is transferred, optionally along with control data for controlling the set-up and operation of transducers such as microphones and speakers for example. The first component 201 may be audio interface circuitry that is incorporated as part of an audio codec or a digital signal processor of a host device for example. The second component 202 may be audio interface circuitry, for example as part of transducer driving circuitry. The second component 202 may be part of the same host device as the first component 201 and thus the link 203 may comprise a trace on a PCB of the host device or other permanent wired connection. Alternatively the second component 202 could be part of a separate device to the first component 201. For example the first component 201 could be located in a media player or mobile telephone or the like and the second component 202 could be part of a second device, for example a peripheral or accessory device, that is coupled in use such as a headset or docking station or the like. In this case the link 203 may comprise a conductive path involving a suitable connection (not shown) such as a plug and socket. In further embodiments the first and second components may both be implemented on the same integrated circuit, and the link is an on-chip connection, to reduce the width of interconnect bussing between circuit blocks. Various applications of the embodiments of the present invention will be described in more detail later.

The audio interface circuitry of the first component 201 comprises a modulator which receives audio data input data, PDM-R and PDM-L, for the left (L) and right (R) audio channels. In this example the L/R input data are separate 1-bit, i.e. Pulse Density Modulation (PDM) digital input data streams for each channel, i.e. left channel and right channel. In some applications the modulator may also receive control data CTRL to be transmitted to the second component for controlling transducers for example.

The modulator implements a protocol to transmit data that ensures that data, possibly multiple channels of data, and a clock are encoded into a single pulse stream.

Encoding

The encoding protocol operates by transmitting data in the form of data pulses in data transfer periods defined by a data transfer clock signal. The data pulses reversibly encode the data payload to be transmitted—in other words the original data payload can be decoded unambiguously from the data pulse. The transfer period is defined by a data transfer clock signal which may be derived from a supplied clock signal, for instance each data transfer period may correspond to a single cycle of a supplied clock signal, though in some cases the transfer period may be derived as a multiple or as a fraction of the period of a supplied clock. The encoding protocol transmits one pulse in each transfer period such that each data pulse has one distinct rising edge and one distinct falling edge. In other words the transmit, i.e. encoding, protocol ensures that there is no more than one data pulse per transfer period and that there is always a gap between successive data pulses. This ensures that within each transfer period there will be a single rising edge and a single falling edge associated with each data pulse.

With these requirements in place the data is encoded by modulating the timing of the rising and falling edges of the data pulse within the transfer period. In other words the occurrences of the rising and falling edges of the data pulse are quantised in time, i.e. they occur at one of a fixed number of possible times in the transfer period. The quantisation of the rising and falling edges in time thus ensure reversible encoding (i.e. ensures that the original data payload can be decoded by looking at the times at which the rising and falling edges occur within the transfer period). In effect the location and duration of each data pulse within the relevant transfer period defines a symbol which is used to encode the data. Advantageously, ensuring only a single rising edge and single falling edge can occur per transfer period helps to minimise both power consumption and EMI issues.

Conveniently the transfer period is defined by a first clock signal TCLK and the rising and falling edges of the data pulse are defined by, i.e. synchronised to, a second clock signal MCLK, the second clock signal frequency being an integer multiple of the first clock signal frequency $f_{MCLK}$. For example consider that each transfer period is equal to one period of the first clock signal TCLK and that the second clock signal MCLK is n times the frequency of the first clock signal TCLK. A transfer period is therefore equal in length to n periods of the second clock signal MCLK. The transfer period thus effectively comprises n time slots defined by the second clock signal MCLK. In one example the second clock signal MCLK may have a frequency which is eight times the frequency of the first clock signal TCLK and thus the transfer period consists of eight time slots defined by the second clock signal. A value of n which corresponds to a power of two is relatively easy to implement using frequency division/multiplication techniques although other values of n could be implemented if desired. In the description below the first clock signal will be referred to as a transfer clock signal TCLK or a symbol clock signal and the second clock signal will be referred to as a master clock signal MCLK.

Within each transfer period a data pulse is generated by defining a certain number of contiguous time slots to be logic 1 and the remaining time slots to be logic 0. Note that logic 1 and 0 are used herein to simply indicate different states and do not imply any particular voltage or intensity levels etc. For instance in some applications using voltage levels to transfer data, logic 1 may indicate high voltage and logic 0 may indicate low voltage whereas in other applications logic 1 may be low voltage and logic 0 may be high voltage. Likewise it would alternatively be possible to define a data pulse as a continuous period of logic 0 with the rest of the transfer period being logic 1. For the purposes of brevity and for explanation only however the data pulse will be taken to be a continuous period of logic 1 and a transition from logic 0 to logic 1 will be referred to as a rising edge and a transition from logic 1 to logic 0 as a falling edge.

Considering the need for each pulse to have a distinct rising edge and a distinct falling edge it will be appreciated that a period of logic 1 at the end of one transfer period cannot be followed by a period of logic 1 at the beginning of the next transfer period.

In one embodiment therefore the first time slot of each transfer period may be set to logic 0. Thus even if a transfer period has a pulse which is logic 1 to the end of the transfer period there will be a distinct falling edge at the end of the transfer period and a gap before the rising edge of the pulse of the next time period. It will be appreciated however that equally a period of logic 0 may be implemented at the end of each transfer period and/or there may be a period of logic 0 at the beginning and end of each transfer period.

Taking a transfer period of eight time slots for example and ensuring that the first time slot is always logic zero there are 28 different combinations of different timings of rising and falling edges for a data pulse, where each transfer period has a single data pulse and the rising and falling edges are synchronised to the time slots. More generally for n time slots, with the state of either the first or last time slot predefined to ensure a gap between successive data pulses and assuming that data pulses are allowed to differ by one time slot in duration, the number of possible symbols is equal to (n−1)+(n−2)+ . . . +1. As the skilled person will appreciate the sum of successive integers from 1 to m is equal to m·(m+1)/2 so the sum from 1 to (n−1) is equal to (n−1)·n/2. Thus with eight time slots there are 28 possible symbols which can be generated to provide data encoding using the example encoding protocol discussed above. These 28 possible symbols are illustrated in the left hand column of FIG. 3.

Figure 3:
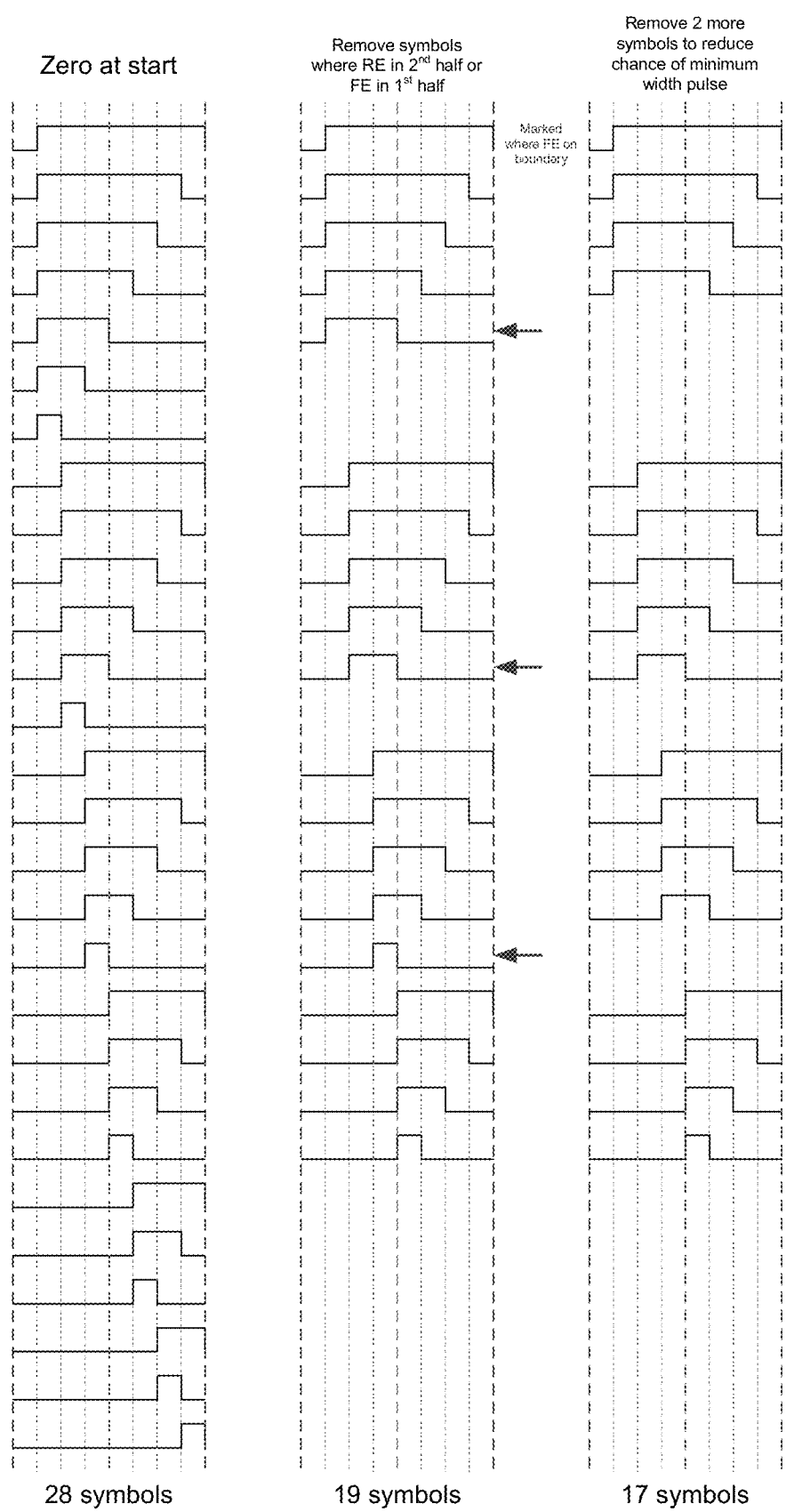
FIG. 3 illustrates examples of symbols that may be transmitted.

FIG. 3 illustrates the eight time slots of the transfer period and the various combinations of rising and falling edges—where rising and falling edges are synchronised to the time slots, a minimum period of one time slot between rising and falling edges is allowed and a falling edge is allowed at the end of a transfer period.

According to embodiments of the present invention different symbols may therefore be used to encode a different data value or combination of different data values. In some embodiments each possible symbol may be used to encode a data value, possibly with some data values being encoded by more than one symbol, however in other embodiments only some of the different symbols that are possible may be used in practice.

With 28 possible symbols per transfer period a 4-bit digital data signal can be encoded each transfer period. As a simple example consider how two 1-bit PDM audio data streams, for example stereo audio data PDM-R and PDM-L, and a channel of audio related control data, CTRL, could be transferred. The audio data may be received at the modulator of component 201 at a first sample rate. The modulator may also receive control data which may also be at the same first sample rate, although the control data may be at a lower sample rate.

It will be appreciated that audio data is typically stored digitally at one of a few standard sample rates, for instance 48 kilosamples per second. Such audio data may be converted and/or interpolated into a higher sample rate PDM audio stream for transmission and thus the sample rate of the PDM audio for transmission may be higher than the sample rate of the base audio. Thus if the underlying audio sample frequency, $f_s$, is say 48 kHz, the PDM data sample rate may be say $64f_s$ or approximately 3 MHz. The data stream transmitted is therefore an oversample data stream, i.e. a data stream at a data rate which is greater than the underlying sample rate of the data being transferred. The first clock signal frequency, i.e. the transfer clock signal frequency $f_{TCLK}$ may be the same frequency as the PDM input data streams. With eight time slots per transfer period for example the master clock frequency MCLK, i.e. that of the second clock signal, would then be approximately 24 MHz. With four bits of data coded per symbol the data rate could be about 12 Mb per second.

In one embodiment the modulator may therefore operate with a transfer period equal to the sample rate period of the incoming data, although in other embodiments the transfer clock signal TCLK defining the transfer period may be a multiple of the sample rate of the incoming data streams. Each transfer period the modulator may generate a data pulse within the transfer period whose rising and falling edges, i.e. the location of such edges within the transfer period, are defined by the state of input data. Table 1 below shows an example of how the input data may be encoded.

TABLE 1

| PDM-L | PDM-R | CTRL | Symbol | RE Time End of slot | FE Time End of slot |
|---|---|---|---|---|---|
| 0 | 0 | 0 | 1 | 1 | 8 |
| 0 | 0 | 1 | 2 | 1 | 6 |
| 0 | 1 | 0 | 3 | 1 | 4 |
| 0 | 1 | 1 | 4 | 2 | 8 |
| 1 | 0 | 0 | 5 | 2 | 6 |
| 1 | 0 | 1 | 6 | 2 | 4 |
| 1 | 1 | 0 | 7 | 3 | 8 |
| 1 | 1 | 1 | 8 | 3 | 6 |

The columns PDM-L, PDM-R and CTRL illustrates the various data combinations that may be input on left and right audio data streams and a control data stream. The symbol column illustrates a particular symbol number (which is just a label to distinguish between different possible symbols). The RE time and FE time columns illustrate the end of the time slot at which the rising edge and falling edge occur for that particular symbol. Note that the symbol allocation to data combinations in this example is simply to explain the principles: the actual correspondence of data to symbol may vary considerably.

It can be seen in this example that earliest rising edge of any symbol is at the end of time slot 1, thus ensuring at least one time slot of logic 0 at the start of a transfer period. In this example a falling edge can therefore occur at the end of time slot 8. It will be appreciated that symbol 2 has a data pulse duration of five time slots, as does symbol 7. Thus the data pulses of different symbols may be of equal duration but the symbols may be distinguished by the different rising edge and falling edges times within the transfer period. It will also be noted that the time of the rising edge and the falling edges of the data pulses vary from symbol to the symbol and are quantised to the time slots. A transmitter may therefore receive the input data streams, identify the current combination of input data and the corresponding symbol and generate a data pulse that corresponds to that symbol. A receiver may therefore receive the data pulse, identify the timing of the occurrence of the rising and falling edges within the transfer period and thus identify the relevant symbol and thus identify the combination of input data.

As used in this specification the term PLM (pulse length modulation) will be used to refer to this type of data encoding. It will, of course, be clear from the foregoing however that two symbols which encode different combinations of input data may have the same pulse duration and thus data is not encoded solely by pulse length (but also by pulse position within the transfer period) and thus the term PLM as used in this specification should be read accordingly.

Data Transmission

Component 201 of FIG. 2 is thus arranged to transmit data pulses encoded by the use of different symbols as described above. Component 201 therefore comprises a modulator for producing an appropriate symbol for the combined input data. The modulator receives the incoming data streams to be transmitted and may receive a master clock signal MCLK which can be used to determine the time slots for the symbols. The modulator may also receive a transfer clock signal TCLK (or may generate TCLK based on the master clock signal MCLK) which defines the transfer periods, i.e. which sets the symbol rate of the communication link. Each period of the transfer clock signal TCLK the modulator may determine the appropriate symbol to encode the then-current input data, for instance by consulting an appropriate look-up-table. Based on the required symbol, i.e. which symbol is identified with that data combination in the look-up-table, the modulator will then generate a data pulse with appropriate rising and falling edges, the timing of the rising and falling edges being determined by the master clock signal, MCLK. The modulator therefore acts as a pulse length modulation (PLM) modulator. It will of course be appreciated that the modulator may instead receive the transfer clock signal TCLK and generate the master clock signal MCLK, e.g. by some frequency multiplier or phase-lock loop circuitry, or receive some other clock signal and thence generate the transfer and master clock signals.

Note whilst the example above has discussed transmitting a data pulse encoding multiple 1 bit input data streams the same principles apply to multi-bit streams. Thus, for example, two 2-bit audio input streams could be received and encoded using 16 possible symbols.

Equally, depending on the number of different possible symbols that can be generated and the ratio of the transfer period to the sample period of the input data, multiple bits of data from a given data stream could be encoded in a given symbol. Thus a given data rate can be achieved by encoding multiple samples of an input data stream in a pulse stream at a reduced sample rate. In other words, two 1-bit input data streams could be encoded at a symbol rate at half the input data rate by encoding 2 bits from each respective input data stream in each symbol.

In general each symbol encodes multiple bits of information. As mentioned using a set of 16 different possible symbols allows 4-bits to be encoded per symbol. Thus one symbol will encode say 1101 and a different symbol will encode 0101. In this specification the term channel will be used to refer to data carried by a specific bit encoded by the symbol. Thus the data carried by the first bits of each symbol will be seen as one channel, the data carried by the second bit of each symbol will be seen as a second channel and so on. How the data in the channels corresponds to distinct data streams, i.e. data streams produced by or intended for a specific component such as an audio transducer may be defined according to the application. Thus in the example of transmitting stereo audio data the data stream for the right loudspeaker may be received and encoded as a separate channel, i.e. the symbols are selected so that the first bit say of the symbol payload encodes the right audio data. The left audio data may then encode a separate channel, thus the second bit of the symbol payload may encode the left audio data. Control data may be encoded as the fourth bit of each symbol. (Note the terms first and second are used for convenience only—any given receiver may decode the data in a different order or only decode the data relevant to it depending on how the decoding is performed, for instance a receiver for the right audio data may simply be provided with a look-up-table that indicates a first sub-set of the symbols indicates logic 1 for that receiver and a second sub-set of symbols indicates logic 0).

The data streams encoded by the pulse length modulation (PLM) modulator may themselves comprise individual data streams for more than one component. For instance two data streams could be merged into a single stream by alternating the data in a predefined way. The merged stream could be sent via one channel by the PLM modulator. A PLM receiver would decode the data from that channel to produce the merged data stream which could then be separated back into the individual data streams.

In some instances however an individual data stream could be encoded in more than one channel of the PLM data.

Frames

In some applications the data may be transmitted in frames. A frame is defined by a certain number of symbols. The use of frames can be beneficial for the purposes of control data as certain bits in the frame can be reserved for particular functions. In addition the use of frames can allow multi-bit coding of the data channels, i.e. data words of n-bits, where n>1, may be transmitted rather than just a 1-bit stream. Where the encoding protocol includes the use of frames there may be a frame synchronisation stage as will be described in more detail later.

The frames may comprise a set number of symbols, for instance 64 symbols. Thus if each symbol encodes four bits, this allows four channels, each of 64 bits per frame. As will be described below however a control channel may be bi-phase encoded so that there are actually only 32 bits of control data per frame. Typically the control data can be transmitted with a much lower data rate than the data channels so 64 bits per frame may not be necessary and the use of bi-phase encoding can be advantageous in terms of dc balance and frame synchronisation.

With bi-phase encoding each control bit comprises two 'half-bits' that are encoded by successive symbols. One possible bi-phase encoding is Manchester differential encoding. In Manchester Differential encoding one half bit is always logic 1 and the other half bit is logic 0, i.e. the two possible legal half-bit pairs are (1-0) and (0-1). Data is encoded by whether the first half bit of a half-bit pair maintains the same state as the last half-bit of the preceding pair or changes state. For example if the first half-bit of a half-bit pair changes state from the previous half bit, then that half-bit pair (i.e. control bit) may indicate logic 0. Thus the sequence (1-0) (1-0) where the last two bits are a half-bit pair indicates that half-bit pair is logic 0. Likewise (0-1) (0-1) also indicates that the second half-bit pair is logic 0. In this example if the first half-bit of a half-bit pair maintains the value of the previous half-bit then the pair indicates logic 1, i.e. for both (1-0) (0-1) or (0-1) (1-0) the second bit-pair encodes logic 1.

This bi-phase encoding scheme means that every legal half-bit pair contains individual half bits of logic 1 and logic 0. This advantageously provides DC balance for the lines carrying the half-bits and ensures that a long run of repetitions of the same symbol is not possible on the PLM data line. It also means that for valid data no more than two consecutive control half-bits can have the same data value. This means that a sequence of control data values having three instances of logic 1 as the decoded half-bit values is an illegal state for data transfer, i.e. the sequences 1-1-1 or 0-0-0 are not legal. Such an illegal state can however be used for frame synchronisation to indicate the beginning of a frame.

For the control channel the use of three half bits of the same logic state can thus be inserted at the beginning of every frame. Note that the first half bit of such a sequence could actually be the last half bit of the previous frame. Thus the start of each frame could begin with two half-bits of the same state, the state being chosen to match the state of the last half bit of the previous frame. The receiver will detect three half bits of the same state and will then know that the last two bits of such a sequence indicate the start of the frame. The receiver may maintain a count of received symbols and compare the actual count between detection of the illegal state, i.e. frame synch, with the expected number of symbols and generate an error signal if too many or too few symbols are detected.

By using Differential Manchester encoding as the bi-phase encoding scheme it is guaranteed that the last transition on the control data channel will be half way through the last bit in a frame. Consequently, as mentioned the illegal state providing the Frame Synch of one frame can overlap the last half bit, of the previous frame. In other words the last symbol in a frame can belong to both that frame, and the Frame Synch of the next frame. Unlike other bi-phase encoding schemes Differential Manchester never causes a Frame Synch jitter of one symbol regardless of the value of the last bit in a frame. Other bi-phase codings are known however, such as Manchester 1b2b and could be used in some implementations. In Manchester 1b2b encoding again each half bit pair always contains a 1 and a 0 with one of the two legal half-bit pairs indicating one state and the other indicating the other state. E.g. (0-1) may indicate logic 1 and (1-0) logic 0. This scheme also ensures a near 50:50 ratio of 1s and 0s and again three successive half-bits of the same logic state represents an illegal state and can be used for frame synchronisation.

As mentioned the use of frames can provide dedicated control fields within the frame. For example when used in a bus arrangement (as will be described in more detail later) with multiple receivers a control field may be used to indicate whether there is any valid data for a particular receiver. The control frame may also comprise an address field indicating a particular receiver.

For example with a frame of 64 symbols with control data bi-phase encoded there are 32 control bits per frame.

The first bit may, as described, be used for frame synchronisation and encodes an illegal bi-phase state. One control bit may be used as a BUSY bit which is asserted by the transmitter to indicate valid data is being transmitted. Some control bits may be used for addressing where there is more than one receiver that receives the data, i.e. specifying a fixed address for a receiver or using an address nibble. In a chained implementation as will be described later at least control bit may be reserved for a slave device to communicate to a master device. There may also be one or more bits reserved to indicate a register address.

In some embodiments data registers of a receiver may be read or write or both and so a transmitter can send or receive register data to a receiver by an appropriate register address selection using the control data. Certain address locations may be reserved to store optional device capability and manufacturer identification information.

A control frame may therefore include an instruction to read data from and/or write data to the control registers of a receiver. The receiver may decode and store the control data frame, determine whether the instruction is for that receiver and, if so, action the relevant instruction.

The frames can also be used for the data channels and allows data to be encoded using pulse code modulation (PCM) or similar techniques sending data words. Word synchronisation, i.e. identifying the most significant bits (MSBs) or least significant bits (LSBs), can be provided through synchronisation of the control frames.

Any number of any length words over any of the data channels may be sent up to a maximum of the frame length, i.e. the number of transfer clock periods in each frame, e.g. 64 bits in the example described above. Selection of the PCM word length and the number of channels may be controlled by a control register write to the appropriate device. For example one data channel could support 4 words of 16 bit PCM data using all 64 bits in the complete frame.

It should be noted that the data channels encoded by the various symbols can represent data which is encoded in different formats, i.e. at least some of the data channels may have different underlying encodings. For instance the various data channels could be PCM encoded with different word lengths, or some data channels could correspond to PCM encoded data and others to PDM encoded data. For example if three data channels of 64 bits per frame are available one PLM data channel may be used to send a PDM data signal, e.g. a Dolby Digital™ bit stream (at a data rate equal to the transfer period data rate—which may for example be $64f_s$ as described above). The other two PLM data channels could be used to send eight 16 bit PCM data streams via the other two PLM data channels.

As mentioned above different audio data streams may be sent over one PLM channel by interleaving symbols for the various data streams. For PDM encoded data streams the symbols may typically be interleaved in an alternating manner, i.e. two streams A and B may be transmitted by sending symbols encoding stream A alternating with symbols encoding stream B. For PCM encoded data the various words are typically alternated in the frames, i.e. a complete word for stream A may be sent followed by a complete word for stream B (although if desired the symbols of the words could be interleaved). It would also be possible to transmit n symbols encoding PDM data followed by m symbols encoding a PCM data word provided that n and m were known, fitted into a frame and allowed synchronisation within the frame.

As described above where the control data is encoded using Manchester Differential encoding or a similar bi-phase encoding scheme every legal half-bit pair contains individual half bits of logic 1 and logic 0. Thus the half-bits of the control data channel—which typically correspond to individual bits of a data channel—have approximately equal numbers of instances of logic 1 and logic 0 over time. In some embodiments the control channel half bits to be encoded by combined with the data stream for one or more data channels in an XOR operation before the data stream is encoded. In other words the incoming data streams and control data are received. The half-bit pair required to bi-phase encode the control data is determined. Each data bit is then XORed with the relevant control data bit before selecting an appropriate symbol. This ensures that any long run of 1s or 0s in the data stream are averaged to approximately a 50:50 ratio of logic 1 to logic 0. The data is recovered by decoding the symbol, identifying the value of the control half-bit and the bits for the data channels then a de-XOR operation is performed using the value of the control half-bit.

Transmitter

Figure 4:
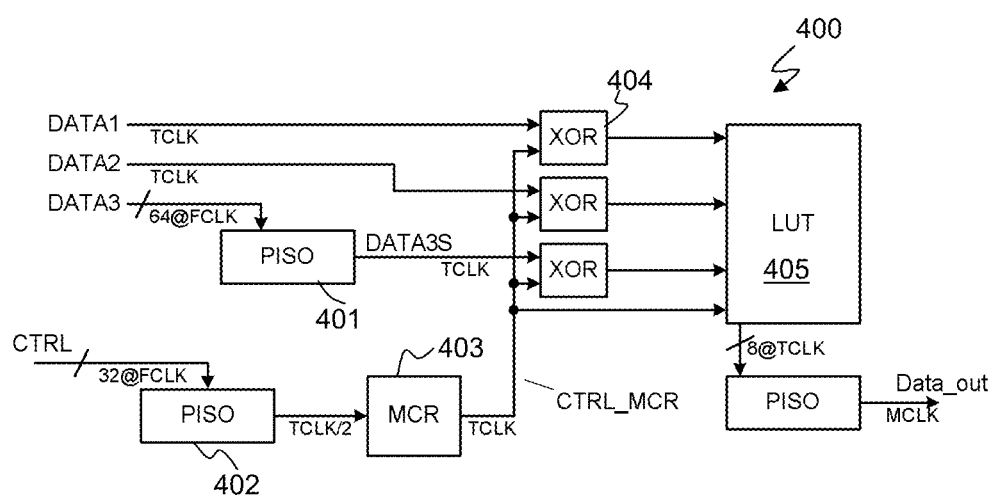
FIG. 4 illustrates one embodiment of suitable transmitter circuitry.
Figure 5:
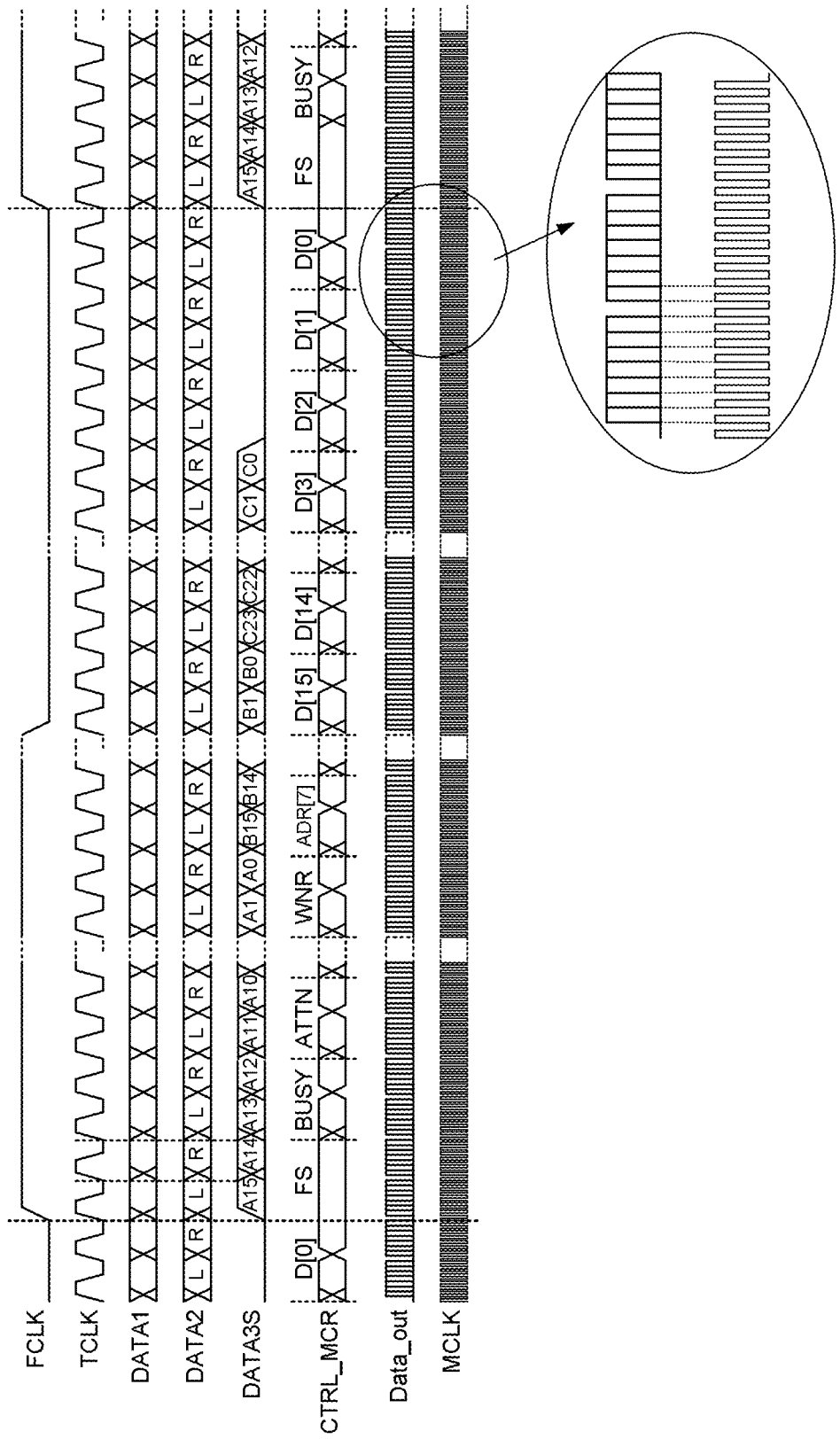
FIG. 5 illustrates the data waveforms on various signals lines of the embodiment shown in FIG. 4.

FIG. 4 illustrates one embodiment of transmitter circuitry 400 for receiving various input data streams of data bits, including a control data stream, and transmitting a PLM data stream in frames. The transmitter circuitry includes a pulse generator, responsive to the input digital data streams and to a first clock signal, to generate a single data pulse having a rising edge and a falling edge within each of a plurality of transfer periods defined by said first clock signal. As described above the time of occurrence of the rising edge and the falling edge of the data pulse encodes the then current data bits of said input digital data streams. FIG. 5 illustrates waveforms at various points in this circuitry.

The transmitter circuitry receives (or generates) a frame clock FCLK, a transfer clock TCLK and master clock MCLK. As described above the transfer clock TCLK defines the transfer period and the master clock MCLK defines the time slots within the transfer period. In this example there are eight time slots in the transfer period. The frame clock defines the frame and in this example one period of the frame clock is equal to 64 periods of the transfer clock.

The transmitter also receives audio data and, in the example waveforms, shown it receives three streams of audio data: DATA1, DATA2 and DATA3.

In this example DATA1 is a single-bit waveform at a sample rate equal to the frequency of the transfer clock, i.e. a sample rate of $f_{TCLK}$.

DATA2 in this example comprises both left and right-channel data in an interleaved 1-bit-PDM format, alternating between left and right, with the data synchronised to the frame clock FCLK, so that left data appears first in the frame.

The third data stream DATA3 received comprises three data streams: a stereo pair of 16-bit signals A[15:0] and B[15:0] and a single 24-bit signal C[123:0]. These last three streams are each sampled at a sample rate of $f_{FCLK}$ and may require conversion into a serial data stream DATA3S by the parallel-to-serial converter 401, or may be already in a suitable serial format. This third data stream DATA3 (or the converted serial data stream DATA3S) in this example uses 56 (for the two 16-bit and one 24-bit data streams) out of the 64 transfer periods in the frame. The remaining 8 data bits in each frame may thus be zero for this data channel or may be set to some dummy data pattern.

The transmitter 400 also receives various control bits for onward transmission, up to 31 bits per frame. These are serialised to a sample rate of $f_{TCLK}/2$ if necessary by parallel to serial converter 402, and Manchester encoded by bi-phase encoder 403 to provide a bi-phase encoded control data stream CTRL_MCR. Note the Differential Manchester encoding illustrated gives a transition in CTRL_MCR every alternate TCLK cycle for 31 out of the 32 such alternate clock cycles per frame. However the encoder forces no transition for the first transfer period in the frame. As noted above, this may be used by a receiver to synchronise the frame/control word and any multi-bit data.

As illustrated in FIG. 4, the data streams DATA1, DATA2, and DATA3S may each be input to a logic unit 404 to perform an XOR operation with the bi-phase control data CTRL_MCR. As mentioned above this can avoid long runs of zeros and/or push spectral energy away from low frequencies.

The modified data bits available in each transfer period are then used to define the rising and/or falling edge of the output stream. FIG. 4 illustrates the data bits being input into a look-up table 405, which provides a high or low level for each of the eight available cycles of master clock MCLK, to give a data stream sampled at MCLK rate comprising a single pulse within each transfer period, but with the timing of the rising and falling edges in each transfer period defined according to the entry in the look-up-table, or the like, corresponding to the set of data bits received.

Data Receiver

Referring back to FIG. 2, the receiver 202 receives the data pulses and decodes, i.e. extracts the data by determining when the rising and falling edges of the data pulse fall within the transfer period. This effectively identifies the relevant symbol and hence the data encoded.

In order for the receiver 202 to recover the data it needs to be able to identify the symbol that the data pulse corresponds to. The receiver thus typically determines the relevant time slots occupied by the PLM data pulse in the transfer period, i.e. when the relevant rising and falling edges lie.

In some embodiments the receiver establishes its own clock signals at the master clock rate MCLK and transfer clock rate TCLK. In some instances one clock signal, say the transfer clock signal TCLK, may be recovered from the modulated data signal and used to generate the other clock signal. The nature of the transmit protocol, advantageously ensures that there is a distinct data pulse with a rising and falling edge each transfer period, and only one data pulse per transfer period, which enables a clock signal to be reliably recovered using the data stream itself without requiring a separate clock signal. As there is only one pulse for each transfer period, a clock at the transfer clock rate TCLK and/or master clock rate MCLK can be established using known techniques, such as using phase locked loops and frequency division/multiplication. Having only one pulse for each transfer period is a particular advantage of the embodiments of the present invention. In other words the clock and a plurality of data channels are recoverably encoded for transmission over a single data link, i.e. wire, and the receiver can recover both a relevant clock signal and the encoded data from the recoverably encoded signal that is transmitted over the single link, thus advantageously avoiding the need to transmit a clock or clocks over an otherwise additional parallel link.

For correct clock recovery the receiver may therefore comprise a phase-locked loop (PLL) or frequency-locked-loop (FLL) circuit to generate a clock that has at least the speed of the master clock MCLK.

The protocol may involve an initial synchronisation period to recover the master clock signal, with the correct phase, from the received data pulses and also to ensure that the start/end of the transfer period is known.

The master clock signal may be recovered using the PLL/FLL and the phase adjusted so that the incoming data can be correctly strobed and the symbol length and rise and fall times can be correctly measured.

The receiver may then synchronise the transfer period so that the symbols can be correctly identified. This may involve determining the length of the data pulses in terms of numbers of time slots and/or the time between the end of one data pulse and start of the next and adjusting the possible start/end times of the transfer period to match permissible symbols and rule out any unused symbols. In essence once the master clock signal is established the timing of the various time slots is established. It is then necessary to identify the time slots which correspond to the start and/or end of the transfer period. In the example described above the end of the transfer period can coincide with the end of a data pulse and must be at least one time slot before the start of the next data pulse. The end of the transfer period may be hypothesised to coincide with the end of any time slot that matches these criteria and the hypothesis updated if any illegal symbols are detected—e.g. a data pulse running beyond the end of the hypothesised transfer period without a falling edge.

Figure 6:
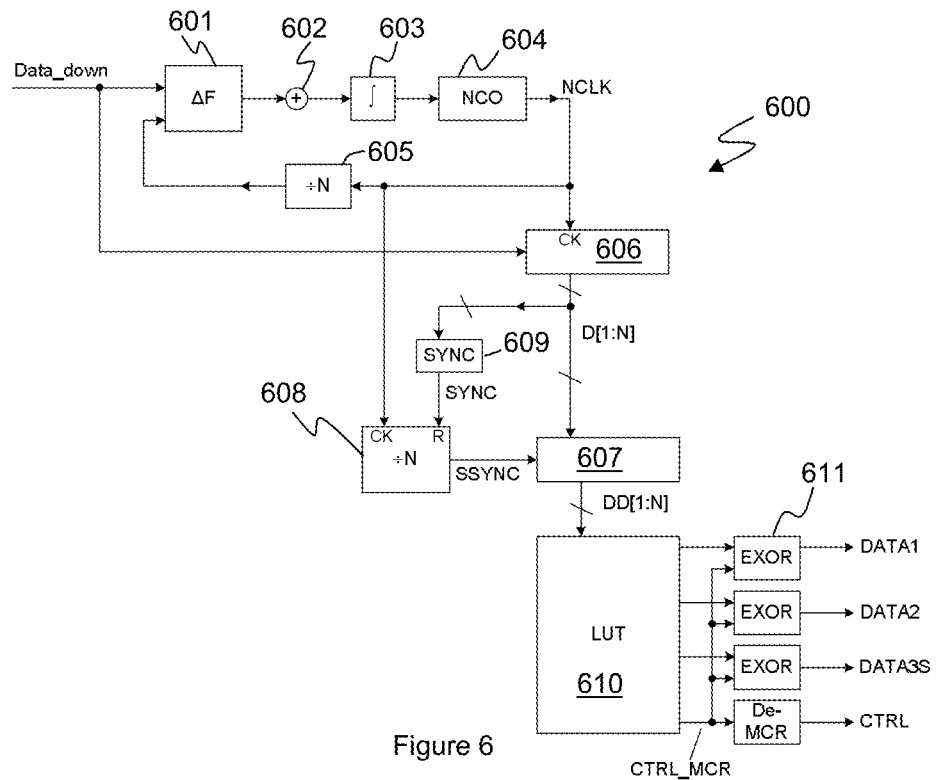
FIG. 6 illustrates one embodiment of suitable receiver circuitry.

FIG. 6 illustrates one embodiment of suitable receiver, i.e. data recovery, circuitry 600. The input data stream of reversibly encoded data pulses, Data_down, is input to frequency-locked-loop comprising frequency detector 601, adder 602, digital integrator 603, numerically controlled oscillator 604 and frequency divider 605. The frequency-locked-loop receives the incoming PLM data, Data_down, and generates a clock signal, NCLK, at N times the average incoming symbol rate, as detected by say every rising edge of the PLM data. These rising edges will occur at various times within the transfer period, so the apparent input frequency will vary from cycle to cycle, but the integration in the loop will slow down, and thus attenuate, any variation in output frequency, giving an output frequency and hence NCLK clock edge timing which is acceptably constant for recovering data.

The incoming PLM waveform is also received by a sampler 606 which is clocked by the derived clock NCLK and the resulting samples stored in shift register 607. The derived clock signal NCLK is related to the master clock signal and may be at the same frequency as the master clock MCLK, or may be a multiple thereof, say twice or four times the frequency to allow oversampling of the input stream, i.e. sampling more than once every MCLK period to make sure the data is correctly sampled.

The shift register contents, representing the pulse received in one transfer period, are then sampled in parallel once every transfer period $T_{TCLK}$, i.e. within every N NCLKs, according to an appropriately timed symbol sync pulse SSYNC. SSYNC may be generated by a divide-by-N counter 608 clocked by NCLK, and reset at the appropriate time by a synchronisation pulse SYNC from synchronisation unit 609.

The sampled pulse data is then fed into a look-up table 610 or equivalent logic processing to derive the payload data. Where, as described previously, the payload data was subject to an XOR combination with the control data prior to encoding, the data may be EXOR-ed in logic units 611 with the recovered Manchester-encoded control data to compensate. The Manchester-encoded control data CTRL_MCR may be processed to recover the control data in a non-Manchester format by bi-phase decoder 612. The data streams may be subject to further processing, for example to extra left and right 1-bit-PDM channel from a combined data stream or to extract one or more PCM-coded word combined together in a data stream, as previously discussed with relation to an example of a transmitter.

There are various possible methods to generate an appropriately timed synchronisation pulse SYNC. For instance the synchronisation process may rely on receiving one or more symbols transmitted with a unique duration. For example with the constraints set out above with an initial period of logic 0 in each transfer period and eight time slots there is only one symbol that can have a duration of 7 time slots, i.e. a data pulse comprising a period of logic 1 for seven time slots. Thus were such a symbol to be detected it would be apparent that the rising edge of the symbol must occur at the end of the first time slot of the transfer period and the falling edge must occur at the end of the transfer period. Likewise the set of symbols selected for use may, for instance include only one symbol with a duration equal to a certain number of time slots, say a duration of one time slot—and in which case the position of the rising and falling edges in the transfer period for a data pulse of one time slot duration will be unique. Synchronisation may therefore include transmitting a sequence consisting of such unique duration symbols to aid synchronisation and initial clock recovery.

Synchronisation may be performed at the start of a data transfer process and then it may be assumed that synchronisation is maintained during data transfer unless an illegal symbol is detected. Additionally or alternatively any symbols with a unique duration among the possible symbols (or alternatively or additionally a unique rising edge time or falling edge time) which happen to be transmitted during the data transfer process may be used to maintain synchronisation. In the event that an illegal symbol is detected the receiver may identify the received data as containing an error and request re-synchronisation and a resend of the data.

Rather than use a simple divide-by-N counter 608 to generate SSYNC, it may be preferable to use circuitry with some memory or hysteresis to avoid synchronisation being grossly upset by minor data errors. For instance if a SYNC pulse is detected and arrives later or earlier than expected, the counter contents may be incremented or decremented by only one bit so that the phase of the SSYNC pulse timing is adjusted by only one NCLK period at a time, rather than forcing an immediate reset and adjustment by possibly several NCLK periods, due to a possibly mistaken SYNC detection. If the SYNC pulse is detected as arriving only one NCLK period early or late, any apparent need for adjustment may be ignored. In some embodiments, for example those relying on transmission of particular symbols which may only occur sporadically, or to cope with data errors causing missing SYNC detection, no adjustment is made if no SYNC pulse occurs for a while, rather than this being regarded as a very late SYNC pulse occurrence.

Figure 7:
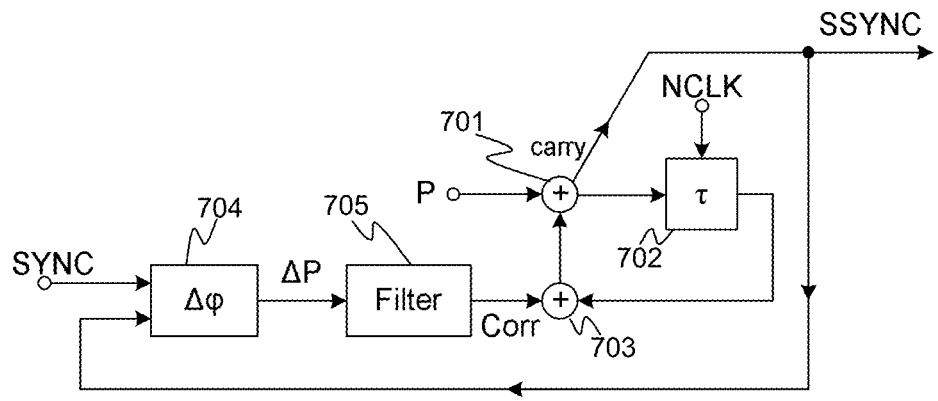
FIG. 7 illustrates an alternative arrangement for providing synchronisation in the receiver circuitry shown in FIG. 6.

FIG. 7 illustrates a possible implementation of a circuit to replace the counter 608 in FIG. 6. An adder 701 is arranged to add a predetermined number P to the output of 1/NCLK time delay 702 every NCLK period, thus incrementing the total by P every NCLK cycle and generating a carry pulse when the adder exceeds full-scale at the adder every Q/P NCLK periods, where Q is the full-scale of the adder. By appropriate choice of the value P relative to Q the carry pulse may be used as the SSYNC strobe pulse.

Adder 703 may add or subtract a further correction amount Corr from the current total, thus advancing or delaying the NCLK cycle at which full-scale is reached and thus the timing of the carry pulse generated. This correction amount Corr is generated by comparing the timing of each detected SYNC edge with a generated SSYNC pulse using phase detector 704. The phase detector output ΔP may be processed by filter block 705 before application to adder 703. For example ΔP may be low-pass or median filtered to provide a smoother input Corr to adder 703 or may be limited to say +/−1 as discussed above to limit the effect of spurious or missing SYNC detections.

The embodiment shown in FIG. 6 thus derives, in effect, the master clock and transfer clock from the received data signal. In some applications however the transfer clock may be transmitted on a separate link from the transmitter to the receiver. Transmitting the transfer clock does require an additional link, e.g. wire, but this may be acceptable in some applications and it does mean that clock recovery circuitry and synchronisation circuitry is not required in the receiver, thus simplifying the receiver interface. The receiver can then generate the master clock signal from the transfer clock.

In general the data receiver circuitry comprises an input for receiving a series of data pulses, and a sampler for sampling each received pulse within a transfer period defined by a first clock signal such that there is a single data pulse with a rising edge and a falling edge in each transfer period. The sampler is configured to provide an indication of which of a set of possible data symbols the data pulse corresponds to—based on the timing of the occurrence of both the rising and falling edges of the data pulse within the transfer period. Decoding circuitry generates at least one received digital data stream based on said indication of which data symbol the received pulse corresponds to. Given that multiple data channels are encoded in each symbol for any individual channel a plurality of symbols will indicate logic 1 and a plurality of other symbols will indicate logic 0. The decoding circuitry is therefore configured such that a plurality of possible data symbols may be decoded as the same value of a data bit of a received digital data stream.

Symbol Set Selection

As mentioned above using eight time slots per transfer period may allow 28 different symbols to be defined. However, as discussed, not all symbols may be required in use in some applications, for instance if encoding 4 bits of data. Therefore some symbols may be used as duplicates for particular data encoding (i.e. a particular data value, say 1101, may be encoded by two or more possible symbols) or some symbols may not be used at all.

In one embodiment from the set of 28 possible symbols (using eight time slots—other numbers of symbols would be possible with different numbers of time slots) a minimum set of 16 different symbols may be selected to encode the 4 bits of payload. As mentioned some symbols may be unused symbols and removed from the chosen set.

In one embodiment symbols that have both rising and falling edges falling in the same half of the transfer period are not used so as to reduce the jitter of the symbol patterns that are input to the clock and data recovery circuit. In other words the pulse generator may be configured such that the rising or falling edge at the start of the data pulse occurs no later than half way through the transfer period and the rising or falling edge at the end of the data pulse occurs substantially no earlier than half way through the transfer period. The middle column in FIG. 3 illustrates the remaining symbols with this constraint added. This leaves 19 possible symbols. For 4-bit encoding a further three possible symbols may be left unused although as mentioned some symbols may be used as duplicates.

A total of 17 symbols may be selected as illustrated in the right hand column of FIG. 3. In one embodiment symbols 0 and 16 in FIG. 3, i.e. the symbols illustrated at the top and the bottom of the right hand column, are chosen to be duplicate symbols for the same digital code value. As mentioned previously such symbols as 0 and 16 may be reserved for timing purposes and may thus be regarded as 'special' Synch symbols—they have known fixed position within the symbol timing window (because symbol 0 is the only possible symbol with a data pulse duration of 7 time slots and symbol 16 has been selected to be the only symbol used with a duration of 1 time slot). The use of such unique symbols therefore facilitates symbol synchronisation. Additionally because they have minimum and maximum DC values, they may be used to control average DC value of the bus, i.e. data link, by control of their selection as required.

The DC value of the bus varies with symbols used, but can be controlled by selecting appropriate use of the equivalent value 0 and 16 symbols using a simple DC level monitoring circuit.

Figure 8:
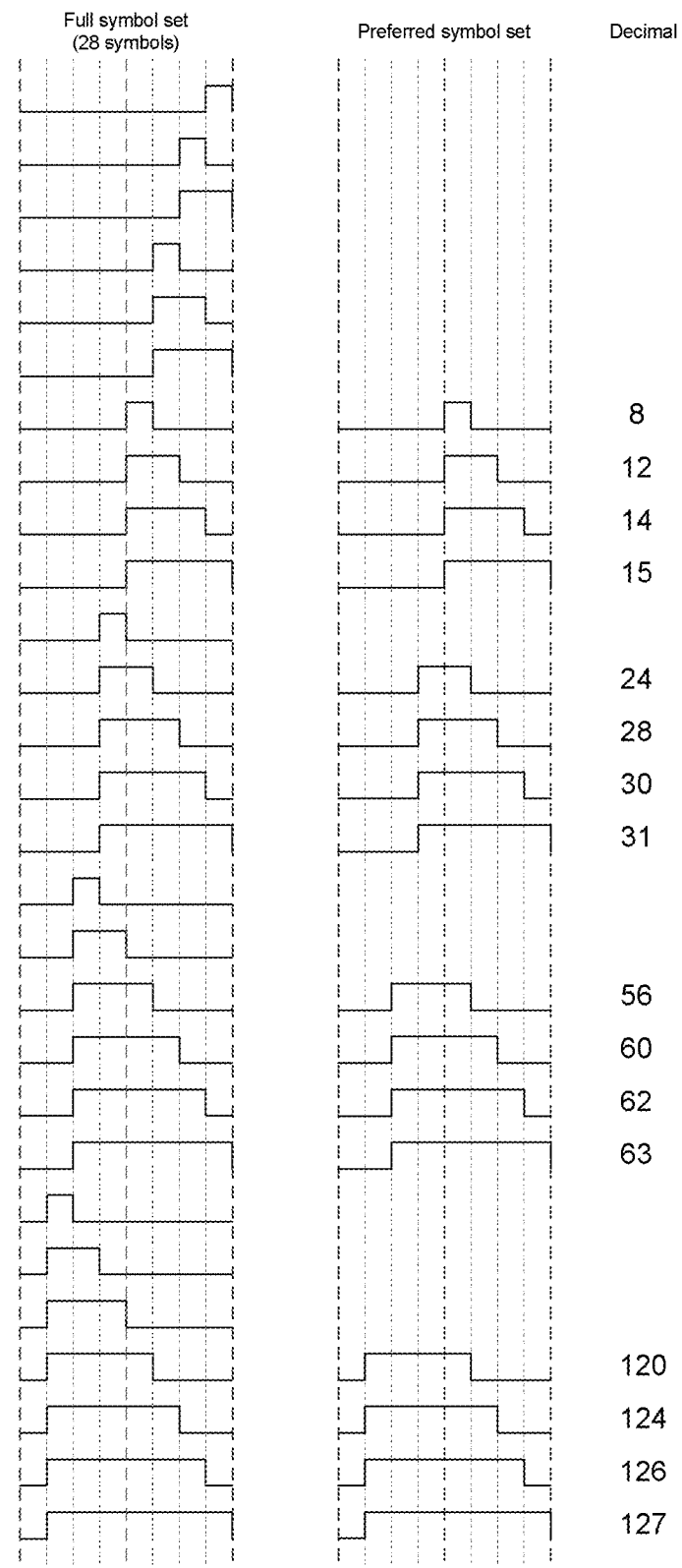
FIG. 8 illustrates a set of symbols used in one embodiment.

Other symbols sets may be chosen however which optimise various aspects of the data transfer performance such as minimising any DC imbalance on the PLM data line. As mentioned the symbol set used may be selected with a view to reducing jitter. FIG. 8 illustrates an alternative symbol set using just 16 symbols.

Point-to-Point/Multi Point Implementation

Embodiments of the present invention can be used for one-way point-to-point data transfer from a transmitter device to a receiving device as shown in FIG. 2. Two-way, i.e. bi-directional, data transfer could also be implemented with separate transmitters and receivers. In this implementation each may use its own master clock.

Such a bi-directional link could be used to transfer multiple data streams, e.g. left and right audio data, over a single wire to a peripheral device such as a headset or the like where the data streams can be decoded locally and provided to the appropriate components i.e. transducers.

Figure 2B:
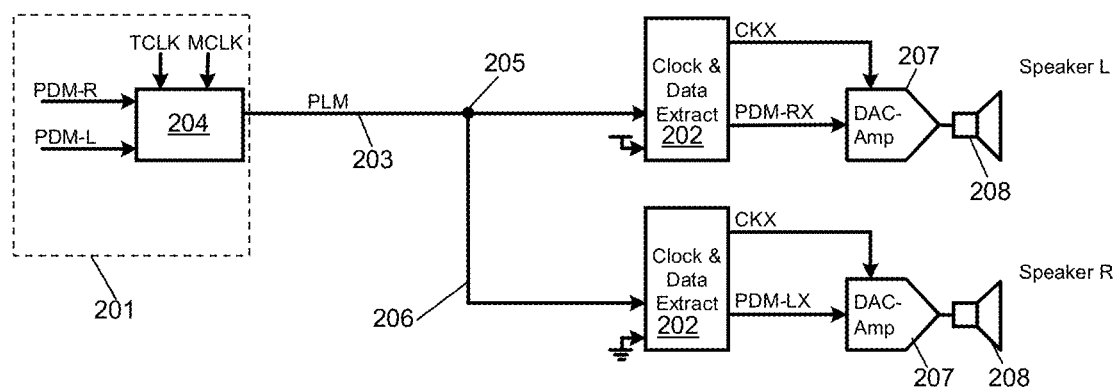

In some embodiments the PLM signal may be split into two or more signals before decoding such as illustrated in FIG. 2b. FIG. 2b shows a transmitter 201 having a modulator 204 such as described above transmitting a PLM signal to two receivers 202. Most of the PLM signal is transmitted over a single link 203 but at some point 205 the PLM signal is tapped 206 so that both receivers 202 are provided with a version of the PLM signal. FIG. 2b thus shows separate receivers 202 for two audio components, each associated with a DAC-amplifier 207 and speaker 208. In a device having internal stereo speakers the speakers may typically be separated and arranged to receive signals from an audio source such as codec and thus the arrangement shown in FIG. 2b may be preferred. In this case the receivers may be integrated with the respective DAC-amplifier.

The extract circuitry of each separate receiver may receive a logic signal to denote whether to use left or right channel data. In FIG. 2b this is shown as a pin which is pulled high (V) or low (GND). In other embodiments this logic signal may be derived from some non-volatile memory or circuit link that is programmed during chip manufacture and test, or by designing different left- and right-channel variants of the circuitry, for instance the left-channel may be co-integrated with other circuitry, whereas the right-channel may be some separate simpler device, expected to be located at some distance.

Bus Implementation

In one embodiment however devices may be arranged in chain configuration as illustrated in FIG. 9. As shown in FIG. 9 there may be a master device 901 which acts as a bus master.

Figure 9A:
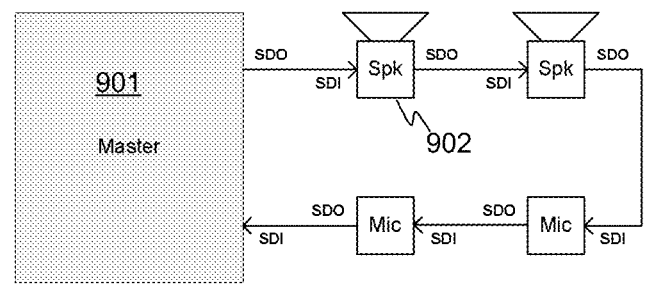
FIGS. 9a and 9b illustrate embodiments of the invention arranged as a chain of audio components.

In one embodiment, such as shown in FIG. 9a each device has two pins—PLM receive (alternatively termed PLM-down or just Data-in) and PLM transmit (alternatively termed PLM-up or just Data-out). The bus master transmits data for the devices on the chain to the first slave 902 in the chain by transmitting appropriately encoded symbols using the protocol described above. This first slave will receive the PLM data stream, and recover the master clock signal from the data. The first slave will also determine the appropriate symbol and decode the data. The first slave will then re-encode the data (with any modifications as necessary—for instance updating an address nibble field) using the recovered master clock signal and transmit an appropriate symbol to the next device in the chain. Each slave will recover the master clock signal, decode the data, modify as appropriate and re-encode the data until the data is returned to the bus master.

Typically if a device in the chain is disabled it must still decode and re-transmit the incoming stream, updating the address field appropriately. Thus each device in the chain will add at least one transfer period in latency to the chain. In other words the slave must receive the symbol and decode the data and re-encode the data during a subsequent transfer period.

However in some embodiments if a particular slave is not being used at all a bypass may be enabled where the data pulses are simply retransmitted before being decoded. This avoids introducing any delay other than an inevitable small propagation delay. Activation and deactivation of bypass mode may be implemented via some other control link or via the standard control frame. If each receiver has a fixed address then the control frame may be used to instruct a receiver to enter bypass mode without any impact on the addressing of subsequent receivers. In which case the bypassed receiver may forward the symbol without any modification but subsequently decode it to read the control frame information (the clock recovery circuits will also thus continue to operate to maintain frequency lock and synchronisation). Alternatively bypass may be enabled at bus initialisation stage and only rescinded by re-initialising the bus, in which case a bypassed device may effectively be disabled until the bus is re-initialised.

Figure 9B:
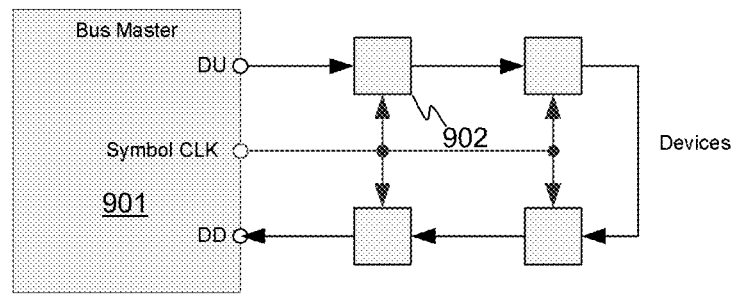

In other embodiments however the symbol clock, i.e. the transfer clock signal, may be provided to at least some of the slave devices directly as indicated in FIG. 9b. In this embodiment the devices may have three pins: Data-in, data-out and clock (which is clock-out for the master and clock-in for the slaves). The slaves can generate the master clock signal from the transfer clock signal as described above.

In this embodiment there is a single bus, i.e. link, for data transfer in one direction which returns to the bus master. In other embodiments however there could be two buses for passing data in opposite directions with an appropriate bus master at the relevant end of each bus.

The chain topology facilitates 'consume and replace' functionality Channels can be reused if a consuming device (e.g. a speaker driver which pulls data off the interface) is placed before a generating device (e.g. a microphone which pushes data onto the interface) in the chain.

Figure 10A:
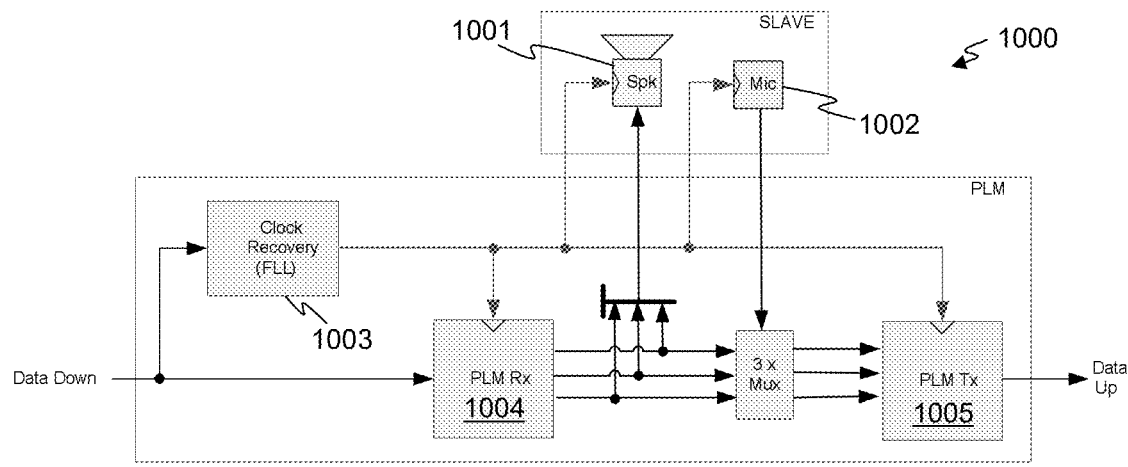
FIGS. 10a and 10b show examples of slave device configurations.

FIG. 10a illustrates an example of a configuration of a slave device 1000 that is both a consumer or sink of audio data, i.e. has a speaker 1001, and acts as a generator or source of audio data from a microphone 1002. The PLM data down signal is received from the previous device in the chain which may the bus master or a preceding slave device. The PLM data signal is received by clock recovery circuitry 1003 to generate a master clock signal as described above. A PLM decoder 1004 then decodes the data in each of the data channels and the control channel (if present). If one of the data channels, say data channel 2, contains audio data for driving the speaker 1001 of that slave device the relevant audio data may be extracted and used to drive the speaker.

The audio data on the other channels, e.g. data channels 1 and 3 is passed to the PLM transmitter 1005 for re-encoding. The relevant data channel used for that slave device may have been communicated previously via suitable control data or it may be predefined.

Figure 10B:
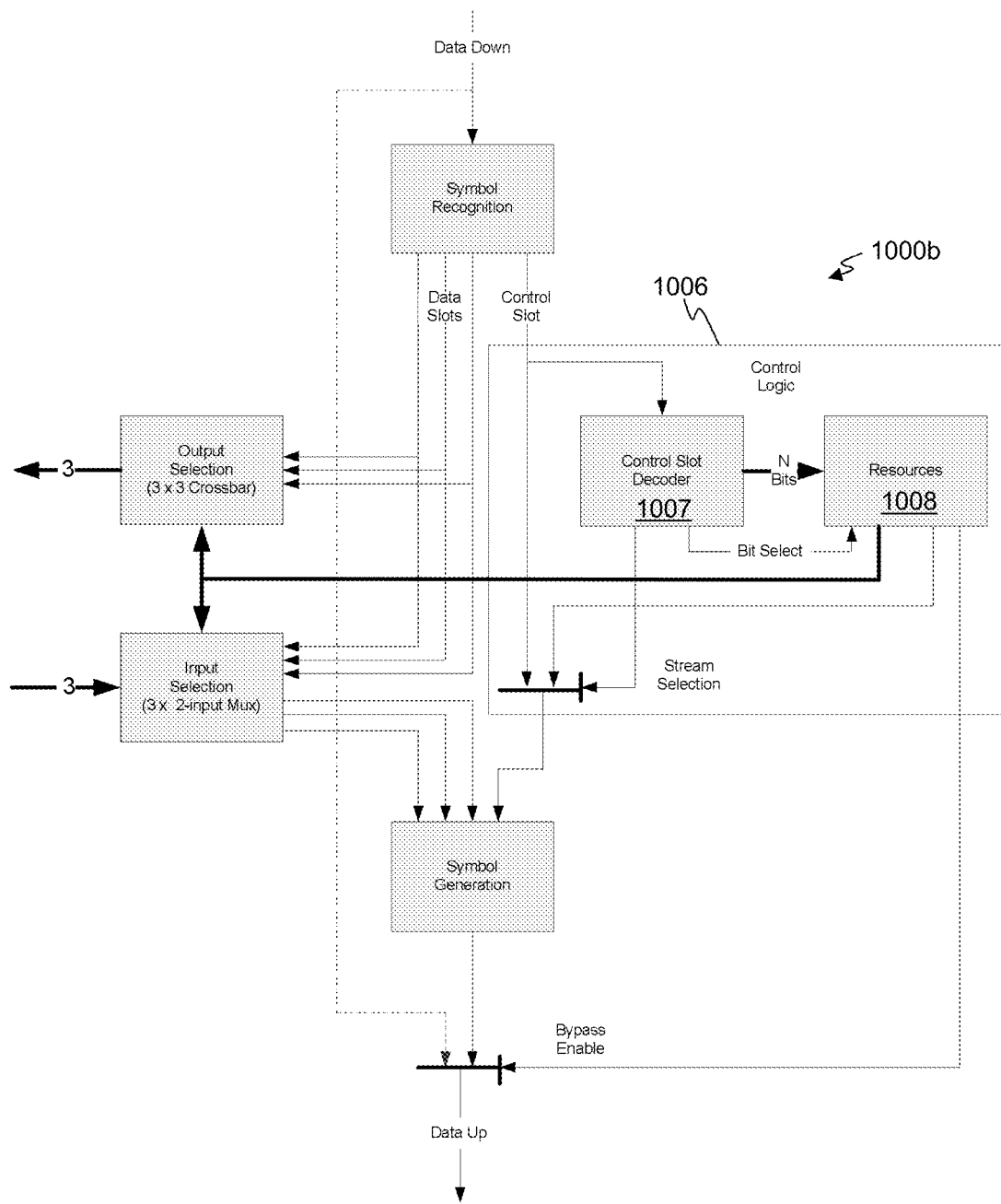

Data from the microphone 1002 may also be used to encode audio data for onward transmission to the next device in the chain. The audio data may be encoded on any space on any of the data channels. In this example data channel 2 is used to transmit data to the speaker of the slave device and thus may be free for use to encode the microphone data. The PLM transmitter thus encodes the data from data channels 1 and 3 together with the data on channel 2 from the microphone and any control data and generates an appropriate symbol for onward transmission. FIG. 10b illustrates another embodiment of a slave device 1000b that illustrates the control data processing and thus includes control logic 1006 including a control slot decoder 1007 and resources 1008 for controlling operation of the audio component based on the control data.

In order for the bus master to communicate with the various slave devices the slave devices are given addresses. In one embodiment the master may be arranged to be address 0. Slave device addresses may be incremented by one for each subsequent device on the bus. The address can be carried in a nibble (4 bits) in a byte (8 bits) of the 32 bit control word described above. Up to 15 devices can be addressed in this way using the embodiments described above.

The control frame may include a BUSY bit field which the master can use to indicate that the frame contains valid data. If the BUSY bit is asserted then the control data in the frame is not altered (apart from possibly an address nibble field or the attention bit ATTN discussed below). If a slave recognises that the BUSY bit is de-asserted it is free to provide data in that frame. If a slave does use a frame and adds data it can assert the BUSY bit so that the data is not overwritten by a subsequent slave in the chain.

The control frame may also comprise an attention bit field ATTN which a slave can use to get the attention of the master. In one embodiment only one slave at a time can assert the attention bit, in which it may also add some data such as its address and maybe an error code (in which case it also asserts the BUSY bit to ensure such data is delivered to the master). Thus a slave must wait for a frame where the attention bit has not been asserted by a previous slave (and, in order to transmit data, such a frame where the BUSY bit is not asserted). This means that earlier slave devices in the chain effectively enjoy higher priority and the master should preferably include regular frames without the BUSY bit asserted. In another embodiment any slave can assert the attention bit at any time. The master, on detecting the attention bit has been asserted will poll the slaves to find out which slaves require attention.

The control frame may also comprise a command bit field CMD. Its purpose is to allow the Master to send a "command" to a Slave, either individually or in a broadcast fashion. The "command" may be encapsulated in those control bits that follow the Slave Address bits in the frame, e.g. D[15:0]. When the CMD bit is asserted, the "command" must be treated as an instruction by each slave. Bus critical "commands" like "bus reset" benefit from the added protection of a wide instruction decode, prior to execution.

The master typically is the bus clock master and devices may recover a clock from the bus as discussed previously. A bus master has the MCLK available so no clock recovery is required. However data recovery may require allowance for uncertainty in the total propagation delay along the chain.

As previously discussed there may be three levels of synchronisation in the system: MCLK frequency and phase lock; symbol (phase); and frame.

Bus Initialisation

Bus initialisation typically involves a series of synchronisation steps. Initially each source of audio data on the bus will be deactivated from transmitting—i.e. in the off state each device transmits zero.

To start the synchronisation process the master may synchronise with the first slave device on the bus using the synchronisation process described above. Thus the master may send a sequence of synchronisation symbols onto the bus to initialise clock recovery circuitry.

Once the first device in the chain has locked onto the incoming data stream and attained bit and symbol synchronisation it will start transmitting the same sequence to the next device in the chain.

When the master receives this sequence from the last device in the chain it is then aware that the chain has successfully synchronised. At this point data transmission can commence.

A timeout may be used to prevent lock-up should there be a synchronisation error.

During initialisation a device must receive a number of alternating synchronisation symbols before it starts transmitting.

Initialisation time from a cold start is likely to be dominated by the time to frequency lock of the clock multiplier used to recover MCLK in devices.

Slave Device Address Enumeration and Addressing

In some embodiments each slave device is given an address based on its position on the bus. Thus initially during reset the slave devices may set their slave addresses to a known value, such as zero, which is not a valid slave address, e.g. it may be reserved for the bus master. After the Master has received confirmation of 'Bus Initialisation', it may then assign an address to each Slave via the control channel.

In one embodiment the bus master may transmit a frame with a BUSY bit set zero and a slave address nibble field set for the target slave. An ATTN bit, which is used by a slave device to flag a status to the master is also set to zero. The master then waits for this frame to be returned, with the BUSY and ATTN bits set to one before transmitting another such frame.

Each slave address, on start up or reset will have an initial address set to a forbidden value such as zero. In such a state it may be able only to propagate data that it receives and can do nothing else until given an address by the master.

The slave device thus waits until it receives a frame with the BUSY bit set to zero and the ATTN bit also set to zero (indicating no previous slave has made use of the address data). When such a frame is received the relevant slave consumes the address field data as its own address and then retransmits the frame with the BUSY and ATTN bits set. All subsequent slave devices will simply retransmit this frame which will thus be passed back to the master.

In some embodiments, the Slave may insert information about its capabilities into the frame it transmits. This capability "signature" may comprise a manufacturer or device type identifier and indicators as to whether the Slave can for example recognise PCM or multiplexed stereo data, whether it has a sleep mode, how many channels of input or output data it can accept or deliver etc.

In this way all slave devices on the bus can be set up with a unique address.

Once the bus has been enumerated and each Slave knows its address, the address space may be used to identify payload destination. If implemented as an addressable register, a Slave can be re-enumerated by the Master at any point by writing zeroes to the Slave Address Register and then assigning the address. An obvious restriction is that all addresses assigned by the Master must be unique for each Slave, and must, in such an embodiment, have a non-zero value.

Crash Recovery

If any of the devices in the chain detect an invalid signal bit or symbol it may be assumed that synchronisation has been lost. The relevant slave device needs to notify the bus master that synchronisation has been lost. In one embodiment each slave device receiving an invalid symbol may simply propagate that symbol to the next device so it is received back at the bus master. The relevant slave may also assert an ATTN attention bit in the control frame as discussed above.

When the master detects the invalid symbol or an incorrect slave address or the like it may initiate a crash recovery procedure. This may involve the master attempting to read status information from each of the slave devices. The master may re-initialise the bus using the same synchronisation steps as described previously. However the master may only re-initialise the bus after a certain number of errors are detected and if the error is in an audio data stream it may simply be ignored (as the corrupted audio data may not be readily replaced).

It should be noted that frequency lock is maintained during a crash condition therefore recovery is rapid. (PLLs should be designed to 'hold' frequency during crash), Error Detection Worst case link failure is anticipated to cause loss of one complete 64 symbol frame. This is the same magnitude of failure as a single failure on a bus such as I2S or HDA link.

Embodiments of the present invention may thus use a pulse length modulation (PLM) protocol to combine multiple data streams, e.g. multiple audio streams and/or control data into a single PLM stream, i.e. the data pulses recoverably encoding the data, at a PLM data frequency (i.e. transfer period clock rate), which may be a multiple of the underlying audio data frequency, for instance 64, 128 or 256 times the audio data frequency. Both clock and data are embedded into the symbol stream and may be transmitted on a single link, e.g. a single wire or single bus. The physical interface is thus simpler than many known transfer protocols and the protocol allows multiple data streams to be transmitted at a high data rate. As the data can be transmitted with an underlying PDM encoding the latency in data transfer is very low which may be particularly useful for applications such as ambient noise cancellation when the time allowed to receive audio data, apply appropriate processing, and transmit appropriate cancellation data is very short. The data streams transmitted may be oversampled data streams, i.e. data streams at sample rates which are significantly higher than the underlying audio sample rate. For instance with 48 kHz underlying audio sample rate the data streams may correspond to an oversampled data rate of at least 700 ks/s or at least 3 Ms/s.

The clock is effectively sent as the symbol rate. As mentioned this may be a multiple of the input sample rate, e.g. 64 time the audio sample rate (fs) for a 48 kHz audio sample rate.

The data is sent encoded by the pulse length and position in the transfer period, i.e. by the selection of the symbol. 4 bits may be sent per symbol, e.g. 3 data bits and 1 control bit (or in some embodiments the control data may be bi-phase encoded as will be described so there is only a half bit for the control channel per symbol), using 8 possible clock edges. For a symbol frequency of 3.072 MHz this requires a clock for generation of the symbols of around 24.576 MHz.

A symbol has one rising and one falling edge. Power consumption and EMI characteristics of the bus are therefore dominated by a fixed edge (symbol) rate (typically therefore 3.072 MHz).

The protocol may be implemented on a single wire bus. In one embodiment there are 3 data channels per bus supporting up to 3×64fs PDM channels per bus (more PDM channels at reduced rate can be supported by interleaving across alternate symbols if required).

There may additionally be one control channel per bus.

In general the embodiments of the invention enable transfer of multiple data streams of encoded data over a single wire link which allows clock recovery by receiving devices. Embodiments may also provide both encoded clock and data on a single wire. Embodiments support PDM and PCM data streams, such as audio data streams, and/or control data. In a bus implementation there may be simple address enumeration due to a chain topology and a simple physical interface—one digital output and one digital input per master or device so 2 pins. There may be, in some implementations up to one master and 15 devices on a bus.

Fixed Rising/Falling Edge

The embodiments described above modulate the time of the rising edge and the falling edge of the data pulse in the data transfer period to provide the set of possible symbols to encode the data. In an alternative aspect however the symbol set may be constrained so that one of the rising edge or falling edge always occurs at the same time in the transfer period. This additional constraint reduces the number of possible symbols (for a given number of time slots) but makes clock recovery more straightforward. For example consider the use of eight time slots in a transfer period, if the set of possible symbols is constrained to include only those symbols where the rising edge is at the end of the first time slot (to ensure a gap between data pulses) there are only seven possible symbol lengths available. In this embodiment as the position of the rising edge in the transfer period is fixed the data is encoded through the duration or length of the data pulse. This means that the time between the rising edges (or falling edges) of successive data pulses are always separated by a period equal to the transfer period, i.e. the rising (or falling) edges can be used more directly as a clock signal a frequency equal to the transfer clock frequency. This can simplify clock recovery and there is no need to synchronise to a transfer period (in effect the fixed rising or falling edge of a data pulse defines the start of a transfer period).

In this embodiment, referring back to FIGS. 2 and 2b, audio interface circuitry of the first component 201 has a pulse-length-modulation (PLM) modulator 204 which receives audio data input data, PDM-R and PDM-L, for the left and right audio channels. In this example the L/R input data are separate 1-bit (i.e. PDM) digital input data streams for each channel, i.e. left channel and right channel. At regular intervals, for instance in each period of a first clock signal or transfer clock signal TCLK (which preferably matches the sample rate of the L/R 1-bit audio data input) the PLM modulator generates a data pulse with a length that depends on the logical combination of L/R input audio data. For left and right 1-bit audio data inputs there are four possible combinations of input data and the PLM modulator 204 generates a data pulse having a length (i.e. duration) which varies according to the output of the particular L/R input data combination, as illustrated in table 2 below.

TABLE 2

| PDM-L Value | PDM-R Value | PDM Combined value | Pulse length ($T_{MCLK}$) |
|---|---|---|---|
| 0 | 0 | 00 | 1 |
| 0 | 1 | 01 | 2 |
| 1 | 0 | 10 | 3 |
| 1 | 1 | 11 | 4 |

As described above the pulse length is preferably determined as a multiple of a clock period of a second clock signal, or master clock signal, MCLK, which has a frequency which is a multiple of the transfer clock signal TCLK. It will be clear that the frequency of the master clock signal MCLK should be at least four times the frequency of the transfer clock signal TCLK and is preferably at least five times the frequency of the transfer clock signal TCLK to allow for a pulse length of $4T_{MCLK}$ within each period of the transfer clock signal TCLK and also allow a gap between pulses to ease downstream clock recovery. In other words with five time slots the maximum pulse duration is at least one time slot less than the transfer clock period to allow at least one time slot gap between successive pulses.

Figure 11:
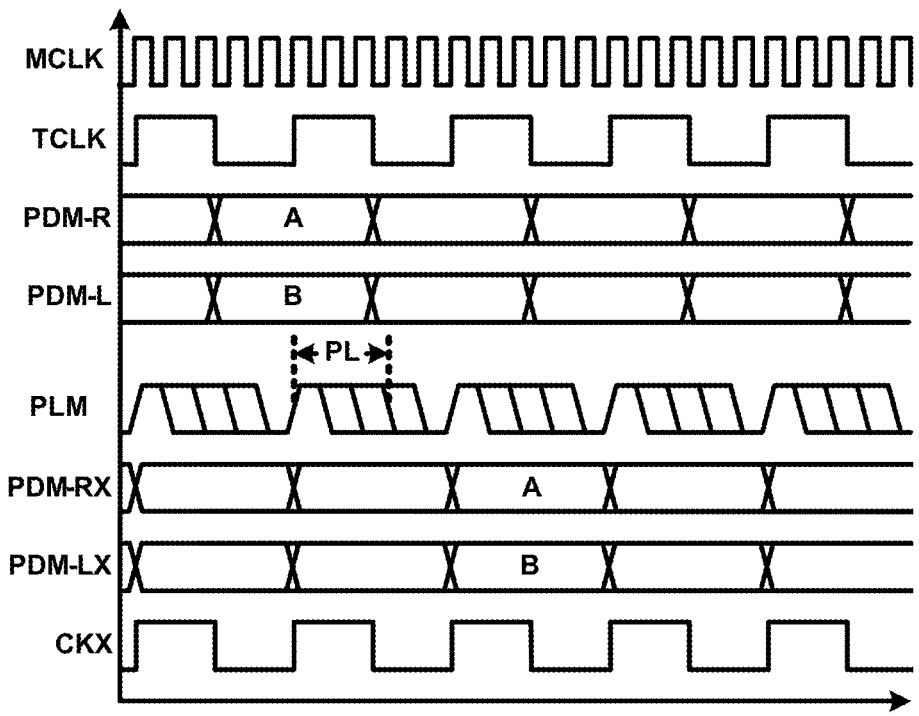
FIG. 11 illustrates example data waveforms on the various signal lines of the embodiment illustrated in FIG. 2b when using a fixed rising edge.

FIG. 11 illustrates the transfer clock signal TCLK and master clock signal MCLK, which in this example has a frequency five times that of the transfer clock signal TCLK.

FIG. 3 also illustrates that in each period of the transfer clock signal TCLK the right and left input data streams PDM-L and PDM-R will each have a data value of 1 or 0 depending on their respective current data i.e. logic levels. The resulting PLM data signal (PLM), generated to represent a logical combination of L/R input audio data as per table 1, is also illustrated. This comprises a series of data pulses, at the frequency of the transfer clock signal TCLK, where the length of each individual data pulse encodes a data value for the left audio channel and also a data value for the right audio channel.

It will be noted that there is always one data pulse per period of the transfer clock signal TCLK and that the data pulses are arranged so that there is always a gap between data pulses. This means that the PLM data signal can itself be used to recover the transfer clock signal TCLK by the receiving interface circuitry. In the example shown, the rising edges of the clock signal are separated by the clock period but the skilled person will appreciate that the falling edges could instead be synchronised to the transfer clock signal TCLK.

The receiver can extract the transfer clock signal TCLK from the PLM data signal. As mentioned above the period between the rising (or alternatively the falling) edge of each data pulse indicates the first clock period. Each receiver then determines the length of each data pulse and uses this to determine the relevant audio data for the appropriate device. From table 2 above it can be seen that pulse lengths of 1 or 2 times the master clock period indicate a data value of 0 for the left channel and pulse lengths of 3 or 4 times the master clock period indicate data 1 for the right audio channel Given that the master clock signal frequency $f_{MCLK}$ is a known multiple of the transfer clock signal TCLK frequency flux the relevant length of the data pulse can therefore be determined.

Each receiver therefore derives a version of the transfer clock signal TCLK and a digital data signal for the relevant audio channel. The digital data signals may, for instance, be a 1-bit PDM signal but it will be appreciated that other formats are possible.

The transmitter 201 is therefore a PLM encoder for receiving data and producing a PLM data signal encoding such data. The receiver 202 is a PLM decoder which receives the PLM data signal and decodes the signal.

FIG. 11 illustrates that the data signals PDM-RX and PDM-LX, respectively extracted by the receivers 202 are the same as the respective input data PDM-R and PDM-L.

This embodiment of the present invention therefore supplies simultaneous audio data for multiple audio channels using only a single communication link, i.e. a single data wire, without requiring any clock signals to be sent.

Figure 12:
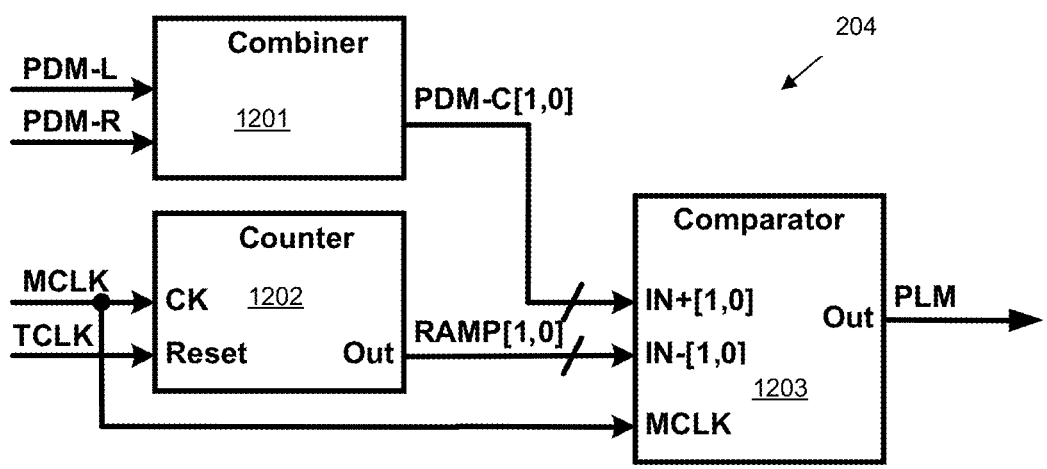
FIG. 12 illustrates one embodiment of a suitable audio transmitter for the embodiment shown in FIG. 11.

FIG. 12 illustrates one example of a suitable PLM modulator 204, i.e. a PLM encoder, that may be used as part of an audio interface transmitting data pulses with fixed rising edges. As illustrated the PLM modulator has a combiner 1201 that receives the two input 1-bit data streams, PDM-L and PDM-R. The combiner 1201 converts the input data to a 2-bit combined data stream PDM-C (as described above in relation to table 2). A counter 1202 is also arranged to receive the transfer and master clock signals TCLK and MCLK respectively. The master clock signal MCLK is arranged to clock the counter to increment and the transfer clock signal TCLK is provided at the reset input. Thus each period of the transfer clock signal TCLK the counter will increment at the rate of the master clock signal MCLK. The output is thus is a sawtooth ramp waveform that is reset to zero at the start of each period of the transfer clock signal TCLK (or alternatively the counter could be arranged to count down from a certain starting level each period).

The output of the combiner 1201 and counter 1202 is compared by comparator 1203 which is clocked at the second clock frequency MCLK, and is configured to give a high output if RAMP is greater than the combined signal PDM-C. At the first relevant (e.g. rising) clock edge of MCLK after the counter has reset, the RAMP signal will be zero, and the combined signal will be zero or greater, so the output of the comparator goes high at the beginning of the first relevant edge of MCLK in each period of the transfer clock signal TCLK. At successive MCLK edges, the RAMP signal will have increased: the comparator output goes low when the ramp signal has exceeded the combined data value. This results in a data pulse where the rising edge is synchronised to the transfer clock signal TCLK (i.e. the rising edge of each data pulse occurs at the first relevant MCLK edge after the rising edge of the TCLK clock signal) and the pulse length depends on the combined data value. It will of course be appreciated that the comparator could be arranged so that the output goes low at the start of the clock period and goes high only as a result of the comparison to synchronise the falling edges of the data pulses.

Figure 13:
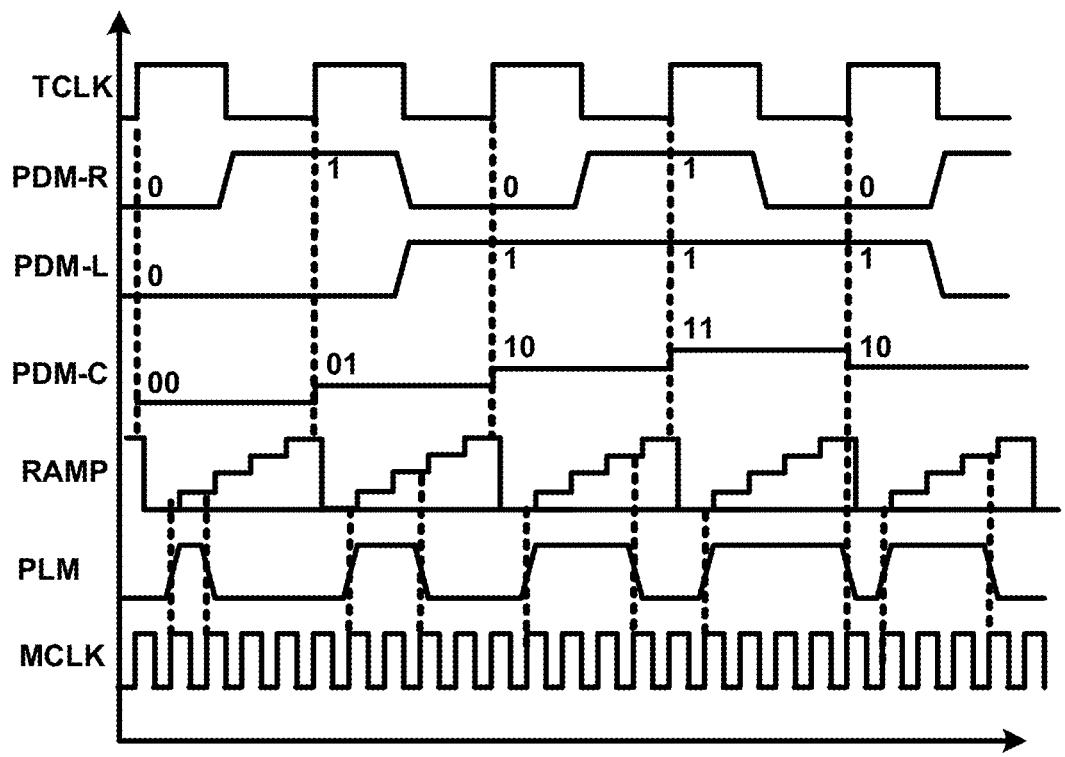
FIG. 13 illustrates example waveforms on the various signal lines of the transmitter embodiment illustrated in FIG. 12.

FIG. 13 illustrates the various data waveforms and shows how the comparison of the combined data value PDM-C with the ramp signal can generate the PLM data signal.

It should be noted that the PLM modulator described with reference to FIG. 12 is described as acting on 1-bit PDM input data streams. In some embodiments a received audio data stream for an audio channel may be converted into a 1-bit PDM data stream before it is input to the PLM. For example if input analogue audio data from a microphone or other analogue source is received there may be a need to convert it to a 1-bit PDM digital data stream. Alternatively if audio data is received or stored in multi-bit PCM format the audio data words may be converted into a 1-bit PDM stream using known conversion techniques. Thus referring to FIG. 2 first component 201 may comprise conversion circuitry (not shown) for converting an input audio stream into a 1-bit PDM stream which is then provided to the PLM modulator.

However in some embodiments the PLM may be arranged to receive multi-bit input data for one or more audio data channels. For example consider left and right stereo data where each channel comprises two-bit digital audio data. This means that for each clock period there may be sixteen possible combinations of audio data. If the master clock signal MCLK is arranged to have a frequency which is at least seventeen times that of the transfer clock signal TCLK the sixteen possible combinations may therefore be encoded by sixteen different pulse lengths. The principle of operation is the same, for example a four-bit combined data signal representing the state of both input channels may be produced and compared to a counter ramp that increments at the rate of the master clock signal MCLK. Clearly this could be extended to digital signals of higher numbers of bits but with a consequent increase in the number of different pulse lengths required and a corresponding increase in the speed of the master clock signal MCLK compared to the transfer clock signal TCLK, which may require very fast components and accurate resolution between relatively small differences in pulse length. Another example is 3-level data as used for control of Class-D H-bridge output stages, requiring nine possible pulse lengths for a stereo pair.

It will of course be appreciated that data transmitted by the PLM data signal could be PCM encoded or use some other form of data words in a similar fashion to that described previously if a frame or data word synchronisation could be sent, for instance by increasing the number of time slots to send a control data channel in addition to the audio data channels or using a pulse of a given length which does not encode data but does provide synchronisation.

It will also be noted that other techniques for pulse length modulation in general, for example using delay-locked loops (DLL) are known and could be adapted for use in embodiments. Also it should also be noted that the transfer and master clock signals could be received by the PLM modulator or one or both of these signals may be generated by the PLM modulator. For instance the PLM modulator may receive the transfer clock signal TCLK, for example as a clock accompanying and synchronous to the PDM data and generate the master clock signal MCLK or the PLM modulator may receive no clock signals and may recover the transfer clock signal TCLK from the input data using known clock recovery techniques.

Figure 14:
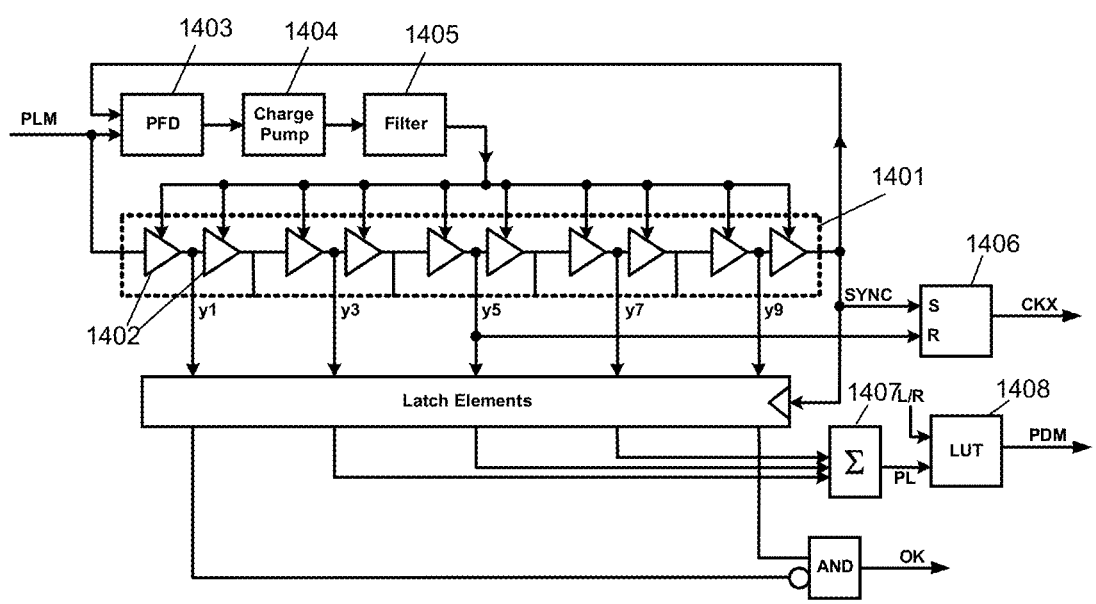
FIG. 14 illustrates one embodiment of a suitable audio data receiver for the embodiment shown in FIG. 11.

FIG. 14 illustrates one embodiment of suitable receiver, i.e. a PLM decoder for use in the embodiment using a fixed rising edge. In this embodiment, the clock signal is recovered using a Delay-Locked-Loop (DLL) comprising a voltage-controlled delay line 1401, itself comprising a chain of voltage-controlled delay elements 1402, together with a phase-frequency detector (PFD) 1403, charge pump 1404 and loop filter 1405 as known. The DLL receives the PLM data signal and the PFD 1403 is designed suitably so that each rising edge of delay line output SYNC is locked to a rising edge of the incoming PLM data stream. Thus the delay along the delay line becomes equal to a period of the original TCLK clock.

The duty cycle of SYNC will vary with the data carried on PLM data. To establish a clock with 50% duty cycle, SYNC is applied to the set input S of an edge-triggered RS flip-flop 1406, while a signal y5 from half way along the delay line is applied to the reset input.

To extract a measure, PL, of the length of each transmitted PLM data pulse (i.e. each pulse of data signal PLM Data), the data at a number of equally spaced taps of the delay line 1401 is summed in a summer 1407. The delay taps are arranged to sample the signal at intervals equal to the second clock frequency MCLK and in sufficient number to be able to discriminate between the number of different possible pulse lengths. In this embodiment, where the second clock frequency is known to be five times the frequency of the transfer clock signal TCLK and there are four possible different pulse lengths, there are five delay taps at equal spacings along the delay line.

The determined data pulse length value PL is then applied to a look-up table 1408 or equivalent logic to decode the PLM Data signal in the relevant PDM audio data channel or channels. In the embodiment illustrated in FIG. 2b, where there is a different data extraction module for each data channel, respective logic inputs LR are tied to ground or VDD to signify left or right channel. This signal LR representing whether PDM-L or PDM-R is to be extracted may also be applied to the look-up table to determine the appropriate data value. Alternatively a multiplexer between the MSB and LSB of the two bit PL data value, driven by LR, may be used to select the appropriate data output. In other embodiments, especially with more than two receiving channels, alternative methods of identifying each receiver may be implemented and used to extract appropriate data using suitably adapted truth tables.

The look-up table contains a truth table such as shown in table 3 below.

TABLE 3

| PL | LR | PDM-L | PDM-R |
|----|----|-------|-------|
| 00 | 0  | —     | 0     |
| 01 | 0  | —     | 1     |
| 10 | 0  | —     | 0     |
| 11 | 0  | —     | 1     |
| 00 | 1  | 0     | —     |
| 01 | 1  | 0     | —     |
| 10 | 1  | 1     | —     |
| 11 | 1  | 1     | —     |

It will be appreciated however that in other embodiments a single data extraction module may be used to extract both the PDM-R and PDM-L together.

It will be noted that this detection method does not require explicit recovery of the master clock signal MCLK (or any clock signal faster than the first clock signal). However if this is required, for instance for other circuitry, such a clock may be generated by logical combination of the tapped outputs y1 to y9 as known. The recovered first or second clocks may be used for other functions in the device. Indeed the rising (or even both) edges of the unprocessed MPDM signal may be used as a clock edge.

Figure 15:
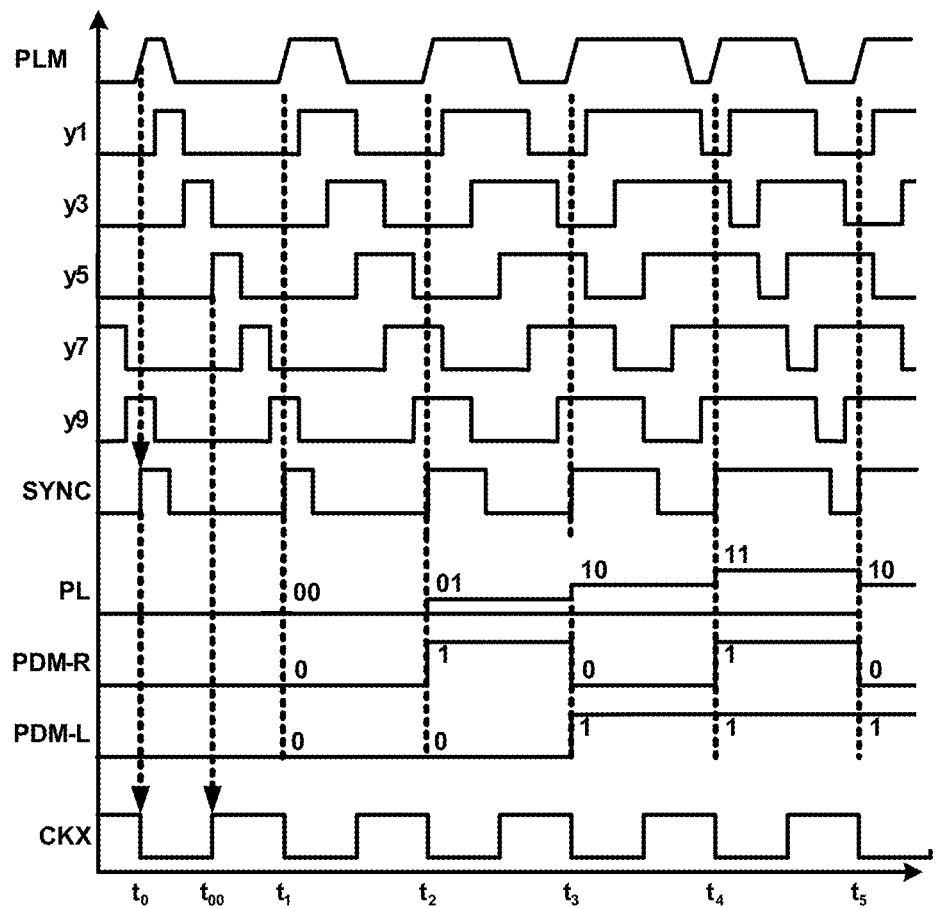
FIG. 15 illustrates example waveforms on the various signal lines of the receiver embodiment illustrated in FIG. 14.

FIG. 15 illustrates, for an embodiment with a fixed rising edge, the PLM Data input signal that would be received for the various possible data combinations, how the transfer clock signal TCLK can be recovered and how the output of the delay tap y5 can set a 50:50 duty cycle for the clock signal. These waveforms also shows how the outputs of the delay taps y1 to y9, when summed, provide an indication of the length of the data pulse which can then be used to extract the PDM-R and PDM-L audio data streams.

In correct operation, the sampled output of the first delay tap y1 is always 0 and the sampled output of the last delay tap y9 is always 1. This can be used to generate a flag indicating correct operation i.e. lock of the DLL loop and correctly formatted input data.

In this case it can then be noted that the value of PL only varies due to the contribution of delay taps {y3, y5 and y7}. If the value PL were produced by summing just the output of these three delay taps then the values of PDM-L and/or PDM-R can then be selected merely as the MSB and LSB bits of PL, as illustrated in Table 3.

The embodiments described above with reference to FIG. 12 relate to two channels of audio data, e.g. left and right stereo data. However it will be appreciated that the principle of PLM encoding with a fixed rising or falling edge position in the transfer period can be extended to more channels of audio data, for example for surround sound. For example if there were four channels of audio data, left-front, left-rear, right-front, right-rear and each data channel was a 1-bit PDM data stream then the combined data would comprise a 4-bit data signal which could be encoded by 16 different pulse lengths.

In the embodiments described above the number of possible pulse lengths that can be produced by the PLM modulator has been set to simply provide unique recoverable encoding for each possible input data combination, i.e. the period of the data transfer clock signal TCLK has been divided into an equal number of time slots sufficient to allow unique encoding. However in some embodiments of the invention the number of possible time slots may be greater than is required just for unique coding of the audio data channels. These extra slots can be used to provide a number of additional features and advantages.

In one embodiment the PLM modulator may be arranged so that at least one combination of input audio data for the left and right audio channels can be encoded as at least two different alternative data pulse lengths. In other words a particular combined data value, say 10, may be encoded as a first pulse length or alternatively as a second, different, pulse length.

Varying the pulse lengths can help reduce problems with EMI by effectively whitening the data signal spectrum. Thus the PLM modulator may be arranged to use the first pulse length to encode one instance of the combined data value and the second pulse length to encode a later instance of the same combined data value. In other words the PLM modulator may vary between the two different alternative data pulse lengths when encoding a given combination of input audio data. In one embodiment the PLM modulator may simply alternate between the possible different encodings but in other embodiment the PLM modulator may be arranged to select between the alternative encodings at random.

In one embodiment the PLM modulator is arranged to vary between the possible encoding pulse lengths so as to control the average pulse length of all instances of a particular combination of input data.

Figure 16:
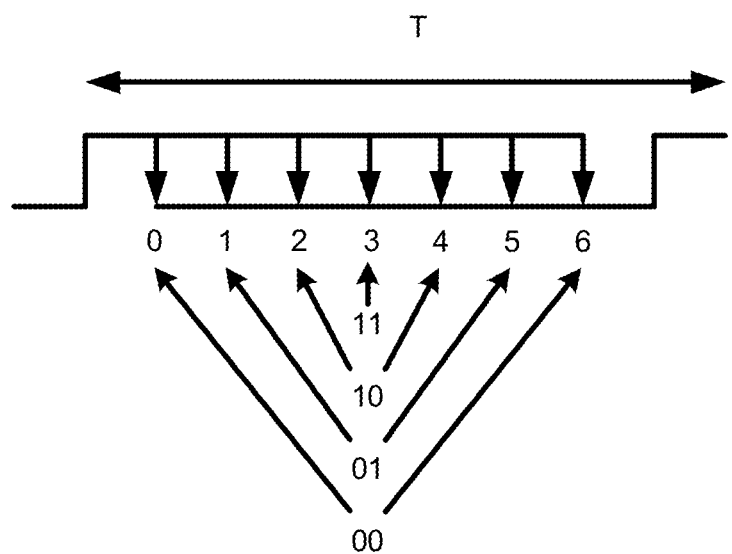
FIG. 16 illustrates one example of an encoding scheme which allows data input combinations to have alternative possible encodings.

Advantageously for any possible combined data values that have alternative possible encodings the possible encodings may be symmetric about a given pulse length. FIG. 16 illustrates a period of the transfer clock signal TCLK which is divided into eight separate time slots, i.e. the frequency of the master clock signal MCLK is set to be eight times that of the transfer clock signal TCLK so that there are seven possible pulse lengths (it will be recalled that a pulse length using all eight time slots is not used to ensure a gap between data pulses, to allow simple clock recovery using the rising edge thus available at each first clock period). The input data combination 11 (i.e. data 1 on the left channel and data 1 on the right channel) may be encoded as a pulse length of four time slots (illustrated as position 3). This encoding may be the only option for an input data combination 11. All the other possible input data combination values, 10, 01 and 00 however may each be encoded as two possible pulse lengths. In each instance, as illustrated, the pulse lengths may be symmetric about a given pulse length. Thus input combination 00 may be encoded as a pulse of one time slot in length (position 0) or 7 times slots in length (position 6).

In this example the various alternative pulse lengths are symmetric about a pulse length that is half the interval between pulses (which may give advantages for DC balance in some implementations). However this does not need to be the case and where there are more time slots available any desired pulse length may be chosen that has sufficient time slots on either side.

The truth table that the PLM modulator uses to encode the input data to pulse length may therefore be based on that set out in table 4 below.

TABLE 4

| Left data | Right Data | R value | position |
|---|---|---|---|
| 0 | 0 | 0 | 0 |
| 0 | 1 | 0 | 1 |

TABLE 4-continued

| Left data | Right Data | R value | position |
|---|---|---|---|
| 1 | 0 | 0 | 2 |
| 1 | 1 | 0 | 3 |
| 0 | 0 | 1 | 6 |
| 0 | 1 | 1 | 5 |
| 1 | 0 | 1 | 4 |
| 1 | 1 | 1 | 3 |

The R value is used to control which alternative encoding is used for those input data combinations which have alternative encodings. If a respective R value is simply alternated between successive occurrences of each input code pair, the average pulse length will be constant, irrespective of the input data.

It may be good enough merely to alternate a common R in alternate clock cycles, assuming random input codes. However in some embodiments the R value for each input code pair or a common R value is generated as a random (or pseudo random) sequence. This ensures that the output signal spectrum is whitened.

The receiver would need to be able to distinguish between seven different pulse lengths and thus could be implemented with a delay line having 16 elements and 8 taps. A different look-up table would also clearly be required.

In another embodiment redundant time slots may be used to encode at least one additional data channel or side data channel. In other words the PLM modulator may be arranged so that at least some data pulses encode not only multiple audio channels but also at least one additional data channel. The additional data channel may, for instance comprise control data for controlling aspects of the audio apparatus. For instance audio control data for enabling or disabling mute or one of several standby or low-EMI modes, or controlling volume may be transmitted.

The additional data may be encoded as a separate data channel as described above. Thus with two 1-bit PDM audio data channels, e.g. left and right audio data, and a 1-bit control data channel, the eight possible unique data combinations of audio and control data could be encoded as eight different pulse widths, requiring the clock period to be divided into at least nine separate time slots. Thus the frequency of the master clock signal MCLK could be set to be at least nine times that of the transfer clock signal TCLK.

With a control channel all the features described above with regard to the use of frames and control of multiple devices on a bus can be implemented using this fixed rising or falling edge embodiment. Control data could provide frame synchronisation allowing data to be encoded as data words.

However whilst it is certainly possible to derive a master clock signal MCLK to provide any desired number of time slots in the period of the first time clock signal it is noted that is most convenient to generate $2^N$ time slots, i.e. to derive a second clock frequency which is $2^N$ times the first clock frequency. This would provide $2^N-1$ possible pulse lengths for an embodiment with a fixed rising or fixed falling edge position of the data pulse. In other words constraining the rising edge (or alternatively the falling edge) of the data pulse to a set time in the transfer period limits the number of possible symbols. Thus providing sufficient time slots to encode both the two audio data channels and the control data channel in each data pulse, with convenient generation of the master clock signal MCLK and a fixed rising or falling edge time, would involve generating 16 (i.e. $2^4$) time slots—with the associated requirements for fast circuitry.

It has been realised however that in some embodiments the data rate required for additional data such as control data may be lower than that required for the audio data channels and it may not be necessary to have frames defined by the control data. Thus in one embodiment some, but not all, data pulses may also be encoded with additional data. Provided that the number of possible pulse lengths is at least one greater than the minimum needed to uniquely encode the audio data channels then at least one particular input combination of audio data can be encoded in two alternative ways and any instances of such audio data combination can thus be used to transfer the additional data.

Thus consider two 1-bit PDM audio data channels, for instance left and right stereo audio data. As described previously a combined signal representing both audio channels will thus be a two bit signal and will require four possible pulse lengths for unique encoding of the audio data. This would require at least five time slots in each period of the transfer clock signal TCLK. As also mentioned it may be more convenient to generate eight time slots (i.e. $2^3$ time slots) rather than five, thus providing seven possible pulse lengths. As only four pulse lengths are needed to encode the audio data this leave three possible pulse lengths that can be used as alternatives encodings for the audio data. This means that three out of the four possible audio data combinations can be used to transmit additional data.

For example encoding could be performed according to the following table:

TABLE 5

| Left audio data | Right audio Data | Control/side channel data | Pulse length ($T_{MCLK}$) |
|---|---|---|---|
| 0 | 0 | 0 | 1 |
| 0 | 1 | 0 | 2 |
| 1 | 0 | 0 | 3 |
| 1 | 1 | N/A | 4 |
| 0 | 0 | 1 | 7 |
| 0 | 1 | 1 | 6 |
| 1 | 0 | 1 | 5 |
| 1 | 1 | N/A | 4 |

Thus a pulse length of $1T_{MCLK}$ indicates an input audio data combination of 00 and a control data value of 0 whereas a pulse length of $7T_{MCLK}$ indicates an input audio data combination of 00 but a control data value of 1. However the audio input data combination 11 is only be encoded as one possible pulse length, equal to $4T_{MCLK}$. Therefore any instances of the input audio data combination 11 means that the particular data pulse can not also be used to encode the control data.

Assuming the input audio data combinations provide effectively random sequences this still allows an average of 0.75 control bits per symbol of the MPDM data which is sufficiently high for most control data, although clearly there is a code dependent latency. This code dependence may be mitigated by re-coding the audio input data stream to reduce the density of 11 states by known methods, for example bit flipping techniques.

Figure 17:
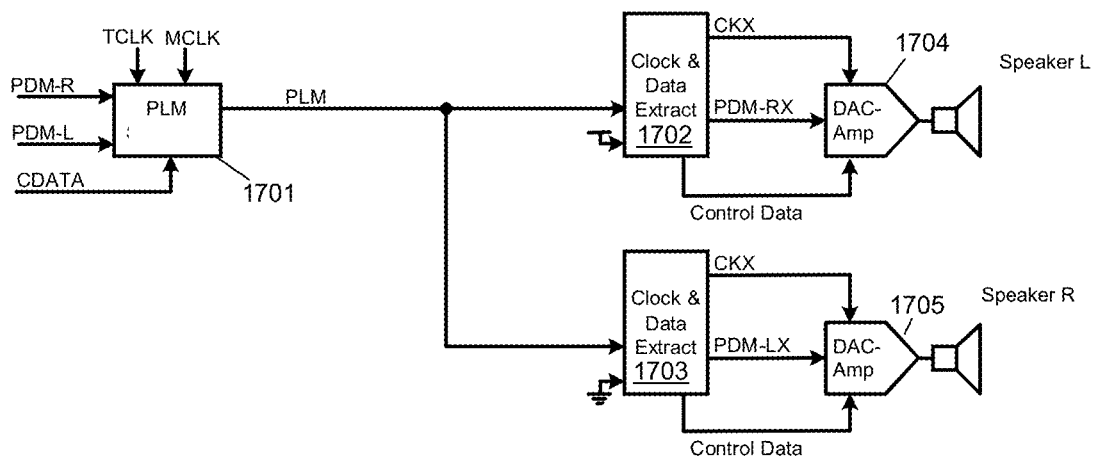
FIG. 17 illustrates a data transfer system according to another embodiment of the present invention using a fixed rising or falling edge.

FIG. 17 illustrates an embodiment including control data transfer. In this embodiment PLM modulator 1701 receives left and right audio data as 1-bit PDM signals as described previously but also receives control data CDATA. The PLM modulator 1701 is responsive to transfer clock signal TCLK and master clock signal MCLK which is eight times the frequency of the transfer clock signal TCLK. The PLM modulator may implement the encoding shown in table 5 above.

In one embodiment the audio data may be combined together with the control data value to provide a pulse length data value in accordance with the table 5 above. The pulse length data value may be compared with a sawtooth ramp signal that increase each time slot as described previously.

The data extraction modules 1702 and 1703 operate as described previously to extract the clock and relevant audio data signals except that the truth tables include indications of the value of control data for all pulse lengths other than $4T_{MCLK}$. The extracted control data can then be used to control DAC-amplifiers 1704, 1705 respectively.

In some embodiments control data may only need to be transmitted infrequently. When no control data needs to be transmitted the control data signal could effectively be set to be a constant string of zeros (or ones). However in one embodiment when there is no control data to be transferred the PLM modulator 1701 may be arranged to vary between the alternative encodings for the audio data input combinations as described previously with respect to FIG. 16 in order to whiten the signal data spectrum and provide the EMI benefits mentioned above.

The PLM modulator may therefore be arranged such that, when no control data is present, those audio data combinations that can be encoded by alternative pulse lengths are varied between the alternative encodings—either alternated or selected randomly as noted previously. Advantageously, as previously noted the two possible encodings for a given audio combination have pulse lengths which are symmetrical about a given pulse length. When subsequently control data is available the PLM modulator may then encode the control data as described.

In this arrangement the receiver will need to be aware whether the variation between two alternative possible pulse lengths for a given audio combination is simply random variation for the purposes of reducing EMI issues or whether the encoding represents control data which has been encoded into the data pulse.

Therefore in this embodiment there is at least a first reserved sequence of control data modulation which the PLM modulator is arranged not to use when not transmitting control data. The receiver may decode each data pulse as if it were encoding control data and look to see whether the reserved control data pattern occurs. If not the receiver will ignore the control data encoding as being random variation implemented by the PLM modulator. However if the reserved data sequence is received in the control data encoding the receiver will then treat subsequent control data encoding as genuine control data. When the PLM modulator then reaches the end of the control data to be transmitted it may send a second reserved sequence of control data (which may be the same or different to the first reserved sequence) to indicate that the control data has ended. After the second reserved sequence has been encoded the PLM modulator may then return to varying between the possible alternative pulse lengths for EMI management reasons. The receiver, after detecting the second reserved sequence will stop treating the encoded control data as genuine control data and disregard the control data encoding unless and until another instance of the first reserved sequence is detected.

The same principles apply to the embodiments where the timing of both the rising and falling edges of the data pulse may be varied to encode data. As mentioned previously if there are eight time slots in a transfer period with the first (or last) time slot always at logic 0 to ensure a gap between data pulses then there are 28 possible symbols that can be generated (assuming that all combinations of a rising and falling edges synchronised to a time slot are allowed). This allows four bits of data to be encoded per symbol using a set of at least 16 possible symbols. This means some possible symbols may be unused—although in some instance more than one possible symbol may be available for particular encodings with the alternative symbols being selected for DC balance or whitening the EM spectrum and/or some symbols not used for data encoding may be used for control or synchronisation purposes. In one embodiment however more than 16 symbols may be used, for instance all 28 possible symbols could be used, with some symbols also encoding control data and other symbols not encoding any control data. Thus one symbol could encode a particular data payload value, say 1111, and also encode a control data value of 0 and another symbol could encode the same data payload, e.g. 1111, with a control data value of 1. However other symbols encoding other data payload values, say 0000 for example, may not encode any control data.

Figure 18:
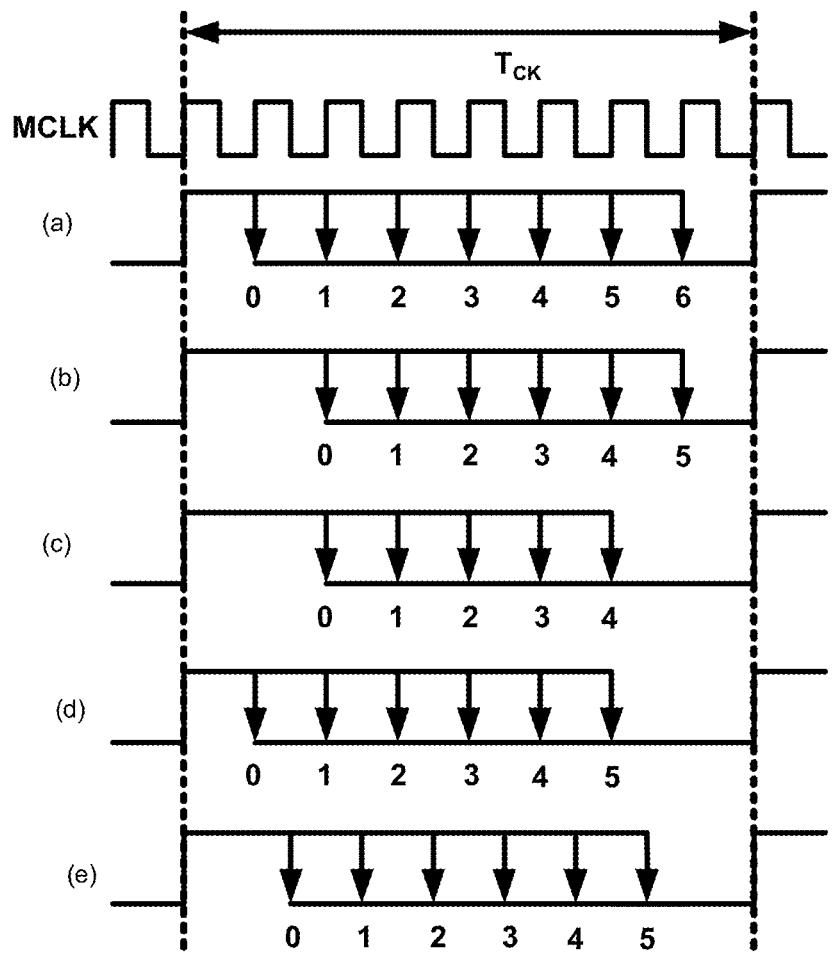
FIG. 18 illustrates another example of an encoding scheme.

In some embodiments, especially for higher-speed links, where rise/fall times may be significant and may be further degraded in transmission along the wires, it may be advantageous to ensure that the shortest pulse length that can be used has a certain minimum width. For instance rather than allow the shortest possible pulse length to be equal to $1T_{MCLK}$ it may be beneficial to ensure that the shortest pulse width is, for example $2T_{MCLK}$. As shown in FIG. 18 if the frequency of the master clock signal MCLK is eight times that of the transfer clock signal TCLK then there are eight time slots and, as shown in plot (a), there may be seven possible positions at which a pulse may end, leading to seven possible pulse widths. However to ensure satisfactory detection of the pulse the minimum pulse width may be set to be equal to two time slots and hence there may be only six possible pulse widths—positions 0 to 5 shown in plot (b). There may also be advantages in ensuring a minimum gap between the end of a pulse and the start of the next pulse, e.g. there may be a minimum gap equal to two time slots—either in combination with an extended minimum pulse duration leading to five possible pulse widths as shown in plot (c) or instead of an extended minimum pulse duration, plot (d). It should also be noted that the minimum pulse length and/or minimum gap between pulses could be some other value, such as 1.5 times the second clock period as shown in plot (e).

The PLM modulator described with reference to FIG. 13 could be arranged to produce such minimum periods by adjusting the values and delay of the ramp signal for instance and the receiver would simply arrange the delay taps at appropriate points and with an appropriate look-up table or equivalent.

Embodiments of the present invention using a fixed rising or falling edge therefore allow multiple data channels to be transmitted over a single link with the possibility of alternative encodings being available for at least some combinations of input data, which can be used to reduce the EMI effects by whitening the data signal spectrum and/or allowing transfer of additional data, such a control data, possibly at a reduced data rate.

Bi-Directional Link

The embodiments described have generally discussed transfer of data in one direction e.g. with reference to FIG. 2 from component 201 to component 202. In many applications there may be a need to transfer data in both directions. As discussed previously there may therefore be a first link for data to be transferred in a first direction, say from a first device to a second device, and a second link for data to be transferred in the other direction, from the second device to the first device. If the data to be transferred in both directions comprises multiple channels then each of the first and second devices may comprise audio interface circuitry according to the embodiments described above. As also mentioned several devices may be connected together in a chain with links between successive devices in the chain and data may be passed around the chain as required.

Figure 19:
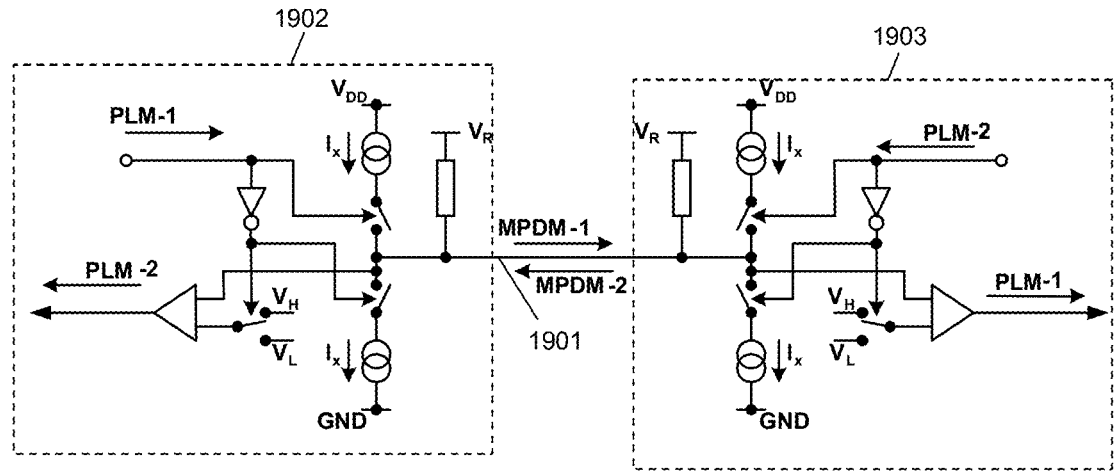
FIG. 19 illustrates an embodiment of interface circuitry for sending PLM data in both directions over a single data link.

In some embodiments however the same link may be used for data transfer in both directions. FIG. 19 shows one embodiment of bi-directional interface circuitry that allows multi-channel data to be transferred in both directions over the same link 1901 by means of a PLM Codec, i.e. a PLM encoder/decoder. First bi-directional interface circuitry 1902 is arranged to receive a first PLM signal PLM-1 for transmission over the link 1901 and to extract a second PLM signal PLM-2 that has been received over the link 1901 for onward transmission. Bi-directional interface circuitry 1903 does the same but in reverse.

Figure 20:
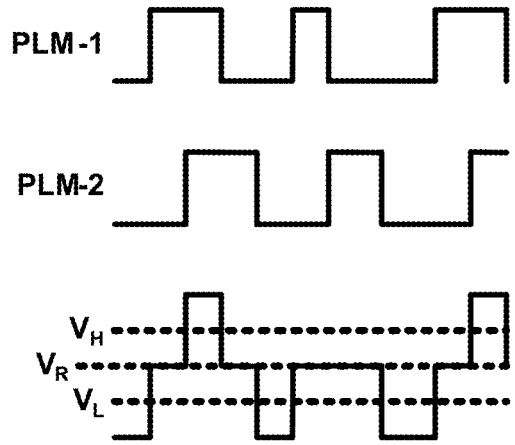
FIG. 20 illustrates example waveforms on the various signal lines illustrated in FIG. 19.

In each of the first and second bi-directional interfaces circuitry drives switched currents dependent on PLM-1 or PLM-2 onto that end of the link 1901. This link has a fixed impedance (at one or both ends) to a reference voltage $V_R$ which may, for instance be VDD/2. Both signals PLM-1 and PLM-2 therefore provide a resultant voltage on the link 1901 as illustrated in FIG. 20. The bi-directional interface circuitry is then arranged to subtract the signal transmitted from that end from the resultant voltage, thus ensuring that the inbound signal derived from each bi-directional interface circuit is just that which was transmitted at the far end.

Figure 21:
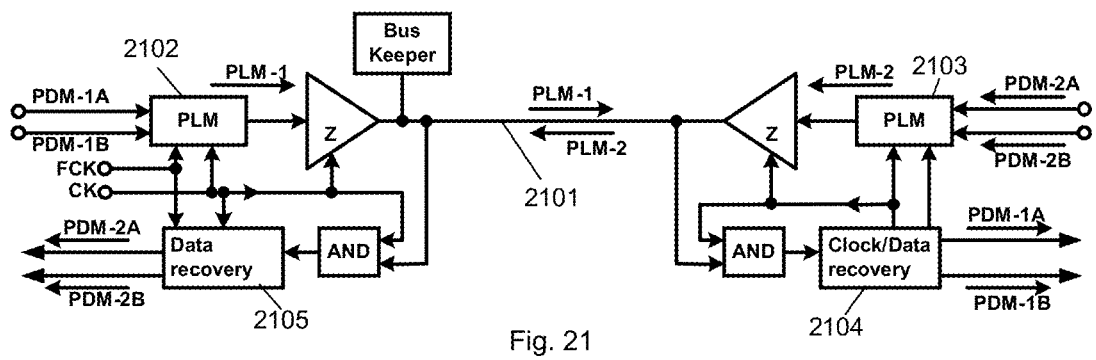
FIG. 21 illustrates another embodiment of interface circuitry for sending PLM data in both directions over a single data link.

In another embodiment, as illustrated in FIG. 21, a single link 2101 could be used as a time-multiplexed bus. Thus with a period of a transfer clock signal TCLK there may be a first period of N clock cycles of a second, higher rate clock signal MCLK for data transmission in one directions and a period of M clock cycles of the master clock signal MCLK for transmission of data in the other direction. Thus the transmitter at one side of the link, say the PLM modulator 2102, may transmit a pulse-length-modulated data signal based on the input data channels PDM-1A and PDM-1B where the pulse length is varied between 1 and N of the second clock cycles. At the end of the N cycles the output from the PLM modulator 2102 is made high impedance and the PLM modulator 2103 at the other end of the link starts transmitting its pulse-length-modulated signal for a selected number of the M remaining cycles. The ratio of N to M may be 50:50 or may depend on the number of channels of data being transferred in each direction. The right hand side receiver passes data to the data extraction circuitry 2104 only when its transmitter is disabled (set to high impedance). The data extraction circuitry 2104 recovers the clock signal TCLK and may also determine the master clock signal MCLK, as described earlier, both of which are supplied to the PLM modulator 2103. The pulse length of the received data can then be used to determine the output audio data PDM-1A and PDM-1B. The left hand data extraction circuitry 2105 operates in the same way except that clock recovery is not needed as the relevant clock signals are available. The bus keeper or bus holder 2106 operates to keep the link line 2101 stable (i.e. low) in underlap when both drivers are high impedance.

Types of Link

It should be noted that the embodiments described above have described the data link as a conductive path. This conductive path could comprise one or more of a conductive path on an integrated circuit, a contact between an integrated circuit and a printed circuit board (PCB), a conductive path on a PCB, a contact for an external device such as a contact on a plug or socket for example and/or a conductive wire.

For example an audio signal processing integrated circuit (IC) of a host device, such as an audio codec or audio hub, may have a PLM encoder as part of the IC for producing a PLM data stream from data received from the codec/hub, for instance retrieved from memory or from a communications processor or the like. This may be communicated, for instance via a PCB, to output transducers within the host device. Each output transducer may have an associated transducer driver which includes a PLM decoder which decodes the data stream for that transducer or one transducer driver may include a PLM decoder for decoding the data streams for multiple transducers. In some embodiments the PLM encoder and/or PLM decoder may be separate ICs. There may be a DAC associated with an output transducer to receive, from the PLM decoder, the decoded digital data stream for an output transducer and provide analogue driving signals. The DACs could form part of the same IC and the PLM decoder and/or transducer driver or again be a separate IC. The PLM data stream may also be transmitted to a connection interface for conversion to an analogue signal for transmission to an accessory apparatus.

The PLM data stream may also be transmitted to an external device, i.e. an accessory device such as a headset, via any suitable connection—for instance a male plug and female socket. The PLM data stream may therefore be sent, via suitable contacts, i.e. poles, on the relevant connectors, to an external peripheral device. Again there may be a transducer driver having an associated PLM decoder and possibly a DAC, as part of the same IC or separate, for each output transducer or one transducer driver may produce data streams for multiple transducers.

Likewise input transducers may be coupled via ADCs to a PLM encoder for generating a PLM data signal to be sent to a PLM decoder associated with the audio circuitry, which may or may not be part of the same IC.

However the link could be provided by any suitable means of data exchange. For instance an optical (for example infra-red) data link could be provided via a suitable waveguide, such as an optical fibre or the like, or may simply be transmitted into free space, e.g. for a wireless headphone. In such an embodiment the PLM modulator may comprise an optical source for producing an optical pulse with rising and falling edges at required times during a transfer period and the receiver may comprise an optical detector. The optical link may comprise a suitable optical detector and as mentioned the link may comprise optical waveguides or be at least partly achieved through free space. Part of the optical link may be implemented in an optical circuit board. The optical transmitter may itself be a PLM encoder and thus may receive individual data streams directly and produce an appropriate PLM data stream. Alternatively the optical transmitter may receive a PLM data stream over a conductive wire from a PLM encoder in a host device and simply convert it to an optical signal. On a receiver side an optical receiver may be an optical PLM decoder for decoding the optical PLM data received and providing individual digital data streams for each transducer. Alternatively there may be an optical transducer which converts an optical PLM data signal into a corresponding electrical PLM data stream which can then be decoded as described above.

Alternatively or additionally the link could be provided by RF transmission and thus a PLM modulator may comprise a suitable transmitting antenna for generating modulated RF transmissions defining data pulses and the receiver may comprise a receiving antenna. Again the RF transmission apparatus may include a PLM encoder for receiving individual data streams directly and produce an appropriate RF PLM data stream or it may receive a PLM data stream over a conductive wire from a PLM encoder in a host device and simply produce a corresponding RF PLM signal. On a receiver side the RF receiver may be an RF PLM decoder for decoding the RF PLM data received and providing individual digital data streams for each transducer. Alternatively there may be an RF transducer which converts an RF PLM data signal into a corresponding electrical PLM data stream which can then be decoded as described above.

The link may comprise various different types of transmission medium and may comprise components for converting one type of PLM data signal, say a voltage signal on a conductive path into another type of PLM data signal say an optical signal in an optical waveguide for example.

Power Transfer

In some applications, where a destination device for the transmitted audio signals does not have its own power source it will be necessary to transfer power as well as the data. Thus, although the data for multiple audio channels may be transmitted via single data link it may be necessary to also have at least a power supply link and a ground link. Where there is two way data exchange there may also be separate data links for outbound and inbound data. However in some embodiments, especially when the PLM data signal comprises voltage modulated signals, the data signal may also be used to transfer power. Various techniques are known for deriving a power supply voltage from a data supply, for example using a simple diode or synchronous switching circuitry. When the data link is also used to transfer power the voltage on the data line may be arranged to vary from a first non-zero voltage to a second non-zero voltage to indicate the data pulses. In this way the signal line is never at zero voltage. However given that with embodiments of the present invention there is always at least one data pulse per transfer period and there may be a minimum pulse period or controlled average pulse period (which may, for example, be equal to half the clock cycle) it would be possible to derive a suitable supply voltage even if the data pulses vary between a first non-zero voltage and ground.

Applications—Accessories

Various applications of the invention will now be described. Except where specifically indicated these applications may be implemented using any of the embodiments described above and thus may involve transmission of symbols with a rising and falling edge modulated by the data and also to embodiments with a fixed rising or falling edge. Control data may be transmitted and the data may be transmitted in frames as discussed above. The data link may be implemented as a point to point link or a series of point-to-point links comprising a linear or chained bus.

FIGS. 22 to 29 illustrate some example applications of the embodiments of the present invention as applied to peripheral devices such as headsets, i.e. headphones or earbuds or the like which may or may not include microphones for voice data transfer or ambient noise cancellation (ANC). The same principles would also apply to connections of other accessory devices. For example speakerphones or the like may be connected to a host device such as a tablet computer and may have multiple speakers and/or microphones and may transmit audio data for beamforming or the like.

Figure 22:
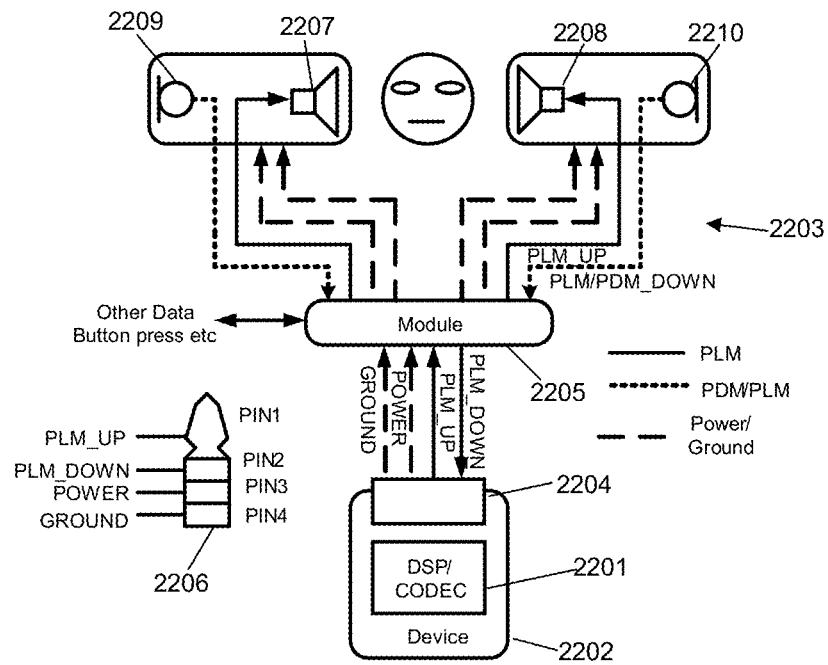
FIG. 22 illustrates an application of an embodiment of the invention.

FIG. 22 illustrates a two way data exchange between a DSP or codec 2201 of a first device 2202, such as a personal media player, gaming device or mobile telephone, to a headset 2203 via interface circuitry 2204. In this embodiment there is two way data exchange using PLM data signals (PLM_UP and PLM_DOWN). The headset may have interface module 2205 which receives the PLM_UP data signal, as well as separate power and ground links, and which transmits the PLM_DOWN signal. The device 2202 may therefore connect to the headset 2203 via a 4-connector plug 2206. The interface module 2205 of the headset may receive the PLM_UP signal and transfer the signal to data extraction circuitry associated with each loudspeaker 2208, 2207 in a similar fashion as described previously (or alternatively could extract the two PDM data channels and send each data PDM channel to the appropriate loudspeaker). The interface module 2205 may also receive audio data, via individual single channel PLM or PDM data links (which may use a clock or clocks recovered from the PLM data received by the adjacent speaker circuitry), from noise cancellation microphones 2209, 2210 associated with each loudspeaker and may produce a multi-channel audio signal PLM down to be transmitted back to the DSP/codec 2201.

In some embodiments, as will be described in more detail later, the interface may be also configured to operate in a legacy mode with older headsets which may, for example, only operate with analogue driving signals. Thus the interface may include a means (not shown) for determining whether the peripheral device is capable of operating according to the present protocol. If not the interface may transmit analogue driving signals.

Where power is being provided to a peripheral device, especially on an output connection that may in legacy mode be used to send or receive audio data, there may be current or power limiting applied to the power output until the peripheral device validly identifies itself and requests more power. This can prevent a relatively large and potentially dangerous amount of current being supplied incorrectly to a peripheral device. Once the peripheral has established its identity it can request more power. The initial power supply may therefore be just sufficient to allow the peripheral to identify itself.

Figure 23:
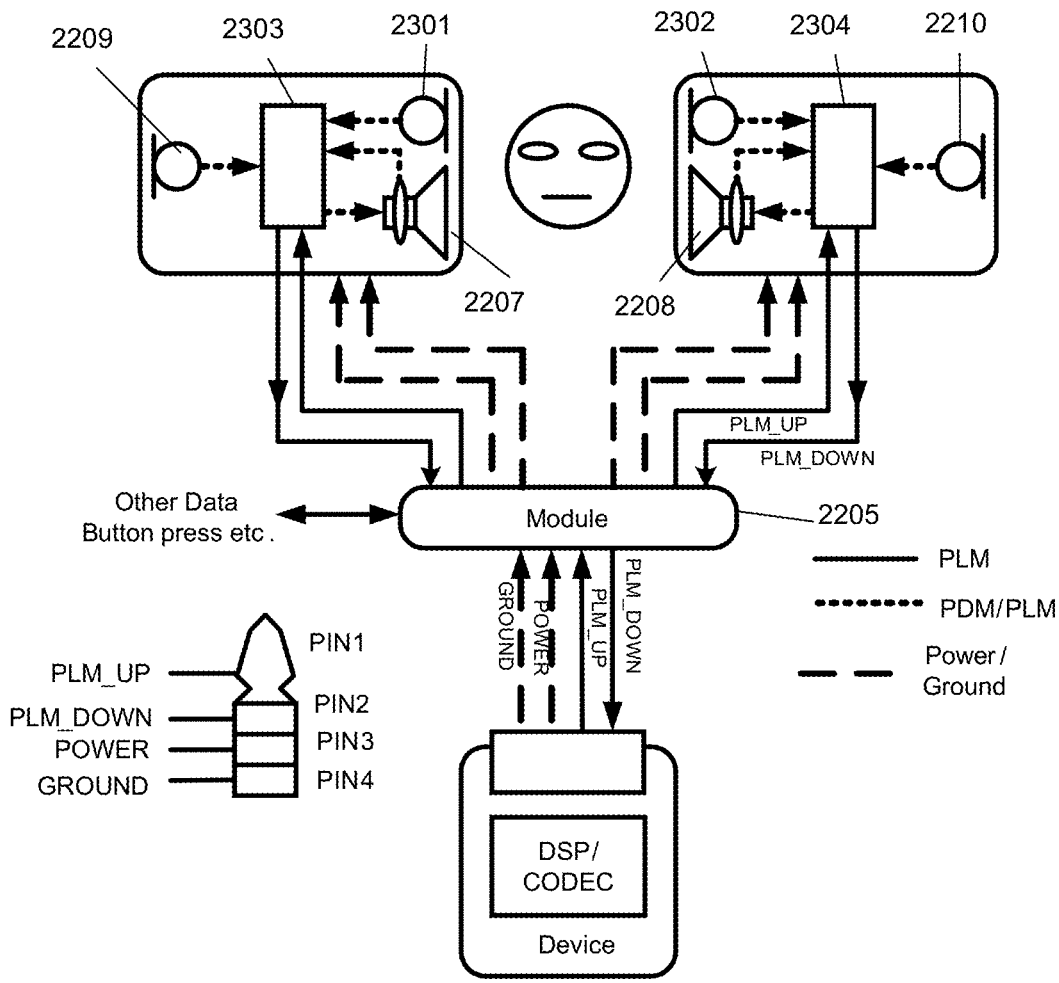
FIG. 23 illustrates an application of another embodiment of the invention.

FIG. 23 shows a similar arrangement to FIG. 22 but illustrates that the earphones may also comprise error microphones 2301 and 2302 which monitor the sound emitted into the ear. The error microphones 2301, 2302 may be used instead of outward facing, i.e. ambient noise facing, active noise cancellation microphones 2209 and 2210 to implement a feedback noise cancellation system. In some embodiments however the forward facing, i.e. speaker facing, microphones are provided instead or in addition to the outward facing microphones 2209, 2210 in a combined feedback/feedforward system or to continually tune the signal processing of a feedforward ANC system. Where both inward and outward facing microphones are present then there may be two channels of audio microphone data to be transmitted from the earphone. The error microphone may be a digital microphone package or chip converting a signal from the analogue microphone transducer element into a digital format, for example a single-bit delta-sigma audio data stream.

Each earphone may therefore be provided with a PLM module 2303, 2304 comprising data extraction circuitry, i.e. a PLM decoder, for extracting the appropriate audio signals for the speakers and also PLM encoding circuitry for encoding the audio data from the microphones into an PLM_DOWN signal for transmission to the interface module 2205.

In some embodiments the loudspeaker in the earphone may generate a signal indicative of the instantaneous current flow passing through the speaker coil. This flow data regarding the speaker current may be useful for speaker protection functions where the current flow data is fed back to an upstream DSP circuitry to appropriately limit the current fed to the speaker so as to avoid thermal or mechanical overload of the speaker. This current flow data may be generated by any suitable current sensing element, such as a MOS current mirror or resistor, within driver amplifier circuitry inside the headphone. The flow data may be in a digital format, for instance a 1-bit delta-sigma data stream. Thus there may be a desire to transmit speaker current flow data in addition to one or more audio data channels from one or more microphones. Again therefore PLM circuitry in the earphone may combine the microphone data and current flow data into a PLM signal as described previously for transmission to the interface module.

Figure 24:
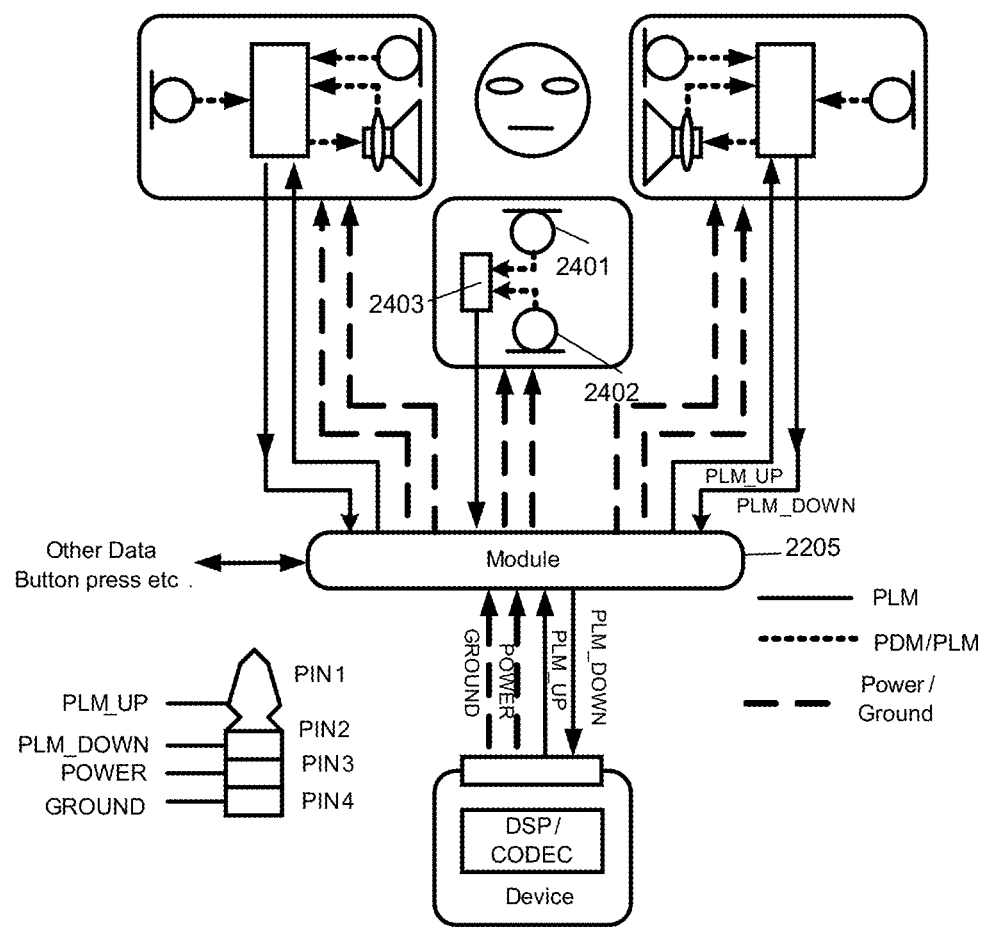
FIG. 24 illustrates an application of a further embodiment of the invention.

FIG. 24 shows an embodiment similar to that shown in FIG. 23 but with addition of a voice microphone 2401 to pick up a user's voice, possibly together with a related outward facing microphone 2402 that picks up ambient noise to enable transmission side noise cancelling. Again these microphones 2401 and 2402 may be digital microphones, for example with single-bit delta-sigma output formats. The microphones may or not be co-packaged with interface module 2205. The microphone data could be transmitted to the interface module 2205 as, for example, separate PDM data streams for the interface module to merge this data into a PLM signal (PLM-DOWN) to be transmitted to the device. However in some embodiments these output audio streams may be merged together by PLM modulator 2403 which is local to the microphones to produce a PLM data stream for transmission to interface module 2205. The interface module may then merge the data from the voice microphone(s) with any data from the earphone noise cancellation microphone(s) and any other data such as speaker current flow data.

Figure 25:
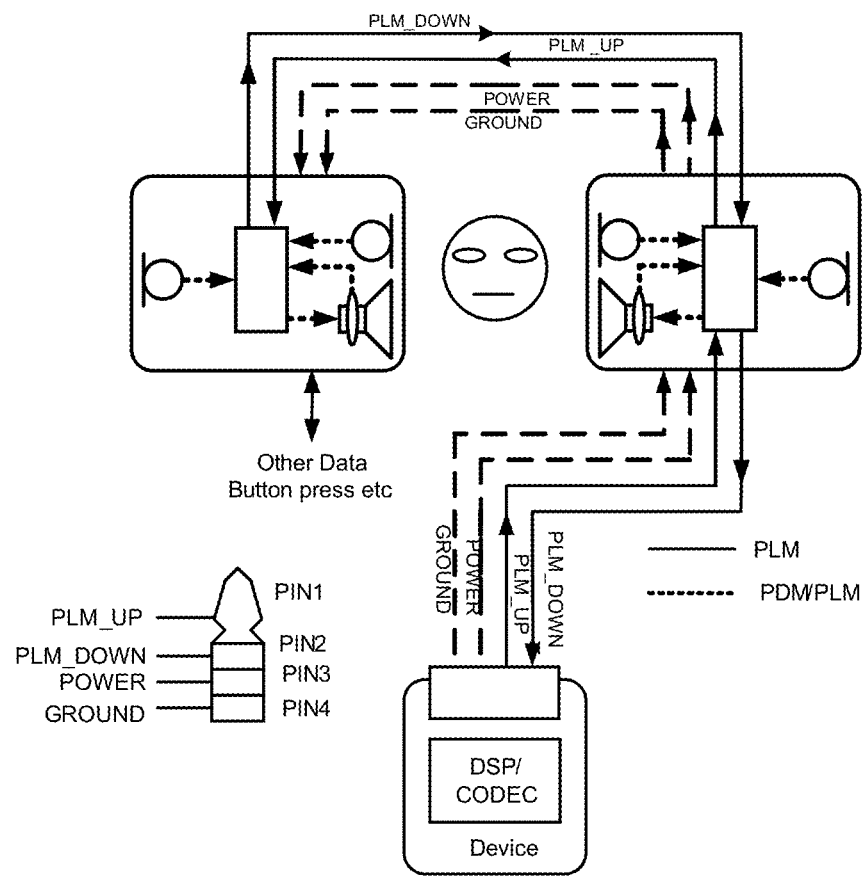
FIG. 25 illustrates an application of another embodiment of the invention.

FIG. 25 illustrates an embodiment with the same four links as shown in FIG. 22. However in this embodiment the interface module is effectively located with one loudspeaker. Thus the right loudspeaker data extraction module (i.e. on the right hand of the page—as shown this would be the left channel for the user) receives the PLM_UP signal, extracts the data for the right audio channel and forwards the PLM_UP data onto the left loudspeaker circuitry. The ambient noise cancellation audio data from the microphone associated with the left loudspeaker is sent, as single channel PDM, possibly using a clock or clocks recovered from PLM_UP, to interface circuitry associated with the right loudspeaker where the multi-channel PLM_DOWN signal is formed.

Figure 26:
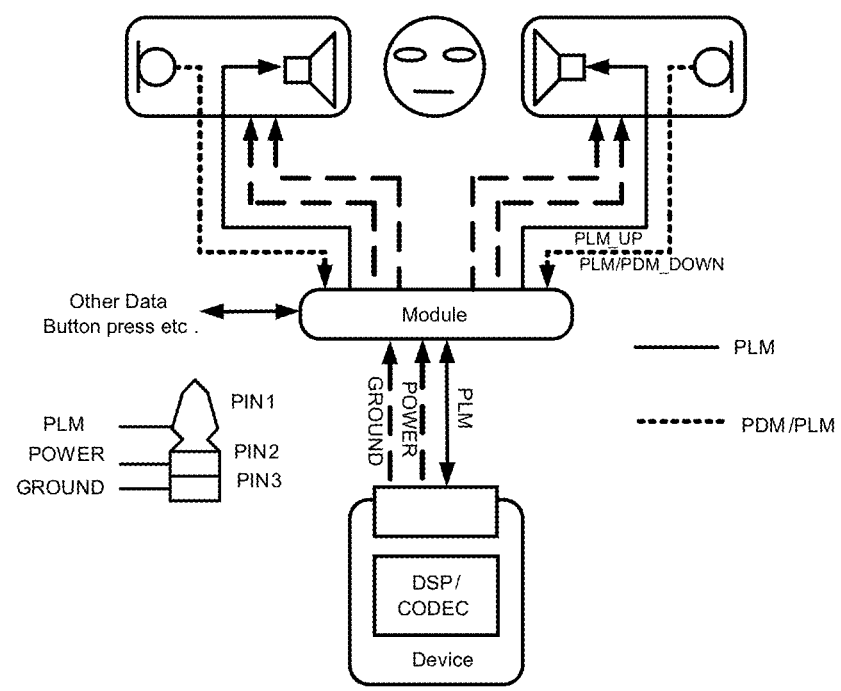
FIG. 26 illustrates an application of a yet further embodiment of the invention.

FIG. 26 shows another embodiment similar to FIG. 25 but again illustrates that there may be inward facing and/or outward facing microphones and thus there may be data from more than one microphone from each earphone. Additionally or alternatively there may be speaker current flow data to be transmitted as described above.

In this embodiment the earphone shown on the left thus has a PLM module for transmitting a PLM signal based on the combined microphone/current data. The interface in the earphone shown on the right combines this data with the data from the right earphone for transmission to the device 2202. The PLM_DOWN signal from the interface in the right shown earphone may therefore be the combined data from four or more data streams, e.g. two microphone channels for each earphone.

Figure 27:
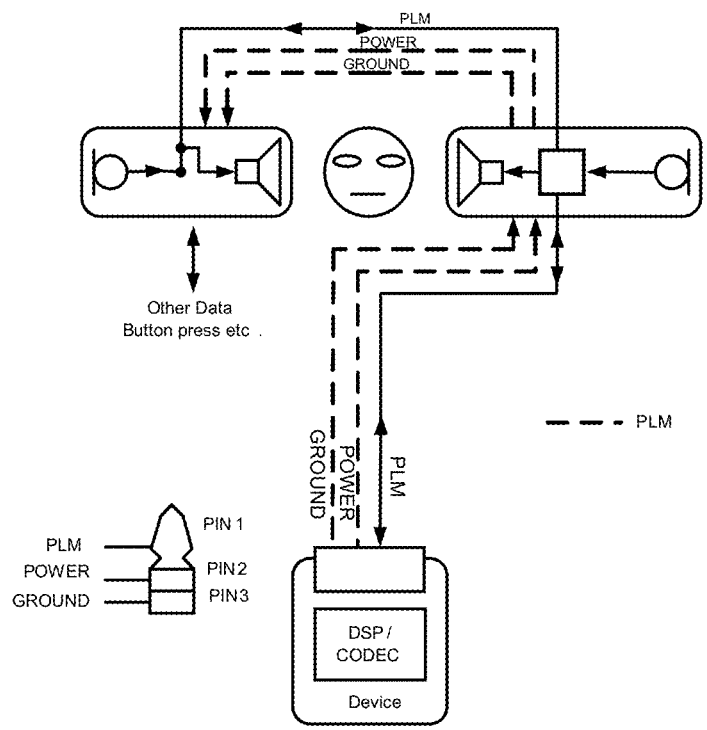
FIG. 27 illustrates an application of a further embodiment of the invention.
Figure 28:
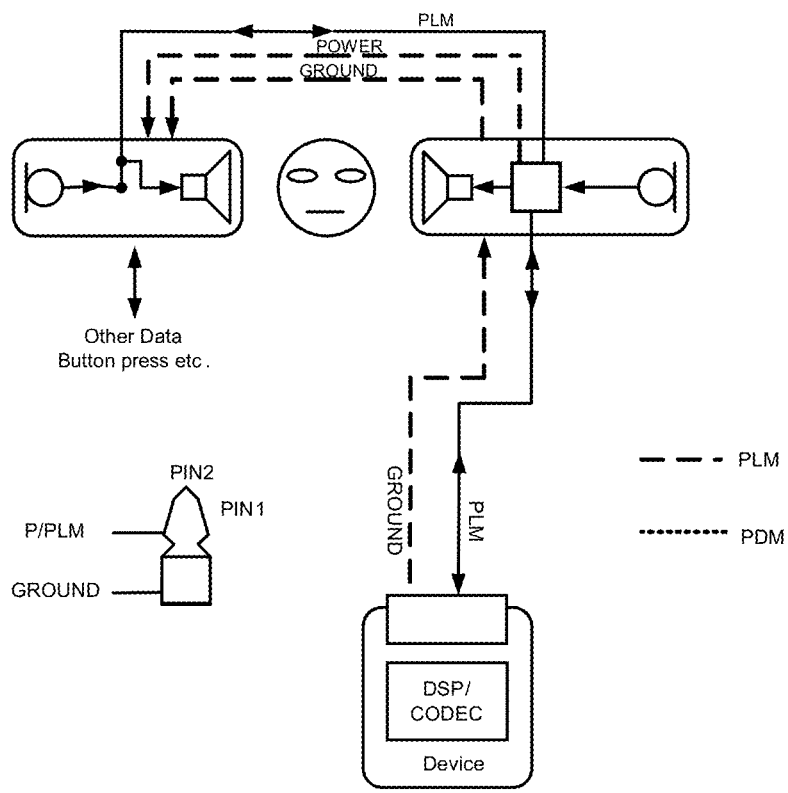
FIG. 28 illustrates an application of another embodiment of the invention.

FIG. 27 shows another embodiment similar to that shown in FIG. 22 but wherein a single link (PLM UP/DOWN) is used for bi-directional data transfer. Thus only a three connector plug and socket are required. FIG. 28 is a similar embodiment to that shown in FIG. 25 but using a bi-directional data link. In this embodiment the data link between the right and left hand speakers may be used to send the multichannel PLM signal up to the left speaker with only one channel of PDM data from the microphone associated with the left speaker being sent back on the same link. Again there could be more than one microphone for noise cancellation and/or speaker current flow data could be sensed and transmitted along the bi-directional link. Also there may be voice microphone data from a voice microphone, possibly with a transmission noise cancellation microphone.

Figure 29:
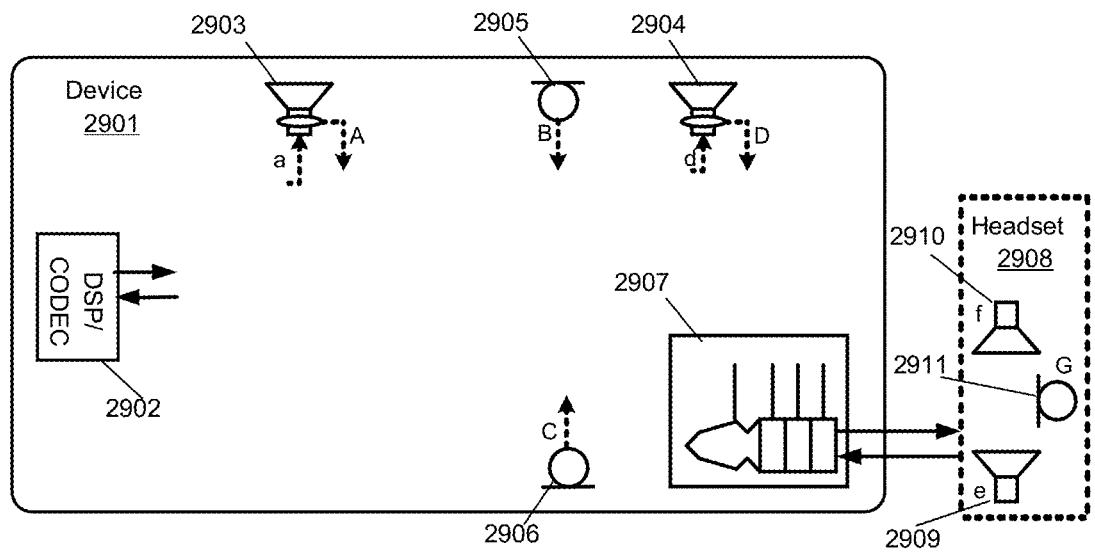
FIG. 29 illustrates various consumers and generators of data in a device and a connected accessory apparatus.

FIG. 29 shows an embodiment similar to that shown in FIG. 28 but wherein the data signal link is also used to provide power supply. Thus only a two connector plug/socket is required to provide the link for power/data signal PMDM and ground. An interface module in the headset derives power for the loudspeakers and data extraction circuitry.

Active Ambient Noise Cancellation

As described with reference to FIGS. 22 to 28 various embodiments of the invention allow the transfer of audio data between a DSP/audio hub/audio codec and transducers of an accessory device such as a headset for the purposes of ambient noise cancellation. This represents a particularly advantageous aspect of the embodiments of the present invention.

As mentioned above noise cancellation may be of the feedback type, in which case microphones monitor the sound transmitted into the ear and adjust the audio data to be transmitted to reduce noise, and/or the feedforward type, in which case noise travelling towards the ear is detected and compensation signals generated. In both types of noise cancellation, but especially for feedforward ANC systems there is a need to generate the noise cancellation data extremely quickly. For a feedforward ANC system the time between the noise wavefront passing the outward facing microphone (and being detected) and subsequently passing the earphone/earbud loudspeaker (by which time the noise cancellation signals should be generated) may be of the order of 40 microseconds or less. Thus it is obviously necessary for ANC, especially feedforward ANC, for any propagation delays in getting the data to and from a suitable processor to be as low as possible.

Generally, ambient noise reduction relates to a speaker housing, such as an ear-bud housing for example, wherein the speaker has an intrinsic response time. In other words there is a response time between sending an audio signal to a speaker and the resulting sound being produced, some of which may be processing delays or the like but some of which will be due to inertia of moving parts etc. In use, the loudspeaker directs sound into an ear of a listener when disposed adjacent an entry location to the auditory canal of the ear.

Each speaker housing, for left and right, comprises at least one microphone suitably positioned to sense ambient noise approaching the ear of a listener and circuitry for converting the sensed ambient noise into electrical signals for application to the speaker so as to generate an acoustic signal opposing the ambient noise.

For feedforward-type noise cancellation the time-of-flight of the noise between the position at which the noise is detected and the speaker defines the time available to generate the appropriate noise cancellation signals and driving the loudspeaker taking its intrinsic response time into account. As headsets may be relatively small in some embodiments, the time-of-flight of the sensed ambient noise from each microphone to the entry location of the auditory canal may be substantially matched to the intrinsic response time of the speaker such that the acoustic signal opposing the ambient noise is generated by the speaker in substantial time alignment with the arrival of said ambient noise at said entry location. This clearly requires fast processing of the sensed noise.

The acoustic signal and the ambient noise may preferably be time aligned at said entry location to 40 microseconds or less or more preferably 25 microseconds or less.

With conventional multi-channel audio data transfer protocols, for example those relying on using samples of audio signal at conventional sampling frequencies such as 8 kHz, 16 kHz, 32 kHz, 44.1 kHz, 48 kHz, 96 kHz and 192 kHz for example, it is not generally possible to transfer the detected noise data from the outward facing microphones to the DSP/audio hub and suitable cancellation signals back to the loudspeakers in time. Thus conventional noise cancelling headphones/headsets, i.e. accessories, apply the noise cancelling processing within the accessory itself so as to avoid the inherent delays in transferring data at standard sampling frequencies to the DSP of the host device, e.g. the mobile telephone or computing device. This means that the headset must disadvantageously have its own source of power, typically requiring a battery, and on-board processing capability adding to the expense of the headset.

The data transfer protocol of the embodiments of the present invention however provides a very low latency data link between the microphones of the accessory device and the DSP/audio codec. As described previously an oversampled data stream, such as a 1-bit PDM data stream, can be transferred at a bit rate of the order of 3 MHz and multiple channels of data can be transferred per transfer period. This provides a very low latency data link meaning no significant time is wasted in transferring data from the outward facing microphone or transferring the noise corrected audio data to the loudspeakers of the microphone. The point to multi-point connection can avoid any latency on a bus but even in a chained arrangement the latency introduced by each component in the chain may be as low as single transfer period. Thus embodiments of the present invention actually enable noise cancellation processing for an accessory to be performed by the DSP/audio hub/codec of a host device. This represents a novel and advantageous aspect of embodiments of the present invention.

Also as illustrated in FIG. 25, all required channels of audio data may be transmitted up and down through respective single poles or pins on a commonly used 3.5 mm four-pole jack plug-socket connection, or similar (the other two poles/pins being used for supply and ground). This contrasts with analogue or non-multiplexed systems where extra poles are needed, leading to either a bulky or a fragile and less electrically reliable connector.

Applications—Device

As mentioned some embodiments may include transmission of detected current and/or voltage waveforms from the speakers to the host device or codec, for speaker protection features, instead of or in addition to signals from the adjacent microphones. Also similar configurations of the speakers and microphones may be part of the host device, wired via a PCB or other internal wiring, rather than separately wired headphones.

A device may therefore have several different audio transducers such as speakers and/or microphones within a device and/or connections for various external audio peripherals such as headsets etc.

FIG. 29 illustrates how a device 2901, which could for example be a portable computing device, mobile telephone handset or the like, may have an audio codec 2902 that may or may not include Digital Signal Processing (DSP) circuitry for processing audio signals for the device. The device itself may comprise various audio transducers, i.e. components such as loudspeakers 2903 and 2904 and microphones 2905 and 2906. In addition there may be a connection interface 2907, such as a suitable jack, for connecting a headset 2908 which may comprise loudspeakers 2909 and 2910 for audio play back and one or more microphones 2911 for voice communication or noise cancellation. It will of course be appreciated that the headset could take the form of any of the embodiments described above.

In operation the DSP/Codec 2902 may transmit data to the loudspeakers 2903 and 2904 of the device or the loudspeakers 2909 and 2910 depending on whether a headset is connected and/or the operating mode of the device. The DSP/Codec may also receive data from the microphones 2905 and 2906 on the device and/or microphone 2911 on the headset. There may also be data regarding operation of the transducers such as loudspeaker current data as described previously.

It can be therefore be seen that, in the audio domain, the device has a number of possible generators and consumers (or sources and sinks) of data that need to communicate with the DSP/Codec. For instance, microphones 2905 and 2906 on the device may be generators of audio data streams, labelled as B and C respectively. Loudspeakers 2903 and 2904 on the device may be consumers for audio data streams (labelled as streams a and d respectively) transmitted from the DSP/Codec 2902. In addition in some embodiments the loudspeakers may also be generators of current data, data streams A and D respectively.

The loudspeakers 2909, 2910 of the headset may also be consumers of audio data streams (streams e and f respectively) and headset microphone 2911 may be a generator of data stream G.

All of the signals generated and/or consumed by the audio transducers may be digital signals, for instance 1 bit data streams, with any necessary digital-to-analogue or analogue-to-digital conversion being embedded within the respective transducer circuitry.

All of the transducers within the device 2901 and interface 2907 therefore need to be connected to the DSP/Codec 2902, and, as mentioned above, digital data connections are typically preferred. Each transducer within the device could be separately connected to the DSP/Codec 2902 via a separate connection but this would involve multiple connection paths on the PCB and multiple pins on the DSP/Codec.

As mentioned previously the use of PLM encoding can allow multiple audio data streams to be encoded and transited over a single wire link. Thus as discussed above in relation to FIG. 2 the data streams a and d for loudspeakers 2903 and 2904 could be combined into a PLM signal and transmitted over a common signal path, i.e. a single signal path on the PCB say, for at least part of the signal path before being separated into separate paths to each loudspeaker.

In another embodiment however the signal paths may be arranged so that there is a link, i.e. signal path, between first and second components such that data to be transmitted to or received from the second component is transmitted via the first component.

In other words for data to be transmitted to the second component, a PLM signal with combined data for both the first and second components may be received by the first component. The data extraction circuitry for the first component can extract the relevant data for the first component and then forward the signal to the second component. The forwarded signal may be an unchanged version of the received PLM signal and the second component may therefore extract the relevant data. Alternatively the first component could extract the data for both of the first and second components and transmit a PDM signal with just the relevant data for the second component to the second component. In some embodiments, as will be described below, the second component may itself have a link for forwarding a signal to a third component and the data transmitted to the first component may be a combined data stream for all of the first, second and third components, in which case the data forwarded from the first component to the second component may be the original PLM signal or a re-encoded PLM signal with just the data for the second and third components.

Likewise for data being received the second component may transfer data to a first component over a link—which could be a single data stream representing data from just the second component or may be a PLM signal encoding data from at least a third component. The first component will receive the data and merge it into a PLM signal for onward transmission.

Figure 30:
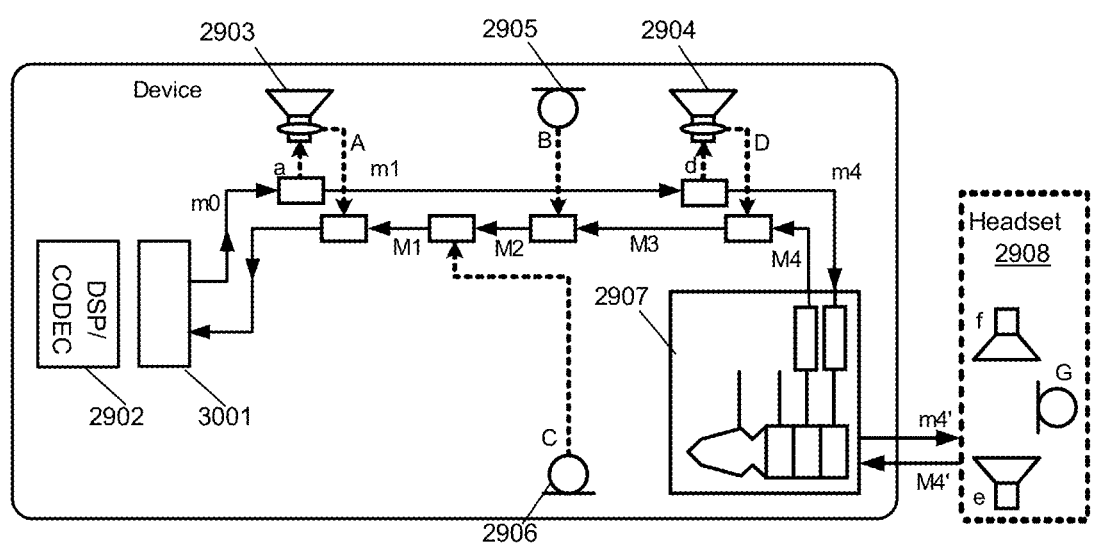
FIG. 30 illustrates a first embodiment of the invention for transferring data in the arrangement shown in FIG. 29.

FIG. 30 shows an embodiment of a suitable connection between the transducers of the device arrangement illustrated in FIG. 29. FIG. 30 shows a PLM module 3001, e.g. a PLM codec, for communications to/from the DSP/Codec 2902. The arrangement shown in FIG. 30 may make use of the bus protocol as described previously.

For data to be transferred from the DSP/Codec 2902 to the loudspeakers there is a first signal path to the loudspeaker 2903 for transmitting a signal m0. There is also a signal path from loudspeaker 2903 to loudspeaker 2904 for transmitting a signal m1 and a further signal path from loudspeaker 2904 to interface 2907 for transmitting a signal m4. In use, with a headset connected by plugging a suitable connector into the jack of interface 2907 there will also be a signal path from interface 2907 to the loudspeakers of the headset 2908 for transmitting a signal m4'.

The signal m0 transmitted by the DSP/codec 2902 to loudspeaker 2903 must therefore contain all necessary audio streams for loudspeakers 2903, 2904 and the loudspeakers of the headset 2908, i.e. signal m0 must comprise audio streams a and d and/or e and f.

In some devices and applications the device may be arranged such that the internal loudspeakers 2903 and 2904 do not operate if audio is being played via the headset loudspeakers and vice versa. In such a situation there may only ever be a need to transmit two audio data streams, perhaps along with control data for activating/deactivating the relevant loudspeakers. In some applications however it may be necessary to transfer separate data streams a, d, e and f simultaneously, possibly with control data for controlling the various audio components.

Signal m0 may therefore be a PLM signal which encodes the required data streams. As mentioned previously using a master clock which has a frequency which is eight times that of the clock used to define the transfer period four bits of data may be encoded per symbol. If control data is also sent two of the required audio data streams may be sent by interleaving the bits for said data streams.

Data extraction circuitry associated with loudspeaker 2903 extracts the data stream a for loudspeaker 2903 (if present) and forwards the signal to loudspeaker 2904. The signal m1 which is forwarded may be a re-encoded PLM signal with just data streams d, e and f but it may be simpler in some embodiments to simply forward the signal received, i.e. m1 is equivalent to m0 (subject to any modifications of any control data).

Data extraction circuitry associated with loudspeaker 2904 receives the signal m1 and extracts any data for audio stream d. A signal m4 is then forwarded to the interface 2907. Again the signal that is forwarded may be the same as the signal received, i.e. m4=m1 or the signal may be re-encoded.

The interface 2907 receives signal m4 and forwards data to the headset (when connected). The interface jack may also transmit power and provide a ground connection as described above in relation to the headset embodiments. The interface may simply provide an appropriate connection for the incoming signal m4 to the jack socket. However in some embodiments it may be preferred to receive the signal at the interface and re-transmit a signal via the connection. Again the transmitted signal m4' may be the same as the signal m4 received at the interface. However in some embodiments the interface does extract data streams e and f and generates a new PLM signal containing only data streams e and f. As will be appreciated the headset connection may be relatively long and of a more variable quality than is the case for the relatively predictable connections within the device itself. Re-encoding the signal to be transmitted by the interface to contain just the audio data streams e and f for the headset means that fewer symbols are required in the signal and thus a larger time resolution (i.e. slower second clock) can be used as compared to the signals transmitted within the device. This can ease the signal integrity requirements and ensure good transmission.

The discussion above of course assumes that the headset is suitable for receiving PLM signals. In some embodiments the headset may instead use conventional digital audio signals or instead require analogue driving signals. In which case the interface 2907 receives the PLM signal m4 and extracts the relevant audio data streams e and f and generates appropriate driving signals for the headset.

FIG. 30 also shows a separate series of signal paths between components for transmitting data to the DSP/Codec 2902. Data from the microphone(s) of the headset 2908 may be communicated to the interface 2907 as a data signal M4'. Where there is a single microphone with digital output this output could be transmitted as a single-bit digital data stream. Where there are two or more microphones and/or other data to be transmitted a suitable PLM signal may be transmitted.

The interface 2907 receives this signal and forwards a signal M4 to next component in the series, in this example loudspeaker 2904. Data extraction circuitry in the interface 2907 could determine the received audio signal data G in the received signal M4' and re-encode it in the signal M4 transmitted to the next component or the received signal may be transmitted directly in some embodiments.

In this example the loudspeaker 2904 is also a generator of data, for example current data used for speaker protection. Thus the signal M4 from the interface is received and combined with the speaker data for onward transmission as a PLM signal M3 to the next component, microphone 2905. Here the data from microphone 2905 is combined with the existing audio data and a new signal M2 transmitted onward.

Data stream C from microphone 2906 is also combined into the signal to form a new signal M1 which is then combined with data A from loudspeaker 2903 to form a signal M0 which is then passed to the PLM module 3001 associated with the DSP/Codec 2902. Signal M0 is therefore a PLM signal which includes data streams A, B, C, D and G.

The data extraction circuitry in PLM module 3001 can extract the individual data streams and transmit the retrieved data streams to the DSP/codec in any suitable way.

It should be noted that each of signals M0, M1, M2 and M3 are PLM signals. As mentioned signal M4 comprise a single audio data stream only and thus could be a PDM signal for instance but in some embodiments may be a PLM signal.

In each link between components the PLM signal produced may be provided with just sufficient time slots to encode the audio data streams present. For example if there is only a single data stream of audio data from the headset 2908 and a single data stream of current data from loudspeaker 2904 then signal M3 may be an PLM signal with four time slots to provide six possible different symbols—of which four may be used to encode the data. (Alternatively in an embodiment with fixed rising edges say there may be five time slots to provide four different pulse lengths with a gap between pulses. In other words the second clock for the relevant link may have a frequency five times that of the transfer clock signal TCLK). For signal M2 however there is a need to encode another data stream (data stream B) and thus eight different possible symbols and at least five time slots may be required (nine if coded with a fixed edge). Thus the relevant link may run with a different second clock frequency which is five (or nine) times the first clock frequency. Typically the same first clock frequency will be used on all links as this will be set by the required bit rate.

In some embodiments however it may be preferable to use the same general circuitry for each link, thus the first and second clock frequencies may be set to be the same for each of the PLM signals in the chain. Also it may be desirable to encode control data as described previously. Thus the bus arrangement as described previously may be used with signal M0 may have a master clock frequency sufficiently fast to encode the five data streams A, B, C, D and G together with control data (with all data streams encoded by a separate channel or with at least some of the data streams being interleaved on a channel of the PLM data link).

Each of the components receiving a PLM signal and adding new data to the signal sent onwards could be provided with data extraction circuitry for extracting the existing data and a PLM modulator for producing a new PLM signal based on an appropriate truth table.

In embodiments with a fixed rising or falling edges it is noted that in some instances a component may be arranged to modify the pulse length of the data pulse received without determining what the existing data is. For example assume that each of signals M4, M3, M2, M1 and M0 is a PLM data signal with 32 available pulse lengths, i.e. there are 33 time slots in each period of the transfer clock signal TCLK. The interface 2907 may produce a signal that encodes the single data stream G only. The PLM associated with the interface could be arranged to produce a pulse of 1 time slot in length for data 0 and a pulse of 17 time slots in length for data 1. The loudspeaker may then be arranged to leave the pulse length unmodulated if data stream D is data 0 but to extend the pulse length by 8 time slots if data stream D is data 1. Likewise microphone 2905, microphone 2906 and loudspeaker 2903 could each be arranged to leave the pulse length unmodulated if the relevant data stream is data 0 and to extend the pulse length by 4, 2 and 1 time slots respectively if the relevant data stream is data 1.

The result will be a pulse length in signal M0 which uniquely encodes all of the data streams A, B, C, D and G. However each component in the chain simply modifies the pulse length by a predetermined amount based on its own data stream and doesn't need to determine what the upstream data is.

This arrangement means that a single PLM signal can be sent upstream from the DSP/Codec to provide data for all consumers of audio data with each consumer component simply tapping data from the signal at an appropriate point in a chain. Likewise a chain for downstream data to be transmitted to the DSP/Codec is provided with data being merged into the signal at appropriate points. This avoids the need for distinct connections to/from each component. The bus protocols described above may be used in such an embodiments.

In such an arrangement the upstream and downstream links may be arranged relatively close together as shown and thus two signal paths, e.g. traces on a PCB, may pass near to some of the transducers. In the example shown in FIG. 31 the signal paths are close to the transducers consuming signals a and d and generating signals A, B, C and D. However some transducers may be separated relatively far apart from one another on the device. In the example shown in FIG. 31 microphone 3006 is located on the opposite side of the device. This means that a separate, relatively long, connection must be used to connect the microphone to a suitable tap point on the PLM link. Otherwise a separate connection between microphone 3006 and DSP/Codec 3002 may be provided.

In another embodiment however the links between at least some components may be arranged in a complete chain. Thus data transmitted by the DSP/codec 3002 for an upstream consumer component may be transmitted in the same direction as data generated by a component for transmission to the DSP/Codec 3002. This allows for two signal paths to be spaced apart in a configuration that reduces the amount of signal track required but still provides communication between the DSP/Codec 3002 and each consumer and still allows each generator to transmit to the DSP/Codec.

Figure 31:
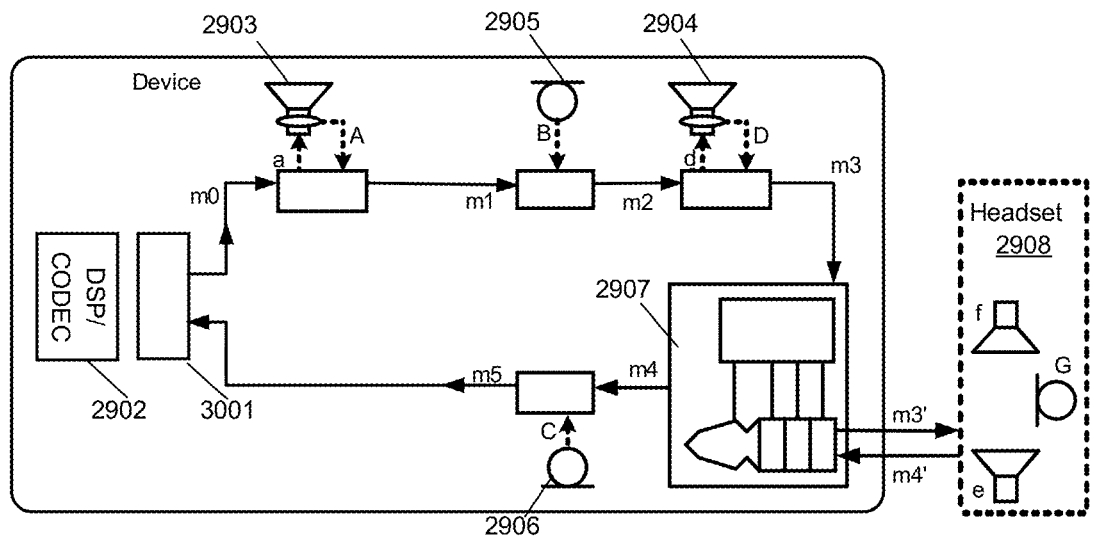
FIG. 31 illustrates a second embodiment of the invention for transferring data in the arrangement shown in FIG. 29.

FIG. 31 illustrates one example of a suitable arrangement. In this arrangement the PLM module 3001 of DSP/Codec 2902 has a first link to loudspeaker 2903 as described previously and transmits a signal m0 which is a PLM signal which encodes data for all of the generators as described previously. In this embodiment however the data stream a for loudspeaker 2903 is extracted and the measured current flow data is also encoded into the signal transmitted m1 onward from the loudspeaker. This signal is transmitted to the microphone 2905 where the signal is re-coded to include data stream B. Signal m2, which thus contains at least audio data streams d, e and f and data streams A and B, is then passed to loudspeaker 2904 where audio data d is extracted for the loudspeaker and current flow data D is encoded. The signal comprising data streams e and f and also A, B and D is then passed to the interface where audio data streams e and f can be extracted for sending to the headset as described above. Any microphone data from the headset can be encoded into the signal m4 which is then sent, via a different return path, to microphone 2906. Microphone data stream C is encoded to produce signal m5 which is then returned to the DSP/Codec which can then extract data streams A, B, C, D, and G.

The PLM signal transmitted between any components may therefore be suitable to encode each of the data streams a, d, e and f and A, B, C, D and G. It will be appreciated however that no signal comprises audio streams a and A. In other words as loudspeaker 2903 consumes audio stream a but generates data stream A the PLM signal m1 may be adjusted so that the encoding for outgoing audio stream a is replaced by the encoding for measured data stream A. Likewise no signal contains both audio stream d and data stream D or audio streams e and f and microphone data stream G. The most number of individual data streams is thus those contained in signals m2, m3 and m5 which need each need to encode five different data streams (m2 encodes consumer audio streams e and f and generated data streams A, B and D; m3 encodes data streams e, f and A, B and D; and m5 encodes generated data streams A, B, C, D and G).

Thus each link may use a PLM signal capable of encoding five different data streams. Signal m0 originally transmitted will encode the consumer data streams a, d, e and f and may use the other available symbols as alternatives to whiten the data spectrum as discussed previously. Signal m1 re-encodes the signal to remove the data encoding for stream a but to include data from stream A.

Again the PLM module associated with each component may extract the data for each data stream and remodulate taking any new data into account.

Obviously the data extraction/modulation circuitry for each component will need to know which data stream to extract. This can be predetermined and fixed so that each transducer always extracts a given data stream, in which case the relevant details can be stored in a suitable non-volatile memory and/or the data extraction circuitry may be hardwired so as to generate data 1 for predetermined symbols and data 0 for other symbols. In other embodiments however there may be some configurability in which component extract data at which point in the chain. This could be established however by any suitable configuration, such as token passing such as is known in the art.

Compatibility with Legacy Systems

As described above the data interfaces of the present invention may be used in communication between various electronic devices and accessory devices such as headsets etc. Typically devices such as mobile telephones may be operable with a set of headphones and thus such a device will have a connector, usually a suitable socket, for connecting to a plug associated with the set of headphones and via which audio data may be transferred.

Conventional headsets may have a connector, for example the common 3.5 mm three pin TRS jack plug for the transfer of analogue audio data. Two of the pins are arranged to receive left and right analogue audio channels respectively, and the third pin is a ground pin. Some headsets may also comprise a microphone, for instance for voice communication, and such headsets may typically have a four pin connector, such as a 3.5 mm TRRS jack, with the additional pin being for communicating an analogue microphone signal. Often such headsets may not have their own source of power and thus the analogue audio signals received are used to drive the loudspeakers directly and the microphone may not require a specific power source (typically being biased from a fixed voltage via an off-chip resistor of about 2.2 kΩ and providing a signal by modulating this resistive bias). This analogue audio-out connection can also be used to connect the device to other audio accessory or peripheral devices and may drive a line-level output when required.

Whilst digital data transfer may be preferred many users acquiring a device such as new mobile telephone or the like may have legacy headsets or other peripheral devices that they would like to use with the device. Likewise a user acquiring a headset which is capable of digital data transfer may nevertheless wish to use such a headset with a device that only outputs analogue audio signals. It would therefore be advantageous for the data interface to be able to operate in a legacy analogue mode as well as in a digital mode according to the protocols described previously.

Figure 32:
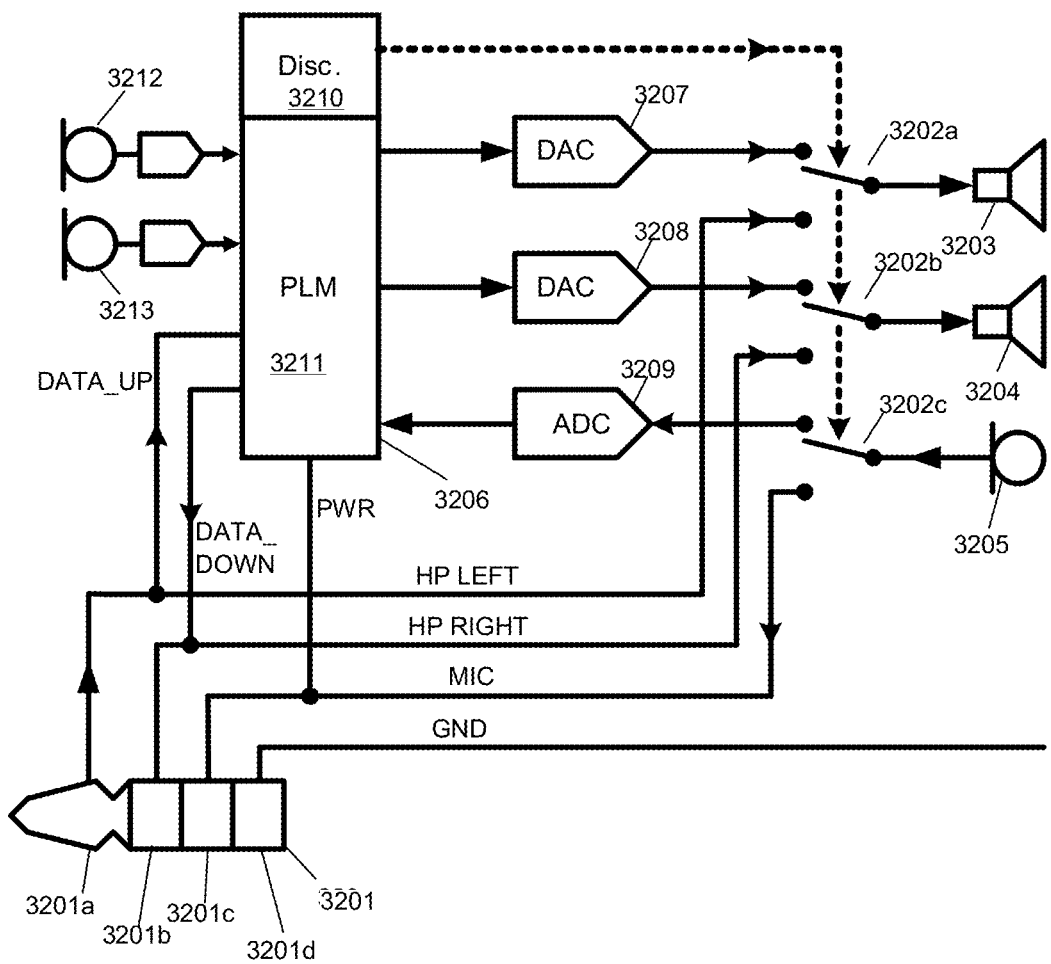
FIG. 32 illustrates a connection interface for an accessory according to an embodiment of the invention.

FIG. 32 shows an embodiment of a suitable interface module that allows accessory apparatus to use standard connectors for digital data transfer and also to function with legacy devices outputting, and possibly receiving, analogue audio signals.

FIG. 32 shows a jack plug connector 3201 which, in this embodiment has four pins or contacts, 3201a-d, such as a TRRS type plug.

One pin, 3201d, of jack 3201 provides a ground connection and is connected to an appropriate ground path of the accessory apparatus. The other three pins 3201a-c are connected, via signal paths HP LEFT, HP RIGHT and MIC to series switches 3202a-c respectively which connect to loudspeakers 3203 and 3204 and microphone 3205 respectively.

Series switches 3202a-c can thus connect the pins 3201a-c of the jack 3201 directly to the transducers 3203, 3204 and 3205. Thus in a legacy mode of operation where analogue audio signals are used, the series switches 3202a and 3202b can connect pins 3201a and 3201b of the jack directly to the left and right loudspeakers 3203 and 3204 respectively so that the received analogues audio signals can drive the loudspeakers. The microphone may be resistively biased through the MIC line and, in use, superimposes a small signal modulation that is transmitted via pin 3201c to the device to which the accessory is connected enabling read-out of the microphone data. The microphone ground reference and speaker coil ground current return use the ground connection provided by pin 3201d.

In some embodiments the accessory may not have its own source of power. The series switches 3202a-c are therefore configured to default to providing a connection between the analogue signal paths and the transducers. Suitable switches include normally-closed relays or depletion mode FETs with gates grounded for example via a resistor.

In addition the three pins 3201a-c are also connected to paths DATA_UP, DATA_DOWN and PWR to digital processing circuitry 3206. The paths from pins 3201a and 3201b, which carry the analogue driving signal for the loudspeakers in legacy mode, default to high impedance.

In a digital mode of operation pin 3201c is used to supply power to the headset. When power is available on the PWR/Mic line the digital processing circuitry 3206 may operate to switch the series switches 3202a-c to disconnect the signal lines HP LEFT, HP RIGHT and MIC from the jack pins and to connect the transducers to the DACs 3207 and 3208 and ADC 3209.

The digital processing circuitry comprises a discrimination or identification circuit 3210 which determines whether the device is capable of using the appropriate digital protocol.

There are a number of ways in which the discrimination circuit can operate. For instance a device could be arranged, on detection of insertion of a jack into a socket (either during operation or on device start-up/wake-up/reset etc.) to provide power via pin 3201c and attempt a brief digital handshaking sequence with the connected accessory, for example by transmitting a first data sequence to the accessory via pin 3201a and monitoring for a second data sequence (which may be the same or different to the first data sequence) received via pin 3201b. On receiving power the digital processing circuitry of the accessory may transmit the second data sequence to the device, possibly in response to receipt of the first data sequence. If the handshaking is successful the device and accessory will then transmit and receive digital data. If the handshaking is not successful both device and accessory may revert to legacy mode using analogue communications. For example if the accessory is connected to a device in which pin 3201c appears to provide suitable power but the device does transmit the first data sequence the accessory may continue to operate in legacy mode. Other types of discrimination circuitry may be used however. For example the signals received via any of the pins 3201a-c may be analysed when suitable power is available via pin 3201c to determine whether the characteristics match those of the expected digital signals or analogue signals or to look for particular modulations which may be embedded in the signals.

Assuming that the discrimination circuitry 3210 determines that the device is capable of using the appropriate digital protocol a control signal may be generated to control the switches 3202a-c as described above. It will be appreciated that the switches 3202a-c may comprise more than one switch element for disconnecting the transducers from signal lines HP LEFT, HP RIGHT and MIC and connecting them to the DACs 3207 and 3208 and ADC 3209.

PLM processing circuitry 3211 will also be enabled and data lines DATA_IP and/or DATA_DOWN may be switched out of high impedance mode as required. Power received via line PWR may also be distributed to other components within the accessory that require power in digital mode.

In digital mode data may be received via pin 3201a and supplied to the PLM circuitry 3211. Data extraction circuitry, i.e. a PLM decoder, can extract the left and right audio data streams as described previously. The relevant signals can then be supplied to DACs 3207 and 3208 associated with loudspeakers 3203 and 3204 respectively, for example as 1 bit PDM signals, to generate the analogue driving signals for the speakers.

Signals received from microphone 3205 will be converted to digital by ADC 3209, for instance a 1 bit PDM data stream and passed to PLM processing circuitry. As described previously if there is only one channel of audio data to be transmitted to the device then a PLM signal encoding only one 1-bit PDM data channel may be transmitted.

However the accessory may have one or more additional microphones 3212 and 3213 for noise cancellation. In legacy mode these microphones may not be operational and no noise cancelling is applied. However in digital mode these microphones may be operational and the signals from the microphones may be digitised and received by the PLM circuitry 3211. The PLM circuitry may therefore generate a PLM signal encoding all audio data channels to be transmitted to the device as an PLM_DOWN signal via path DATA_DOWN and pin 3201b.

It will therefore be seen that the interface embodiment shown in FIG. 32 is able to operate in both an analogue legacy mode with devices that communicate using analogue signals and also in a digital mode with devices able to communicate using digital signals. The interface can use a standard connector suitable for legacy devices. In digital mode additional functionality may be enabled due to the increased possibility of communication. In the event that the accessory is plugged into a device unable to support digital communications it will default to legacy mode operation.

The embodiment described above with relation to FIG. 32 relates to an accessory which, in legacy mode, receives two audio data streams and provides a voice microphone data stream, each via separate pins of a four pin connector (the fourth pin being ground). Some legacy devices may however use a three pin connection, for example a music player may be provided with a three pin socket, i.e. a socket with three separate contacts, for providing left and right audio data and ground. Embodiments of the invention could therefore be implemented with a three pin connector, for example with one pin used for receiving digital PLM data, one pin for receiving power and the third pin for ground.

In some embodiments however the interface circuitry may be arranged to derive power by using the received data signal to provide power through various known power harvesting techniques. In one known technique the received data signal line, which will swap between a high voltage level and a low voltage level according to the data, may be connected via a suitable diode to a capacitor. In use when the voltage level is high and the capacitor is relatively uncharged the diode will forward bias and charge the capacitor which can then be used to supply power for the PLM processing circuitry. This will result in a voltage drop on the signal line but the sending device may be configured to use high and low voltage signal levels which are suitable for providing power and also for ensuring good signal quality. Other power harvesting techniques are known and could be used as appropriate. A PLM signal is particularly suitable for use in such power harvesting techniques as there is a data pulse, and hence high voltage, every transfer period.

The use of power harvesting in this way could reduce the number of pins required and/or allow additional functionality for a given number of pins. For instance a headset could be provided with a three pin connector. In legacy mode the three pins may be used for left audio, right audio and ground. Thus the headset simply receives audio data. In digital mode however one pin may be used for receiving a digital data signal and, as described above, power harvesting may be applied to this signal line to provide power for the headset. A second pin could therefore be used to send data from the headset to the device, for instance audio data from ANC microphones or a voice microphone or control data, thus enabling various controls on the headset. The third pin could be ground. Thus an accessory with a three pin connector could be connected to some devices, such as an older music player, to operate in legacy mode and simply receive analogue stereo audio. The same accessory could also be used with a different device however to receive digital stereo audio and also to provide signals for voice data, noise cancellation and/or headset based control—all via a connector with just three contacts.

It will also be appreciated that some devices may use different pins for different functions. For instance with the standard TRRS connector for analogue audio signals there is a convention regarding which pins are used for left and right audio, but some devices use an alternative arrangement for the mic and ground pins compared to other devices.

In some embodiments the interface circuitry may be able to determine which pin-out configuration the connected device is using, e.g. with respect to Mic and ground, and may be able to swap the coupling of pins of the plug 3201 to paths of the interface circuitry accordingly. Thus if the accessory were connected in use to a device that used the relevant contact for pin 3201c for ground and the relevant contact for pin 3201d for microphone signals, this could be detected. The coupling between pins 3201c and 3201d and the respective paths shown in FIG. 32 could then be swapped. Various techniques are known for detecting the pin-out configuration of the device (in terms of use of Mic and Ground pin out configurations), for instance by detecting the resistive biasing applied to the contact which is used for the microphone and various means are known for automatically swapping the coupling to the signals paths, any of which could be applied to embodiments of the present invention.

It will be appreciated that in the embodiment shown in FIG. 32 one pin (pin 3201b) which is used for receiving analogue signals in the legacy mode is actually used for outputting digital data in the digital mode. It will of course be appreciated that in other embodiments the roles of pins 3201a and b in the digital mode could easily be swapped.

Figure 33:
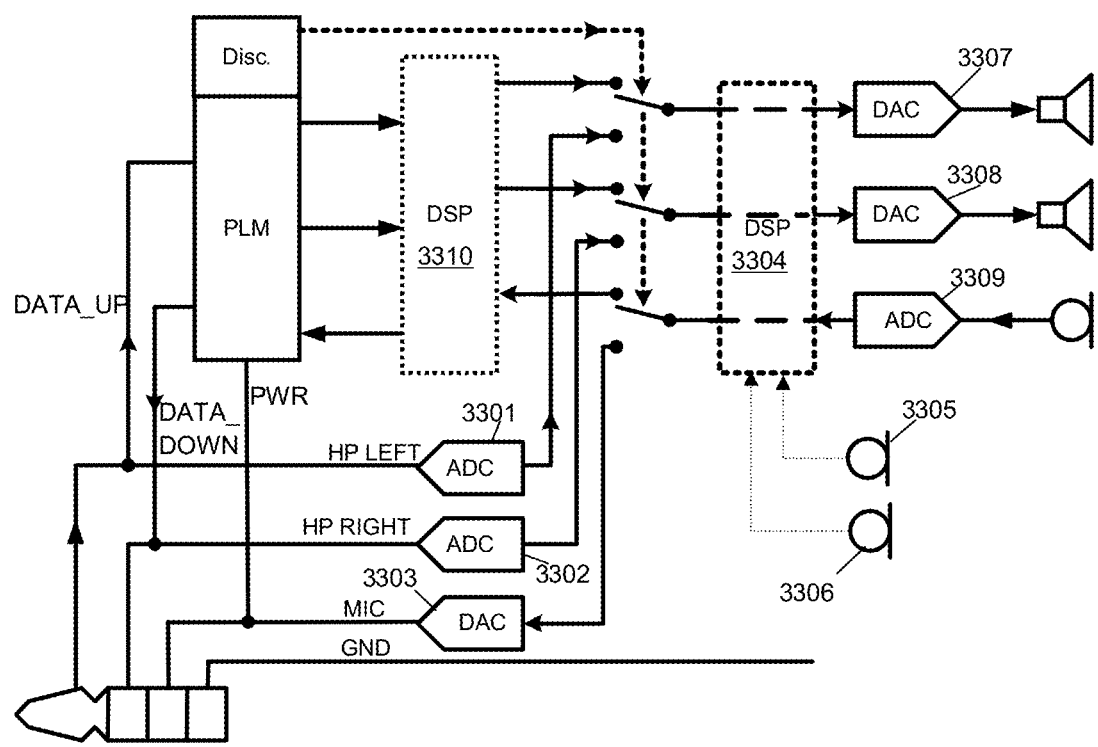
FIG. 33 illustrates a connection interface for an accessory according to another embodiment of the invention.

FIG. 33 shows another embodiment of an accessory device interface. This embodiment has several of the same components discussed above in relation to FIG. 32. In the embodiment of FIG. 33 however the signal paths HP LEFT and HP RIGHT includes ADCs 3301 and 3302 respectively for converting the received analogue signals into digital signals. This allows various digital signal processing techniques to be applied within the accessory even when the legacy device transmits analogue signals. There may therefore be a digital signal processor (DSP) 3304 arranged to receive digital signals from the ADCs 3301 and 3302 and possibly noise cancellation microphones 3305 and 3306, for example to perform noise cancellation or spectral equalising to compensate for speaker shortcomings etc.

The digital signals can then be converted into analogue signals by DACs 3307 and 3308 associated with the loudspeakers.

Likewise in legacy mode the signals from voice microphone 3205 may be digitised in ADC 3309, optionally subject to any digital processing, and then converted back to an analogue signal in DAC 3303 to be transmitted over the Mic line to the connected device.

In digital mode, as described previously, the Mic line may be used to supply power. In this embodiment however the serial switches may be located within the digital domain of the circuit and thus connect the output of the PLM circuitry with the inputs to DACs 3307 and 3308 and output of ADC 3309. In some embodiments DSP 3310 may be arranged to process the signals output from and input to the PLM circuitry, possibly in addition to as an alternative to DSP 3304.

This embodiment does require at least some power available in legacy mode however this could be provided by a battery in the accessory which may be recharged, for example when operating in digital mode. In some arrangements, if the power requirements of the digital processing is relatively low, it may be possible to derive the power needed from the audio signals themselves using similar power harvesting techniques to those described above but based on the received analogue signals.

Like the interface embodiment shown in FIG. 32, the embodiment shown in FIG. 33 is also able to operate in both an analogue legacy mode with devices that communicate using analogue signals and also in a digital mode with devices able to communicate using digital signals, again using a standard connector suitable for legacy devices.

It will be noted that both of the embodiments shown in FIGS. 32 and 33 are operable in a digital mode that uses pulse length modulation to encode one or more streams of digital data. The PLM digital signal may also be used to encode other data streams as well. For instance control data could be encoded into the pulse length to allow the device to provide control instructions for the transducers and/or any DSP of the accessory. Likewise control data such as indicating button presses etc. may be transmitted from the headset to the device in digital mode. Additional data from the accessory device, such as data on the current flowing through a loudspeaker coil may also be measured and transmitted to the device for speaker protection for example.

In some embodiments the accessory may be operable in more than one digital mode of operation. The use of the PLM digital format as described is advantageous due to the fact that high data rates can be achieved with continuous communication in one direction over a single wire without requiring transmission of a bit clock or the like and with good fidelity. However other digital formats could be supported.

For instance, in a second digital mode pins 3201*a* and 3201*b* may be used together for differential digital signalling or a 1-bit PDM signal may be received on pin 3201*a* with a bit clock signal being received on pin 3201*b*, again with pin 3201*c* being used for power and pin 3201*d* being used for ground. In both of these modes full duplex communication is not possible but this would be suitable for receiving data only, for instance just for audio playback or two-way half-duplex communication could be established which may be suitable for some applications.

The discrimination circuitry of the digital processing circuitry may thus be configured to not only identify whether digital communication is supported but also the format of digital communication.

The embodiments have been described in relation to transfer of multiple channels of audio data but it will be appreciated that the principles may be applied to other types of data for driving transducers such as haptic transducers, ultrasonic transducers, hearing aid coils and the like.

Figure 34:
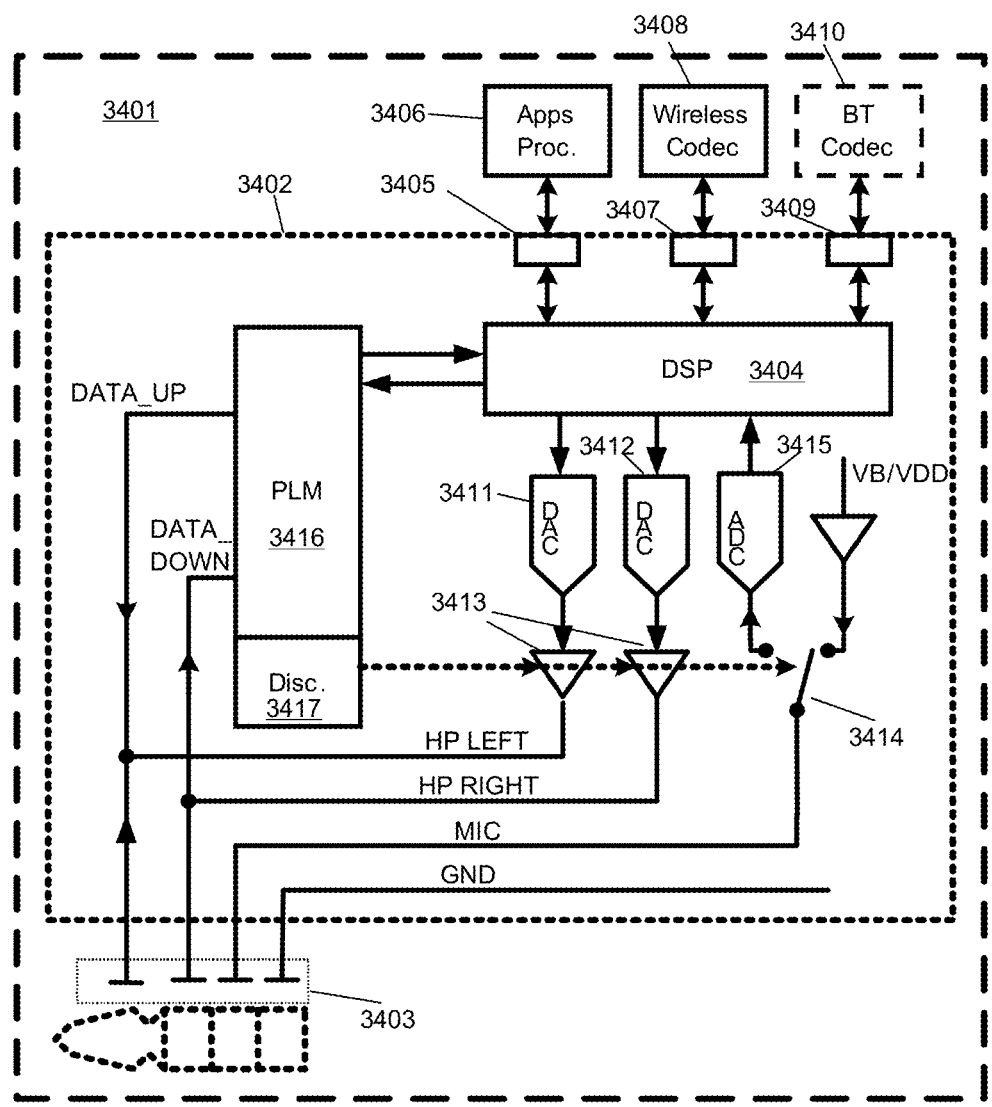
FIG. 34 illustrates a connection interface for a device according to an embodiment of the invention.

FIG. 34 shows an embodiment of interface circuitry that may be used in an electronic device to communicate with an accessory.

FIG. 34 illustrates a device 3401 which includes an interface 3402, for instance a codec, for communicating with an external accessory apparatus when connected via connector 3403, which in this example may be a socket configured to receive a standard connector such as a TRRS jack plug. In this example therefore the connector has four separate pins or contacts which each are coupled to signal lines of the codec 3402.

The interface is capable of operating in a legacy mode for transmitting and receiving analogue signals and also in a digital mode for transmitting and receiving digital signals.

The PLM codec 3402 may include a digital signal processor (DSP) 3404 for communicating with other parts of the host device. For example, the DSP 3404 may be arranged to communicate via a first interface 3405 with a first device component, such as an applications processor 3406 of the host device. The DSP may also communicate via a second interface 3407 with a second device component, such as a wireless codec (e.g. used for wireless and/or RF baseband communications). In some applications the DSP 3404 of codec 3402 may also communicate with further device systems, such as via interface 3409 with a Bluetooth® codec 3410. Note that as well as providing a communications interface between any of the applications processor 3406, wireless codec 3408 and BT codec 3410 and the attached accessory device, the codec may provide a path for communications between at least two of the device components, preferably a digital only path.

In operation in legacy mode audio data to be transmitted to the accessory device may be received by DSP 3404 as digital data and any necessary processing applied. Individual left and right audio streams will then be transmitted to digital to analogue converters (DACs) 3411 and 3412 respectively. The output from DACs 3411 and 3412 are then passed, via HP Left and HP Right signal paths respectively, to the relevant pins/contacts of connector 3403, possibly via suitable amplifiers 3413. In legacy mode, signals received on the mic signal path from the relevant pin/contact of connector pass to switch 3414 which will connect to the input to ADC 3415. ADC 3415 will convert any received microphone signals into a suitable digital signal which is then passed to DSP 3404, possibly for communication onward to wireless codec 3408 say.

In digital mode the switch 3414 may be switched to connect the path used for MIC in the legacy mode to a supply voltage VB/VDD. Amplifiers 3413 may also be disabled and the DSP 3404 will transmit any data to be transmitted to PLM module 3416. PLM module 3416 will encode the data into a PLM data stream to be transmitted to the device on the DATA_UP signal path as described previously. Digital data may also be received from the device on the DATA_DOWN signal path and decoded into appropriate data streams and transmitted to DSP 3404.

Operation in digital or legacy mode may be controlled by discrimination circuitry 3417. This circuitry may, on detection that an accessory apparatus is connected—either during operation or at power-on or reset—determine whether the accessory apparatus is capable of communicating using the relevant digital protocol. For example the device may initially start in digital mode and attempt a handshaking exercise as described previously. If the handshaking is successful the codec 3402 may continue in digital mode. However if the handshaking is not successful then the codec 3402 may revert to legacy mode and make the Data_up and Data_down lines high impedance and generate a control signal to enable amplifiers 3413 and switch 3414 to connect the Mic line to ADC 3415.

The codec 3402 is thus capable of communicating with an accessory device that supports PLM digital communications, such as described above in relation to FIGS. 4 and 5, but also with legacy accessory devices using analogue signals.

Host Devices

Figure 35:
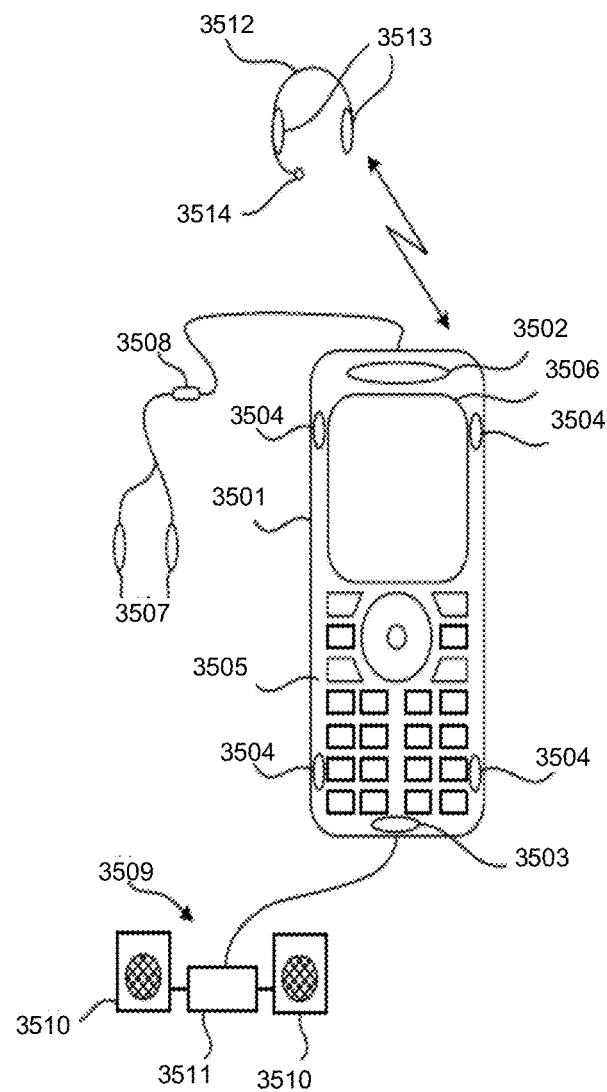
FIG. 35 illustrates an electronic device with various connections for accessory apparatuses.

A PLM encoder/decoder such as described above may be implemented as part of a host device which is configured for communication with various other components of the host device and external devices that may be connected in various ways. For instance FIG. 35 shows a device 3501, in this example a mobile telephone handset which may have various internal audio transducers and connections for external accessory apparatus. The handset 3501 may have at least one internal loudspeaker 3502 and at least one microphone 3503. There may also be various microphones 3504 arranged for noise cancellation. There may also be a user interface, such as control buttons 3505, a keyboard and/or touch screen 3506 for activating various control functions such as volume control.

Figure 36:
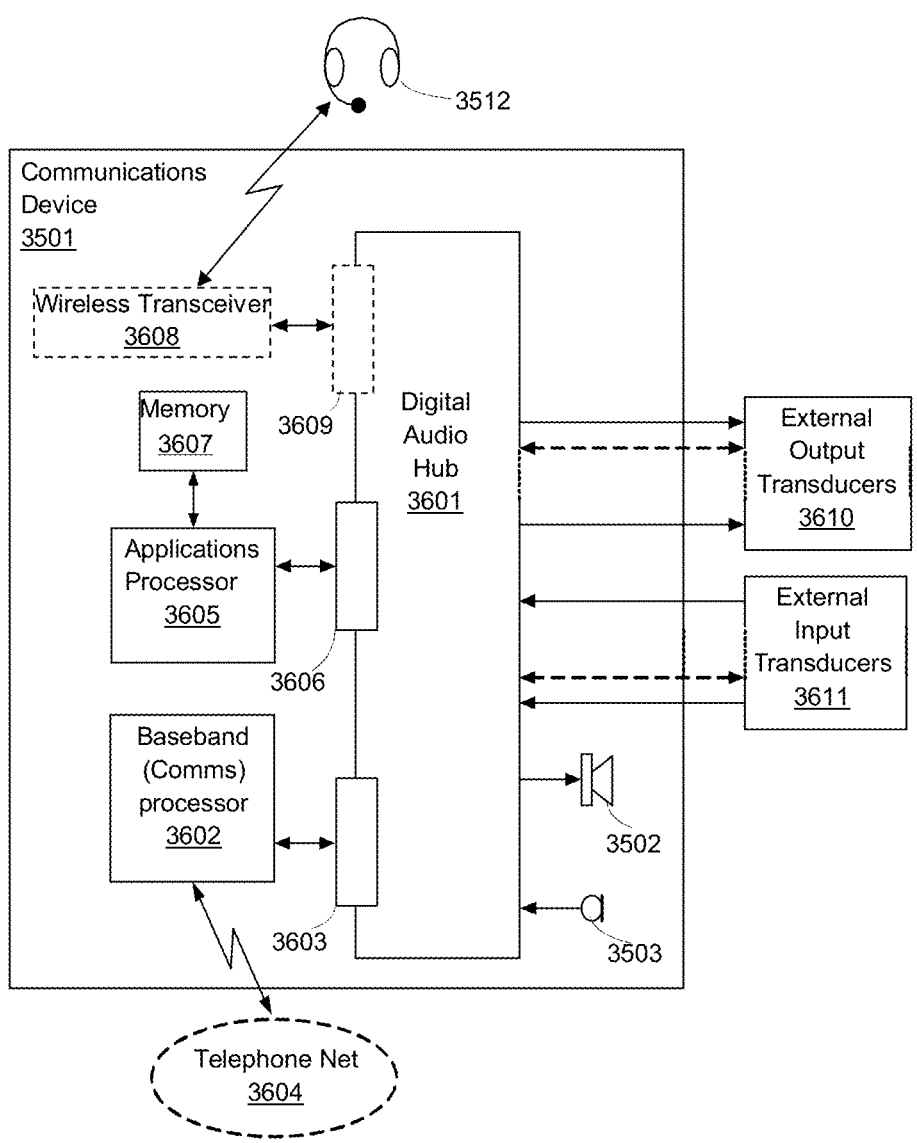
FIG. 36 illustrates various connections between internal and external systems of an electronic device.

As shown in FIG. 36 a device 3501 may therefore comprise audio processing circuitry such as a digital audio hub 3601 for control over audio for the device. The audio control circuitry 3601 may therefore provide audio data to output transducers of the host device 3501, such as speaker 3502, and receive data from input transducers of the host device, such as microphone 3503 (and/or microphones 3504 shown in FIG. 35).

In use the audio circuitry 3601 may receive and transmit audio data from/to various other device systems. For instance the audio circuitry 3601 may receive audio data from a baseband (communications) processor 3602 via a first interface 3603. The baseband processor 3602 may provide communications to a telephone network 3604 via a suitable antenna. Thus audio circuitry 3601 may receive audio data from the baseband processor for processing and transmission to loudspeaker 3502 and data from microphone 3503 may be sent for communication via the telephone network 3604.

The audio circuitry may also communicate with an applications processor 3605 via a second interface 3606. The applications processor may retrieve audio data from memory 3607, for instance for playback of stored music. Commands from a device user interface may be communicated to the audio hub 3601 via the applications processor 3605.

There may also be additional systems such as a wireless transceiver 3608 which communicates via interface 3609 for wireless communications.

In some instances the various device systems may communicate audio data with each other via the audio processing circuitry 3601. The audio processing circuitry 3601 may therefore comprise at least two interfaces for device systems with a digital only path between interfaces.

The audio circuitry 3601 may also transmit data to external devices, such as accessory or peripheral apparatuses. For instance the audio circuitry 3601 may communicate via suitable connections with output transducers 3610 and/or receive data from external input transducers 3611.

Referring back to FIG. 35 such external apparatuses may be connected in various ways. For instance a headset comprising earphones 3507 for receiving stereo data and a voice microphone 3508 for receiving voice audio may be connected via a suitable jack plug to a headphone socket of the device. The same socket could also be used for driving line-out signals to an external audio device, or such an external audio device 3509 comprising speakers 3510 and an amplifier unit 3511 could be connected via a different connector, possibly via a docking station. Wireless communication may also be used to communicate audio data wirelessly to a suitable device, such as wireless headset 3512 having speakers 3513 and microphone 3514. As shown in FIG. 36 wireless communication may occur via wireless transceiver 3608.

Embodiments described above have assumed that all incoming PDM data streams have the same sample rate. If say one data stream has say half the sample rate, then each sample may obviously be sampled twice in successive clock intervals to provide an equivalent system. Similarly each sample of a PDM output stream may be sampled more than once to provide a higher effective sample rate.

Embodiments described above receive one-bit, i.e. two-level, streams of input data. The invention may be adapted to process multi-level inputs, e.g. 3-level inputs (−1, 0, +1) as used to directly drive Class D H-bridges for example, by suitable adaptation of the truth tables, and similarly to output multi-level output pulse streams.

It can therefore be seen that embodiments of the present invention can be used to provide efficient data transfer using only a limited number of connections and which offers the ability to send additional data when required and/or reduce any EMI effects by making use of alternative data encodings for combinations of input data.

The embodiments herein have been described in relation to audio data. However, although reference is made herein to "audio data", the electrical signals that are handled by the circuitry can represent any physical phenomenon. For example, the term "audio data" can mean not just signals that represent sounds that are audible by the human ear (for example in the frequency range of 20 Hz-20 kHz), but can also mean input and/or output signals to and/or from haptic transducers (typically at frequencies below 20 Hz, or at least below 300 Hz) and/or input and/or output signals to and/or from ultrasonic transducers (for example in the frequency range of 20 kHz-300 kHz) and/or to infrasonic transducers (typically at frequencies below 20 Hz).

Therefore, it will be appreciated that the principles disclosed herein may be applied to other types of data for driving transducers such as haptic transducers, ultrasonic transducers, hearing aid coils and the like or for receiving data from transducers. In general for a given functional unit of a device there may be various consumers of data transmitted from that unit and various generators of data to be received by that functional unit, as described above in the context of an audio DSP/codec. The embodiments of the present invention are equally applicable to other types of data that may be sent from a functional unit to consumers and/or sent to the functional unit from generators.

It will be appreciated that the interface circuitry may conveniently be implemented, at least partly, as an integrated circuit and may form part of a host electronic device, especially a portable device and/or a battery powered device. It will further be appreciated that the digital data may be manipulated by either electronic circuitry or in software or in a combination of both. The interface circuitry may be used in an audio device such as a personal music or video player. The amplifier may be implemented in a mobile communications device such as mobile telephone or a computing device, such as a laptop or tablet computer or PDA. The interface circuitry may be used in a gaming device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. The word "amplify" can also mean "attenuate", i.e. decrease, as well as increase and vice versa and the word "add" can also mean "subtract", i.e. decrease, as well as increase and vice versa. Any reference numerals or labels in the claims shall not be construed so as to limit their scope.

The invention claimed is:

1. Digital data transmission circuitry comprising:
   interface circuitry configured to receive an input signal comprising a plurality of data pulses representative of input data and to transmit the data pulses over a first communications link;
   wherein the interface circuitry comprises:
      pulse-length modulator circuitry configured to receive the input signal and to generate a plurality of data pulses representative of the input data; and
      at least two data inputs for receiving respective input digital data streams of data bits, wherein the pulse-length modulator circuitry is configured to generate a single data pulse having a rising edge and a falling edge within each of a plurality of transfer periods defined by a first clock signal, responsive to said input digital data streams and to said first clock signal;
      wherein the time of occurrence of the rising edge and the falling edge of the data pulse encodes the then current data bits of said input digital data streams.

2. Digital data transmission circuitry according to claim 1, wherein said input data comprises audio data.

3. Digital data transmission circuitry according to claim 1, wherein said first communications link comprises a single link.

4. Digital data transmission circuitry according to claim 3, wherein said single link comprises a single wire or a single bus.

5. Digital data transmission circuitry according to claim 3, wherein said single link comprises a single pole or pin of a plug-socket connection that is used to couple a host device that includes the digital data transmission circuitry to an accessory device that is external to the host device.

6. Digital data transmission circuitry according to claim 5, wherein said plug-socket connection comprises a three- or four-pole jack plug or socket.

7. Digital data transmission circuitry according to claim 3, wherein said single link comprises a single path on a printed circuit board that is connected to a pin of a digital signal processor or codec of the digital data transmission circuitry.

8. Digital data transmission circuitry as claimed in claim 1, wherein the interface circuitry is bi-directional, and wherein the pulse-length modulator circuitry is configured to transmit data pulses during a first transfer period and the interface circuitry is configured to receive data pulses during a second, different transfer period.

9. Digital data transmission circuitry as claimed in claim 1, wherein the interface circuitry is bi-directional and comprises a drive circuit for voltage modulating the first communications link based on the data pulses and a read circuit responsive to the resultant voltage on the first communications link, wherein the read circuit is configured to subtract the drive voltage modulation from the resultant voltage signal.

10. Digital data transmission circuitry as claimed in claim 1, wherein the occurrence said rising and falling edges of the data pulse are quantised in time within the transfer period.

11. Digital data transmission circuitry as claimed in claim 1, wherein said input digital data streams comprises at least two audio data streams.

12. Digital data transmission circuitry as claimed in claim 1, wherein said input digital data streams comprises at least one stream of control data for controlling the operation of a receiver of the least two audio data streams.

13. Digital data transmission circuitry as claimed in claim 1, wherein the rising and falling edges of each data pulse are synchronised to a second clock signal, where the second clock signal has a frequency greater than the first clock signal.

14. Digital data transmission circuitry as claimed in claim 13, wherein the second clock signal frequency is a multiple of the first clock signal frequency.

15. Digital data transmission circuitry as claimed in claim 13, wherein the first clock frequency is equal to the sample rate of said at least one digital data stream.

16. Digital data transmission circuitry as claimed in claim 15, wherein the sample rate of said at least one digital stream is a multiple of a standard audio frequency sample rate.

17. Digital data transmission circuitry as claimed in claim 13, wherein the pulse-length modulator circuitry is configured such that there is at least one period defined by the second clock signal at the start of the transfer period before the start of a data pulse.

18. Digital data transmission circuitry as claimed in claim 13, wherein the pulse-length modulator circuitry is configured such that there is at least one period defined by the second clock signal at the end of a data pulse before the end of the transfer period.

19. Digital data transmission circuitry as claimed in claim 1, wherein the pulse-length modulator circuitry is configured such that at least one possible combination of input data can be encoded by more than one possible data pulses.

20. Digital data transmission circuitry as claimed in claim 19, wherein the pulse-length modulator circuitry is configured such that, over time, different instances of said combination of input data is encoded by different ones of said possible data pulses.

21. Digital data transmission circuitry as claimed in claim 20, wherein said possible data pulses for encoding a given combination of input data have different durations and the pulse-length modulator circuitry is configured to select between the possible data pulses so as to minimise any d.c. imbalance over time in the transmitted data pulses.

22. Digital data transmission circuitry as claimed in claim 20, wherein one of said possible data pulses for encoding a given combination of input data has a duration of greater than half the transfer period and another of said possible pulses has a duration of less than half the transfer period.

23. Digital data transmission circuitry as claimed in claim 1, wherein the pulse-length modulator circuitry is configured such that there is at least one possible data pulse that is not used to encode the input data but which may be transmitted by the pulse-length modulator circuitry for synchronisation and/or control.

* * * * *

UNITED STATES PATENT AND TRADEMARK OFFICE
CERTIFICATE OF CORRECTION

| | |
|---|---|
| PATENT NO. | : 12,002,482 B2 |
| APPLICATION NO. | : 17/845703 |
| DATED | : June 4, 2024 |
| INVENTOR(S) | : Lesso et al. |

It is certified that error appears in the above-identified patent and that said Letters Patent is hereby corrected as shown below:

In the Claims

1. In Column 65, Line 28, in Claim 10, delete "occurrence" and insert -- occurrence of --, therefor.

2. In Column 65, Line 36, in Claim 12, delete "least" and insert -- at least --, therefor.

Signed and Sealed this
Twenty-ninth Day of October, 2024

*Katherine Kelly Vidal*

Katherine Kelly Vidal
*Director of the United States Patent and Trademark Office*